US009390687B2

(12) United States Patent
Kim

(10) Patent No.: US 9,390,687 B2
(45) Date of Patent: Jul. 12, 2016

(54) MOBILE TERMINAL AND CONTROLLING METHOD THEREOF

(75) Inventor: Jonghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/234,943

(22) PCT Filed: Feb. 3, 2012

(86) PCT No.: PCT/KR2012/000639
§ 371 (c)(1),
(2), (4) Date: Jan. 24, 2014

(87) PCT Pub. No.: WO2013/042836
PCT Pub. Date: Mar. 28, 2013

(65) Prior Publication Data
US 2014/0160145 A1 Jun. 12, 2014

(30) Foreign Application Priority Data
Sep. 22, 2011 (KR) ........................ 10-2011-0095577

(51) Int. Cl.
G06T 15/50 (2011.01)
G06T 11/00 (2006.01)
(Continued)

(52) U.S. Cl.
CPC .. *G09G 5/37* (2013.01); *G03H 1/02* (2013.01); *G03H 1/2294* (2013.01); *G06F 1/1639* (2013.01); *G09G 5/006* (2013.01); *G09G 5/30* (2013.01); *H04N 9/3173* (2013.01); *G03H 2210/30* (2013.01); *G03H 2227/02* (2013.01); *G06F 1/1677* (2013.01);
(Continued)

(58) Field of Classification Search
USPC ......... 345/426, 581, 589, 619, 442, 156, 520, 345/691; 359/1, 14, 24
See application file for complete search history.

(56) References Cited

U.S. PATENT DOCUMENTS 6,819,469 B1 * 11/2004 Koba ........................... 359/290
2002/0001110 A1 * 1/2002 Metz et al. ..................... 359/10
(Continued)

FOREIGN PATENT DOCUMENTS

KR 2003-0071238 A 9/2003
KR 10-0800854 B1 2/2008
(Continued)

Primary Examiner — Wesner Sajous
(74) Attorney, Agent, or Firm — Birch, Stewart, Kolasch & Birch, LLP

(57) ABSTRACT

A mobile terminal and controlling method thereof are disclosed, by which a holography user interface is provided. The present invention includes a controller, a holography storing medium configured to record an interference pattern generated by interference of light, and a holography output module configured to output a holography image attributed to diffraction between the light applied to the holography storing medium and the interference pattern in accordance with at least one preset holography type among a plurality of holography types under the control of the controller, wherein a plurality of the holography types comprise a default type, a holography background type and a holography pattern type, wherein if the default type is set, the controller controls the generated holography image to be outputted intactly, wherein if the holography background type is set, the controller controls the holography image to be outputted in a manner of being included in a 1st region within a preset holography background, and wherein if the holography pattern type is set, the controller controls the holography image to be outputted in accordance with the preset at least one holography pattern.

18 Claims, 87 Drawing Sheets

(51) Int. Cl.

| | | |
|---|---|---|
| *G06T 11/60* | (2006.01) | |
| *G06T 11/20* | (2006.01) | |
| *G06F 3/01* | (2006.01) | |
| *G06F 3/048* | (2013.01) | |
| *G06F 3/14* | (2006.01) | |
| *G03H 1/08* | (2006.01) | |
| *G09G 5/37* | (2006.01) | |
| *G03H 1/22* | (2006.01) | |
| *G03H 1/02* | (2006.01) | |
| *G09G 5/00* | (2006.01) | |
| *G09G 5/30* | (2006.01) | |
| *G06F 1/16* | (2006.01) | |
| *H04N 9/31* | (2006.01) | |
| G09G 3/00 | (2006.01) | |
| H04M 1/725 | (2006.01) | |
| H04M 1/02 | (2006.01) | |

(52) U.S. Cl.
CPC ...... *G06F 3/1423* (2013.01); *G06F 2200/1637* (2013.01); *G09G 3/003* (2013.01); *H04M 1/0272* (2013.01); *H04M 1/72522* (2013.01)

(56) References Cited

U.S. PATENT DOCUMENTS

| | | | |
|---|---|---|---|
| 2003/0020975 A1* | 1/2003 | Metz et al. | 359/15 |
| 2003/0030858 A1* | 2/2003 | Kodama | 359/1 |
| 2003/0039896 A1* | 2/2003 | Iriguchi | 430/5 |
| 2006/0232838 A1* | 10/2006 | Clube | 359/12 |
| 2007/0115521 A1* | 5/2007 | Ueda et al. | 359/3 |
| 2010/0097439 A1 | 4/2010 | Kroll et al. | |
| 2011/0002020 A1* | 1/2011 | Khan | 359/22 |
| 2011/0085116 A1* | 4/2011 | Kim | 349/106 |
| 2012/0002257 A1* | 1/2012 | Shirakura et al. | 359/22 |

FOREIGN PATENT DOCUMENTS

| | | |
|---|---|---|
| KR | 10-2011-0045686 A | 5/2011 |
| WO | WO 2009/121380 A1 | 10/2009 |

* cited by examiner

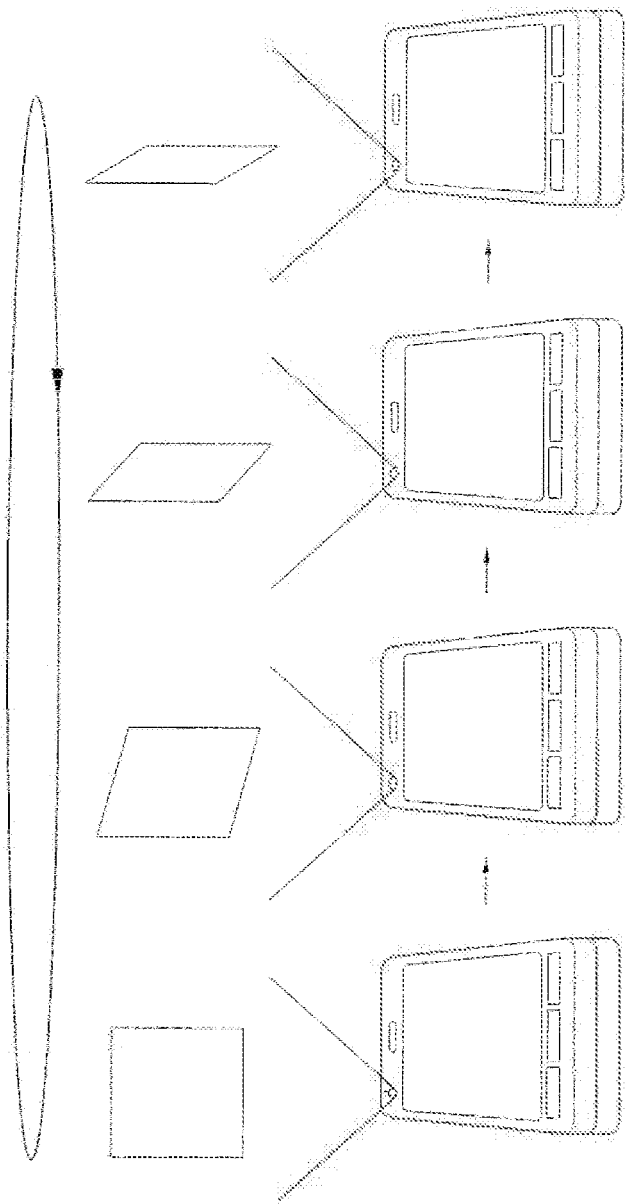

Fig. 10A
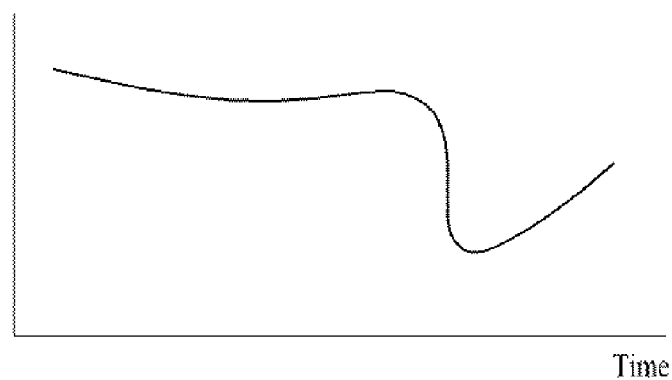
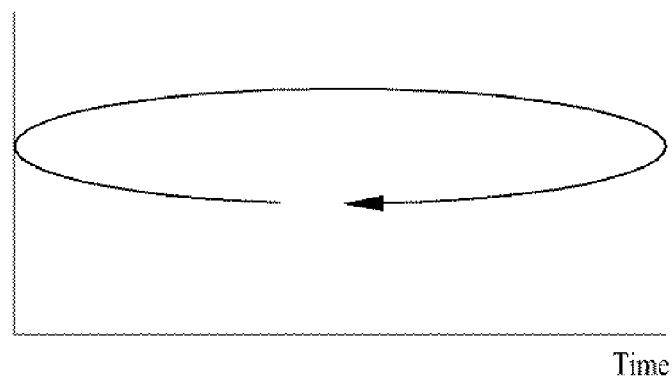

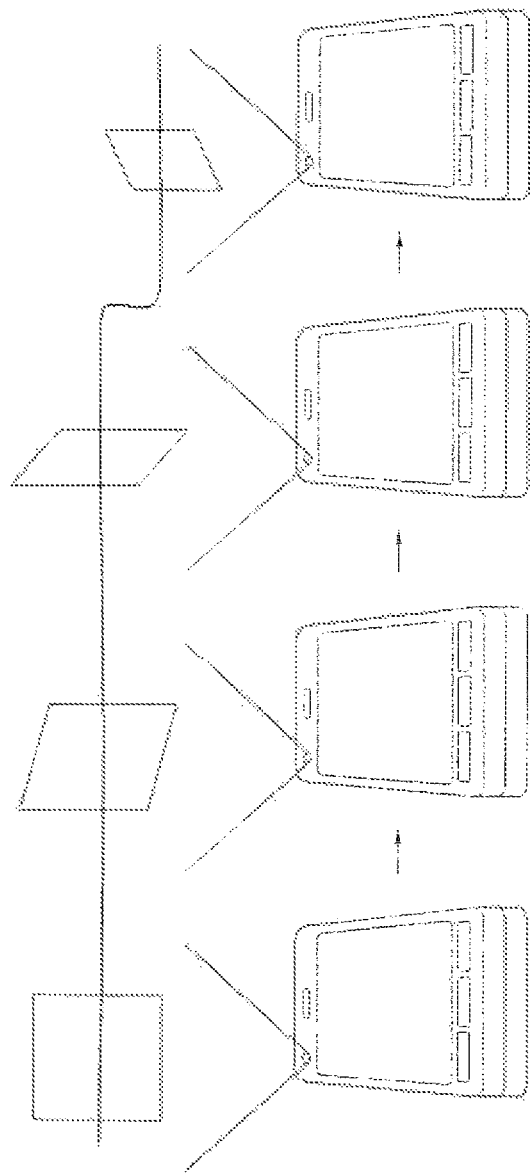

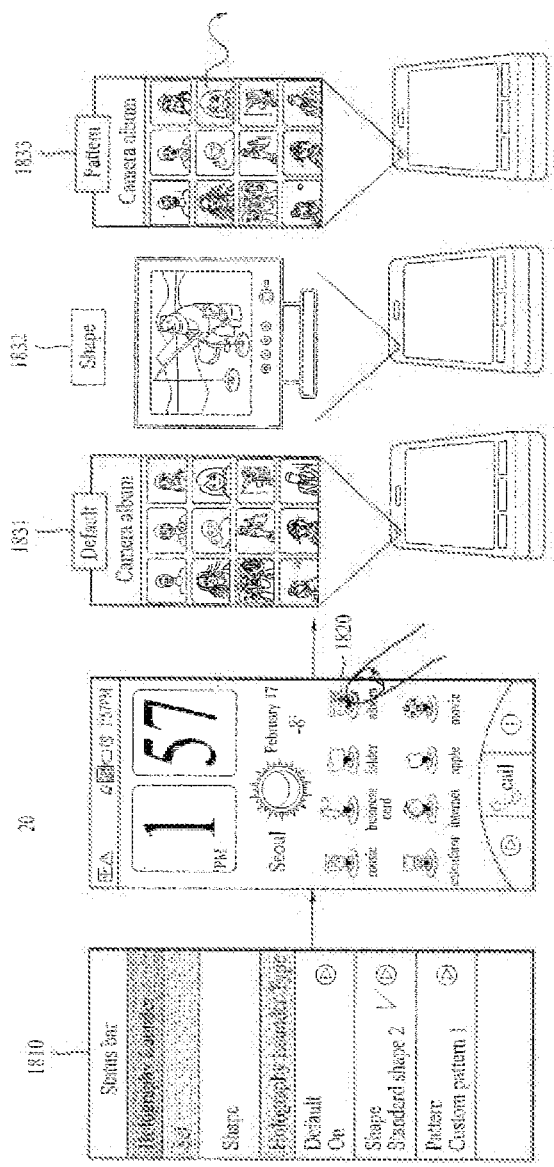

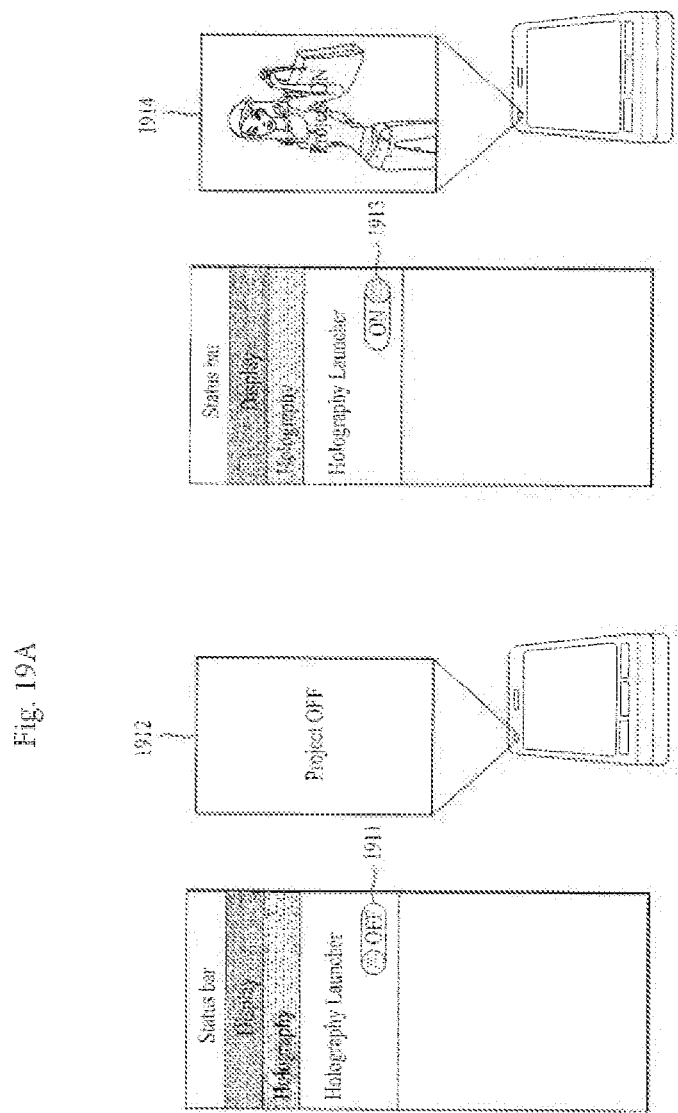

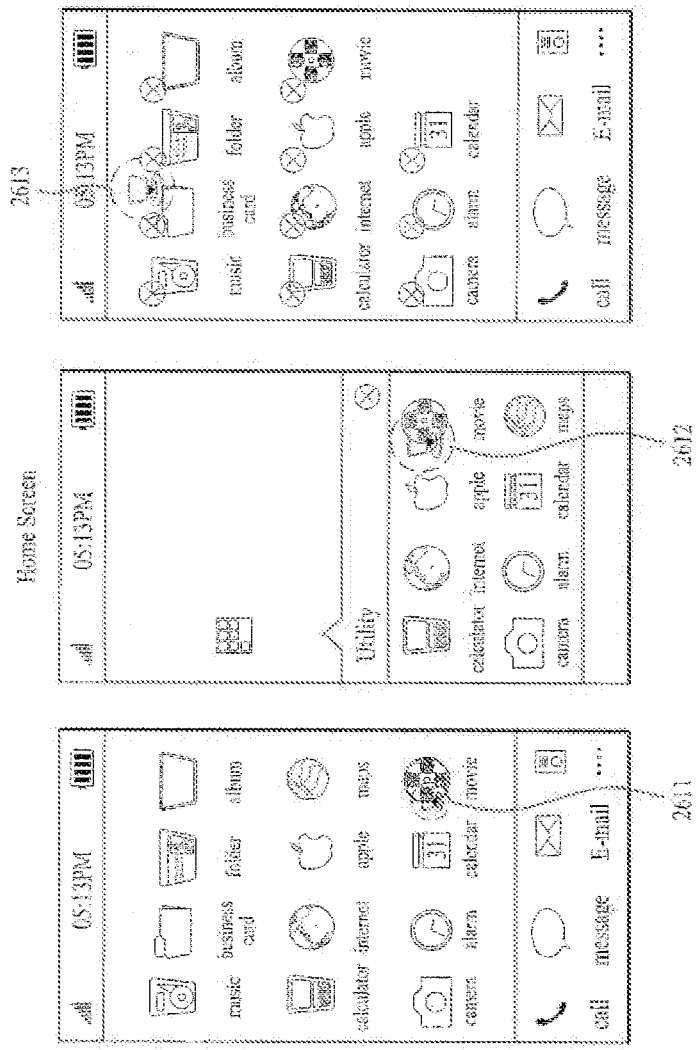

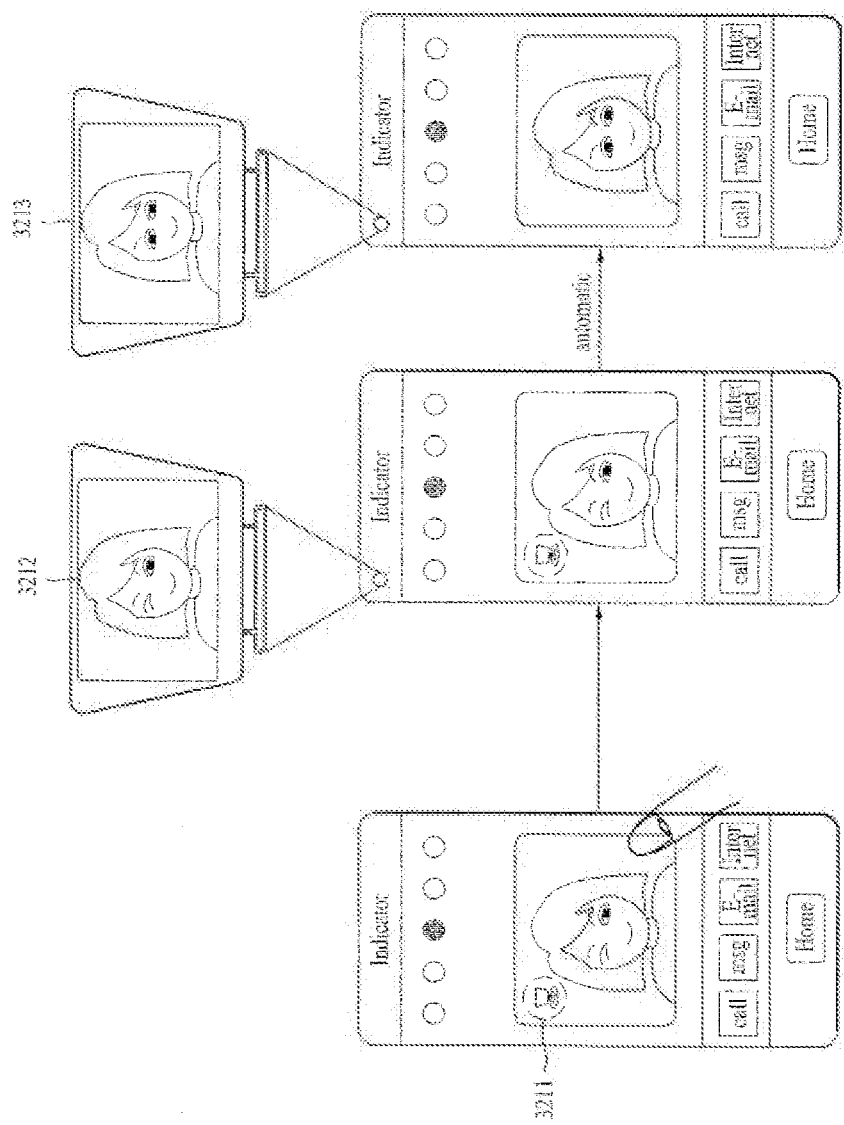

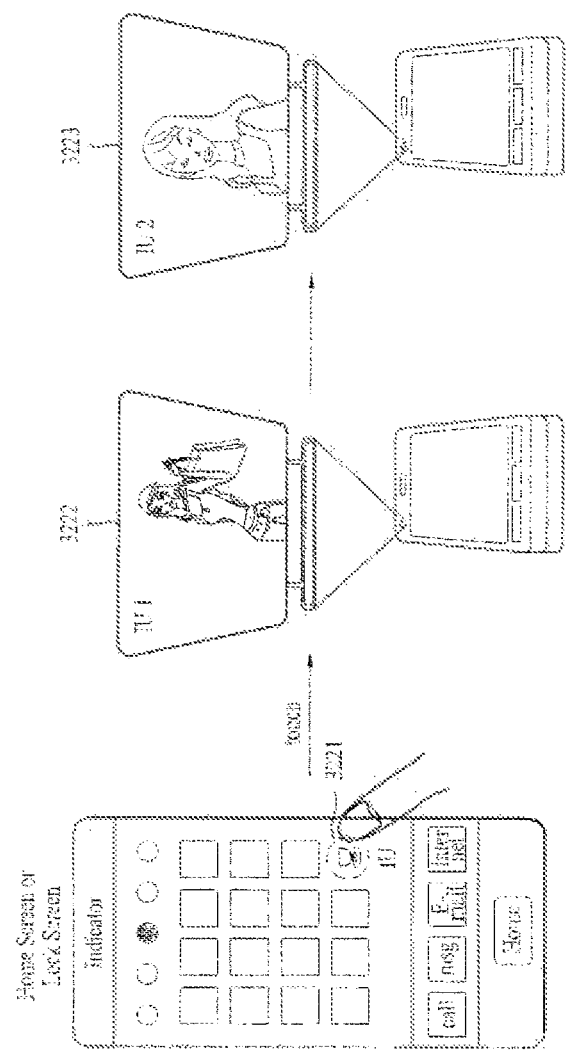

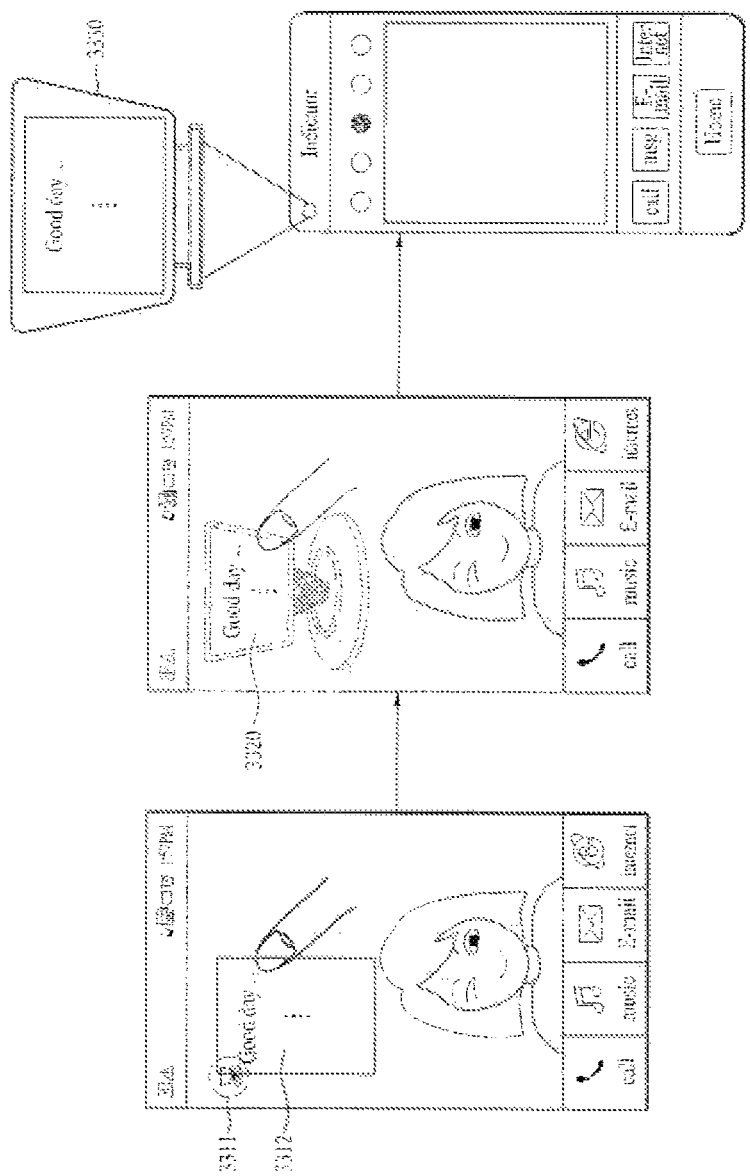

MOBILE TERMINAL AND CONTROLLING METHOD THEREOF

TECHNICAL FIELD

The present invention relates to a mobile terminal, and more particularly, to a mobile terminal and controlling method thereof. Although the present invention is suitable for a wide scope of applications, it is particularly suitable for providing a holography user interface.

BACKGROUND ART

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a terminal is capable of implementing a holography image, the demand for facilitating a method of manipulating a holography user interface is rising.

SUMMARY OF THE INVENTION

To achieve these objects and other advantages and in accordance with the purpose of the invention, as embodied and broadly described herein, a mobile terminal according to one embodiment of the present invention includes a controller, a holography storing medium configured to record an interference pattern generated by interference of light, and a holography output module configured to output a holography image attributed to diffraction between the light applied to the holography storing medium and the interference pattern in accordance with at least one preset holography type among a plurality of holography types under the control of the controller, wherein a plurality of the holography types comprise a default type, a holography background type and a holography pattern type, wherein if the default type is set, the controller controls the generated holography image to be outputted intactly, wherein if the holography background type is set, the controller controls the holography image to be outputted in a manner of being included in a 1st region within a preset holography background, and wherein if the holography pattern type is set, the controller controls the holography image to be outputted in accordance with the preset at least one holography pattern.

Preferably, the mobile terminal may further include a display unit and the controller may control a visual effect to be displayed on a prescribed region of the display unit to indicate the preset at least one holography type.

Preferably, the holography background may include a closed curve implemented into a combination of at least one of a straight line, a line bent at a prescribed angle, a branch line and a curved line.

Preferably, the at least one holography pattern may be determined by at least one of a distance difference between the holography output module and the outputted holography image and a shape of the outputted holography image and each of the distance difference and the shape of the outputted holography image may be variable in accordance with time.

Preferably, the at least one holography pattern may be determined by at least one of shift, rotation, color change, size change and flickering of the outputted holography image and each of the shift, the rotation, the color change, the size change and the flicking may be variable in accordance with time.

More preferably, the visual effect may be displayed in a manner of being sorted by a kind of the preset at least one holography type.

Preferably, the mobile terminal may further include a display unit and a user input unit and the controller may control at least one object previously designated via the user input unit or a region previously designated via the user input unit in a whole region of the display unit to be outputted as the holography image.

More preferably, the mobile terminal may further include a display unit. In this case, the controller may control a visual effect for indicating the preset at least one holography type to be displayed on a prescribed region of the display unit and the visual effect may include a color, a surface texture pattern, a flickering, a size variation and a transformation of the previously designated at least one object or the previously designated region.

Preferably, the mobile terminal may further include a user input unit and the controller may search for a 2nd information linked with a 1st information inputted via the user input unit and control the holography image including the 2nd information to be outputted.

Preferably, the mobile terminal may further include a display unit and a user input unit configured to select a 1st object from a plurality of objects displayed on the display unit. In this case, the controller may activate the selected 1st object and control the holography image including an activated result information of the 1st object to be outputted.

Preferably, the mobile terminal may further include a display unit and a user input unit configured to select at least one object in order from a plurality of objects displayed on the display unit. In this case, the controller may activate the selected at least one object in the order in a preset time interval and control the holography image including an activated result information of the activated at least one object to be outputted.

Preferably, the mobile terminal may further include a display unit and a user input unit. In this case, the controller may display a preview information indicating the preset at least one holography type on the display unit. If the displayed preview information is selected via the user input unit, the controller may control the holography image to be outputted in accordance with the preset at least one holography type.

Preferably, the mobile terminal may further include a display unit and a user input unit configured to select a 1st object from a plurality of objects displayed on the display unit. In this case, if the 1st object is selected, the controller may display a list in which a plurality of functions for applying the preset at least one holography type thereto are arranged in a prescribed form. If a 1st function is selected from a plurality of the functions included in the displayed list, the controller may control the holography image corresponding to the 1st function to be outputted in accordance with the preset at least one holography type.

More preferably, a plurality of the functions may include a call signal transmitting function, a message sending function, an information reading function and a holography type preview function.

In another aspect of the present invention, a method of controlling a mobile terminal according to one embodiment of the present invention may include the steps of setting at least one holography type among a plurality of holography types and outputting a holography image from a holography output module in accordance with the set at least one holography type, wherein a plurality of the holography types comprise a default type, a holography background type and a holography pattern type, wherein if the default type is set, the holography image is outputted intactly, wherein if the holography background type is set, the holography image is outputted in a manner of being included in a 1st region within a preset holography background, and wherein if the holography pattern type is set, the holography image is outputted in accordance with the preset at least one holography pattern.

Preferably, the method may further include the step of displaying a visual effect on a prescribed region of the display unit to indicate the set at least one holography type.

More preferably, the visual effect may be displayed in a manner of being sorted by a kind of the set at least one holography type.

Preferably, the method may further include the step of previously designating at least one object or a partial region in a whole region of a display unit and the previously designated at least one object or the previously designated partial region may be outputted as the holography image.

Preferably, the method may further include the step of displaying a preview information indicating the set at least one holography type on a display unit. In this case, if the displayed preview information is selected, the holography image may be outputted in accordance with the set at least one holography type.

Preferably, the method may further include the steps of selecting a 1st object from a plurality of objects displayed on a display unit, displaying a list, in which a plurality of functions for applying the preset at least one holography type thereto are arranged in a prescribed form, on the display unit, and selecting a 1st function from a plurality of the functions included in the displayed list. In this case, the holography image corresponding to the 1st function may be outputted in accordance with the set at least one holography type.

Accordingly, the present invention provides the following effects and/or advantages.

First of all, the above-configured mobile terminal according to one embodiment of the present invention may be more conveniently manipulated using a holography user interface.

Secondly, according to the present invention, a user may be provided with a holography function previously designated based on an event recognized by a terminal.

Thirdly, according to the present invention, a holography image provided with a holography pattern effect may be projected.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram for one example of setting a holography pattern by adjusting a distance difference and a holography projected shape according to one embodiment of the present invention;

FIG. 18 is a diagram for one example of projecting a holography image in accordance with a holography type set for a specific object or screen according to one embodiment of the present invention;

FIG. 32 is a diagram for one example of projecting a holography image in accordance with a holography type by activating one item and then activating a next item automatically according to one embodiment of the present invention;

FIG. 33 is a diagram for one example of providing a preview of a holography type according to one embodiment of the present invention.

DETAILED DESCRIPTION OF EMBODIMENTS OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
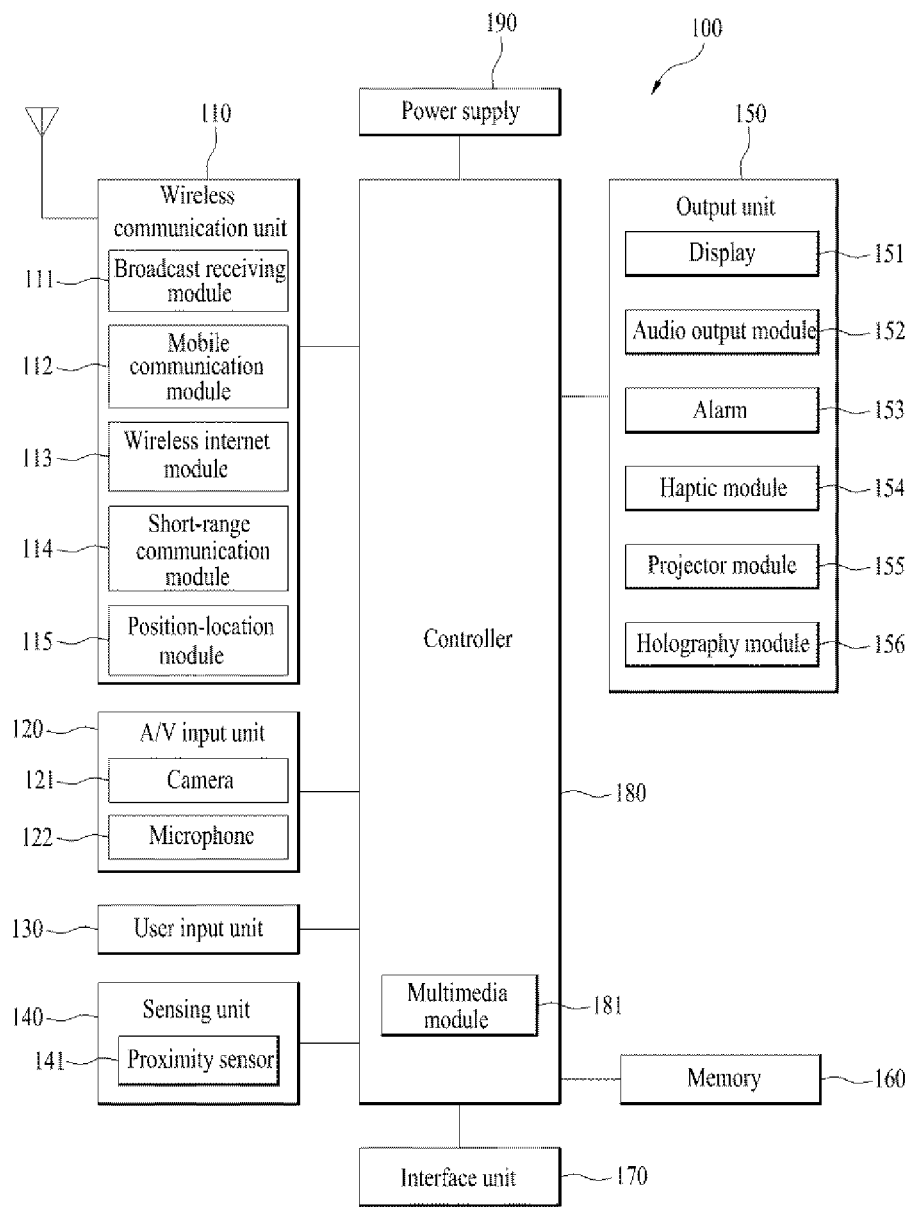
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

Therefore, the sensing unit 140 generates a sensing signal by detecting one of motions in various shapes through a location change and a direction change of the mobile terminal 100. And, at least one function can be executed to correspond to the sensing signal in accordance with each of the motions. Moreover, the relation between the motion and the function executed through the corresponding motion can be saved in the memory unit.

And, the sensing unit 140 is able to sense whether a power is supplied by the power supply unit 190, whether an external device is connected to the interface unit 170, and the like. Besides, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

Subsequently, the holography module 156 may include a holography storing medium and a holography output module. And, the holography module 156 may be able to project a holography image externally.

The holography storing medium is the storing medium for recording an interference pattern generated from interference between an applied object wave and a reference wave and may be formed of such a material reacting with light intensity as photopolymer and the like.

In this case, the holography output module applies a reconstructing wave equal to the reference wave to the holography output module and then outputs a holography image generated from the diffraction effect between the applied reconstructing wave and the interference pattern recorded in the holography storing medium, under the control of the controller 180.

A holography image projecting method shall be described in detail with reference to FIGS. 4 to 7 later.

In the above description, the holography storing medium and the holography output module are implemented in a manner of being included together in the holography module 156, which is just exemplary. Alternatively, the holography storing medium and the holography output module may be separately configured and included in the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, in order to support the holography image projection of the holography module 156, information on the holography interference pattern may be saved. In particular, user's voice, application activated result and the like can be externally outputted via the holography module 156 using the information saved in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

Meanwhile, the sensing unit 140 is able to generate a sensing signal by detecting one of motions in various shapes through the location and direction changes of the mobile terminal 100. And, at least one function can be executed to correspond to the sensing signal in accordance with each of the motions. Moreover, the relation between the motion and the function executed through the corresponding motion can be saved in the memory unit 160.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
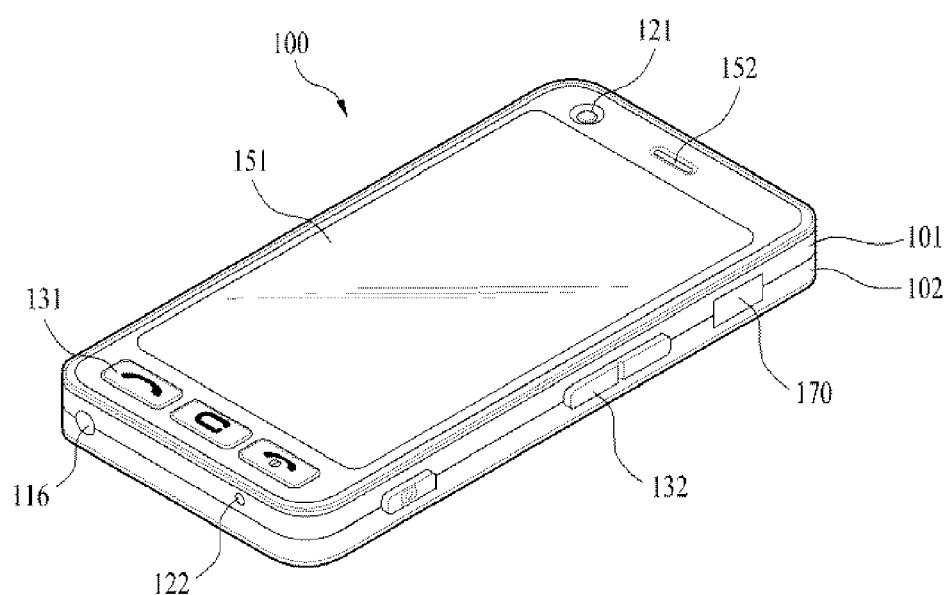
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130, a microphone 122, an interface 170 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be input to the second manipulating unit 132.

Interconnected operational mechanism between the display 151 and the touchpad 135 are explained with reference to FIG. 3 as follows.

Figure 3:
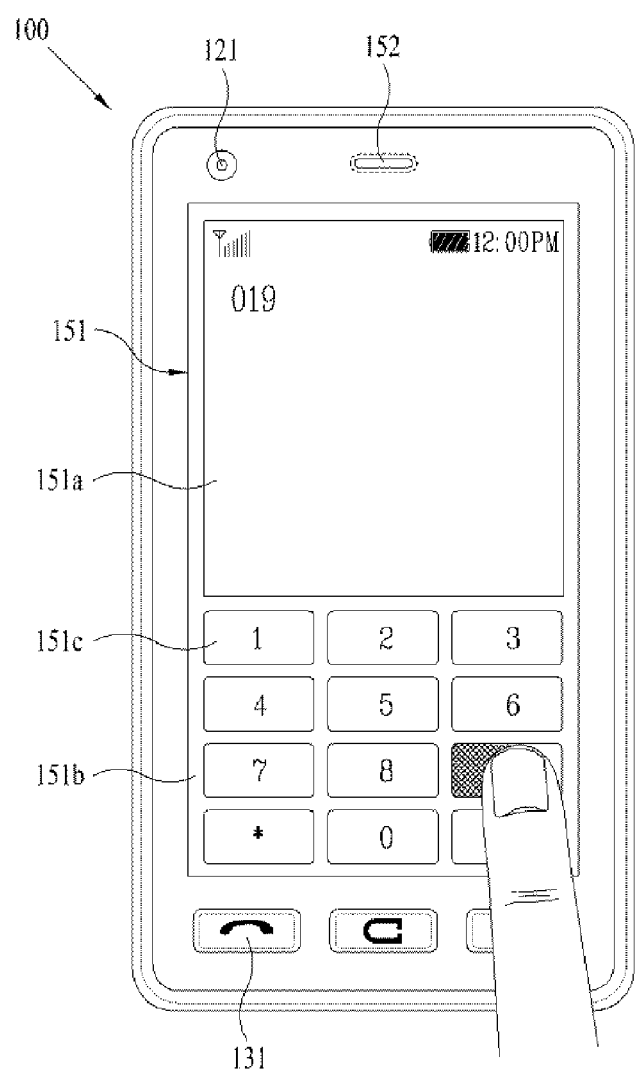
FIG. 3 is a front diagram of a mobile terminal according to one embodiment of the present invention to describe one operating status thereof.

FIG. 3 is a front-view of terminal 100 according to various embodiment of the present invention. Various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is outputted to the input window 151b. If the soft key 151c is touched, a digit corresponding to the touched soft key is output to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

In the following description, a method of representing a holography image in a mobile terminal and a structure therefor, which are applicable to embodiments of the present invention, are explained as follows.

Prior to the detailed description of holography image, a configuration of a mobile terminal including a holography module 156 is described with reference to FIG. 4.

First of all, the holography module 156 may be installed in the mobile terminal in a manner of being loaded on a front side or backside of the mobile terminal.

FIG. 4 is a diagram of a mobile terminal including a holography module according to one embodiment of the present invention.

Figure 4A:
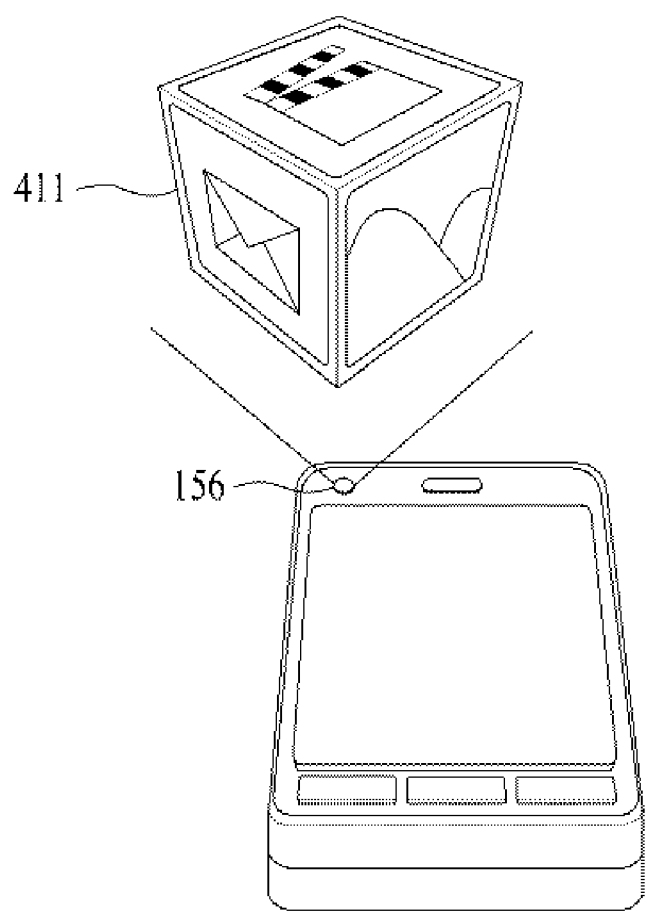
FIG. 4 is a diagram of a mobile terminal including a holography module according to one embodiment of the present invention.

Referring to FIG. 4A, the holography module 156 is provided to the front side of the mobile terminal. In particular, the holography module 156 may be provided to the front side of the mobile terminal together with the camera 121. And, the holography module 156 may be able to project and display a holography image 411 created under the control of the controller 180.

Figure 4B:
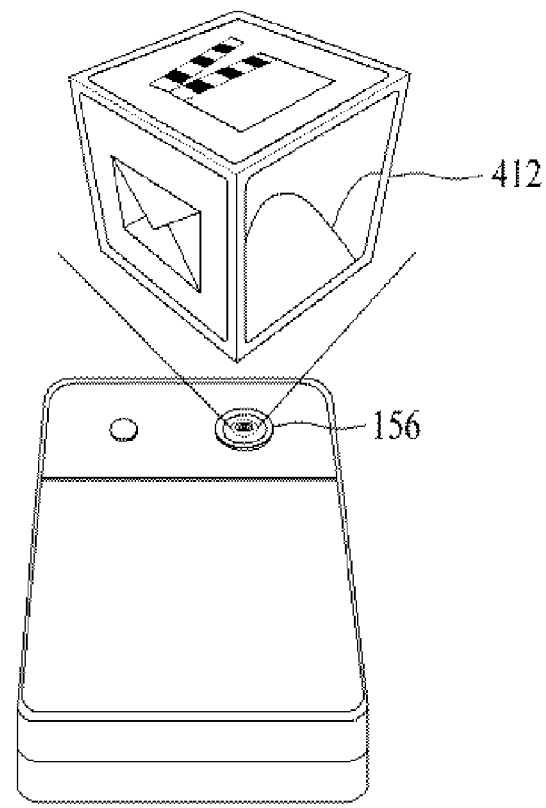

Referring to FIG. 4B, the holography module 156 may be provided to a prescribed portion of the backside of the mobile terminal. In particular, the holography module 156 may be included together with the camera 121. And, the holography module 156 may be able to project and display a holography image 412 created under the control of the controller 180.

The holography images implemented through the holography module 156 may include a planar image and a stereoscopic image both.

In particular, the stereoscopic image implemented through the holography module 156 may be mainly classified into a 2D (2-dimensional) stereoscopic image and a 3D (3-dimensional) stereoscopic image.

Substantially, a 2D stereoscopic image system is a monoscopic system that provides the same image to both eyes. In particular, according to the 2D stereoscopic image system, a polyhedron created using at least one point, at least one line, at least one plane and a combination thereof is placed in a virtual stereoscopic space and an image generated from viewing the placed polyhedron in a specific view is then displayed, under the control of the controller 180.

A 3D stereoscopic image system is a stereoscopic system that provides different images to both eyes, respectively. And, the 3D stereoscopic image system adopts the principle of sensing a 3D effect of an object viewed via bare eyes of a human. In particular, human eyes sense different planar images in viewing the same object due to a distance between both eyes. The sensed different planar images are delivered to a brain through retinas. And, the brain synthesizes the delivered different images together to sense depth and reality of the corresponding stereoscopic image. Although there is a slight difference between humans, binocular disparity attributed to a distance between both eyes enables a 3D effect. Thus, the 3D stereoscopic image system may correspond to a method of displaying an image using this binocular disparity.

Holography image created through the holography module 156 may include both of the planar image and the stereoscopic image. For clarity and convenience of the following description, assume that the holography image may be displayed by the 2D stereoscopic image system, by which the present invention may be non-limited.

In the following description, a method of representing a holography image in a mobile terminal and a structure therefor, which are applicable to embodiments of the present invention, are explained in detail as follows.

First of all, a holography image representing method may be understood as an image displaying method of simultaneously cumulating and playing all informations (i.e., amplitude and phase) on a light (i.e., wave motion), whereas a related art image is a recording of distribution of bright and dark sides of an object.

A holography image representing method is described with reference to FIG. 5 as follows.

Figure 5A:
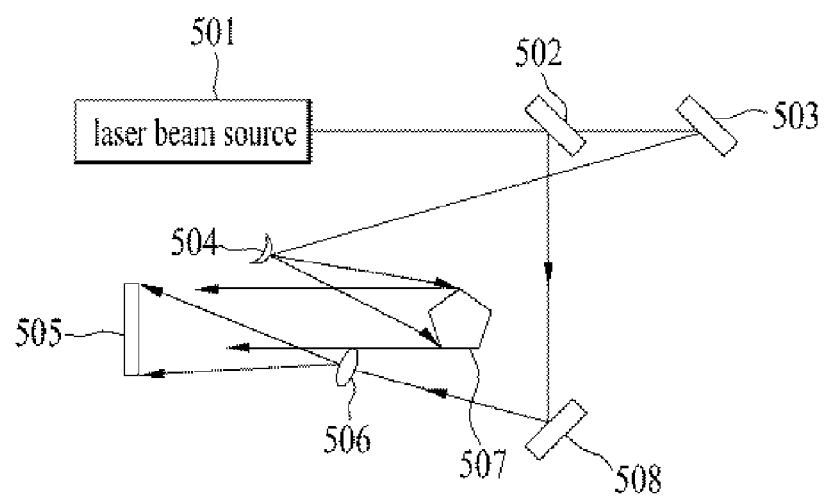
FIG. 5 is a diagram for explaining holography principle conceptionally.
Figure 5B:
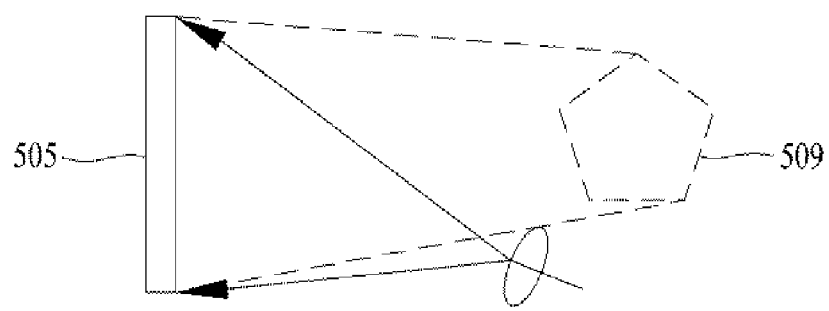

FIG. 5 is a diagram for explaining holography principle conceptually.

Referring to FIG. 5 (*a*), a coherent light from a laser beam source 501 is slit into two beams via a splitter 502.

In particular, if one of the two beams is applied to a subject 507, a surface of the subject reflects the corresponding light. And, this beam will be named an object wave in the following description.

The other beam is diffused through a lens 506 to be directly applied to a front face of a holography photosensitive material 505. And, this beam will be named a reference wave in the following description. Reflectors 503, 504 and 508 are also shown.

As the object wave and the reference wave cause an interference effect in-between, about 500~1,500 delicate and complicated interference patterns per 1 mm are generated. And, a photo of recording these interference patterns is called a hologram.

Referring to FIG. 5 (*b*), if such a beam as the generated reference wave is projected on the photosensitive material 505, a light diffracts at a position different from an incident direction of the reference wave in a manner of being affected by the interference patterns. Subsequently, the diffractive lights gather together to form the light initially reflected by the object. Hence, a holography image 509 is projected. In particular, an initial object wave is reconstructed from hologram. And, an image representing method using the reconstructed initial object wave may be named a holography image representing method.

Looking into an inside of a reconstructed wave surface, an object is initially seen as if situated inside. If a viewing point moves, a viewed position of the object changes correspondingly. Moreover, since an original wave surface of the object is reconstructed, it may interfere with a wave surface coming from a slightly modified object.

A holography image representing method may be classified into a transmittive type holography image representing system and a reflective type holography image display system.

(1) Transmittive Type Holography Image Representing System

According to the transmittive type holography image representing system, an image generated from light, which transmits a hologram if applied in rear of the hologram, is observed in front of the hologram. In the transmittive type holography image representing system, an object wave and a reference wave are applied to a photo film in the same direction to generate a holography image. And, the generated holography image is characterized in having clear and bright colors.

(2) Reflective Type Holography Image Displaying System

According to the reflective type holography image displaying system, an image generated from light, which is reflected if applied in front of the hologram, is observed in front of the hologram. In the reflective type holography image displaying system, an object wave and a reference wave are incident on a photosensitive material in directions opposite to each other, respectively. And, the holography image generated by the reflective type holography image displaying system is characterized in having an excellent 3D effect.

The transmittive type holography image representing system and the reflective type holography image displaying system are described in detail with reference to FIG. 6 and FIG. 7 as follows.

FIG. 6 is a diagram for conceptionally explaining a transmittive type holography system.

Figure 6A:
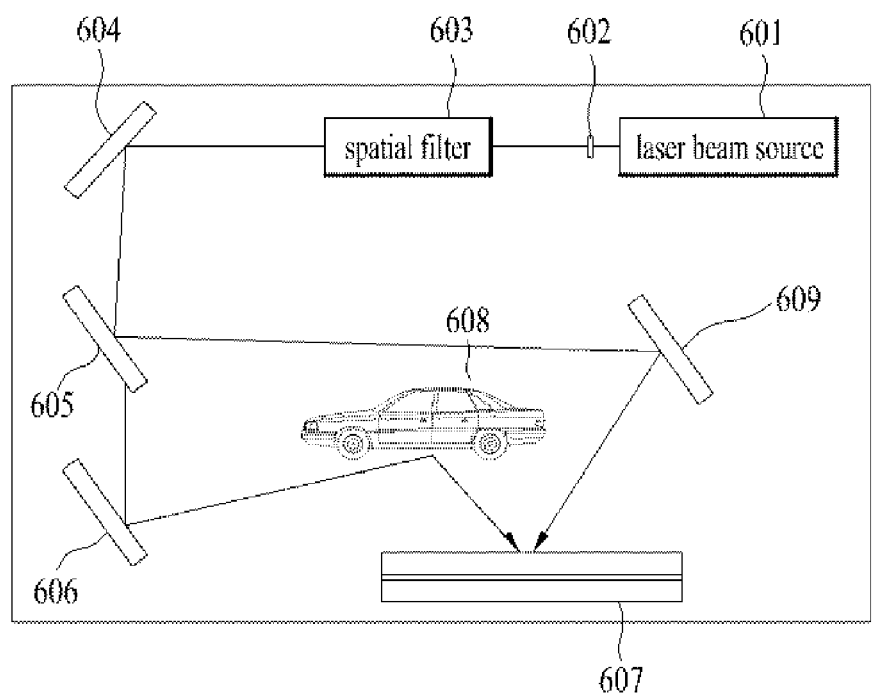
FIG. 6 is a diagram for conceptionally explaining a transmittive type holography system.

Referring to FIG. 6A, a light from a laser beam source 601 passes through a lens 602 and then through a spatial filter 603 and is then spread as a smooth spherical wave. The spherical wave is reflected by reflector 604 and is split into two beams by a 50:50 beam splitter 605. One of the two beams of the spherical wave is reflected by reflector 606 and illuminates, an object 608 to produce an object wave, while the other is reflected by reflector 609 and intactly illuminates a film 607 to produce a reference wave. In doing so, the object wave created from the object 608 illuminates the film 607 as well.

Subsequently, the object and reference waves having illuminated the film 607 cause an interference effect on each other to produce an interference pattern. The interference pattern is then imprinted on the film 607.

Figure 6B:
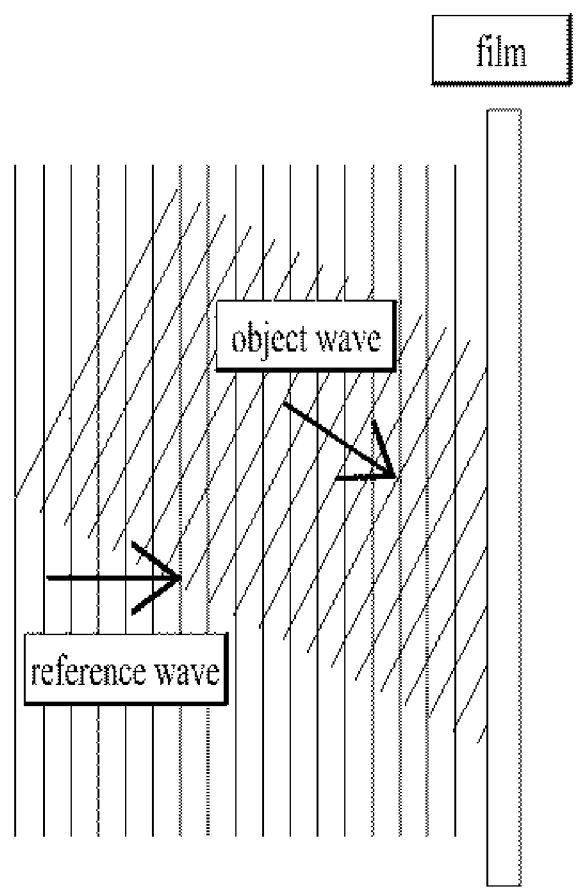

In particular, referring to FIG. 6B, the object wave and the reference wave are projected on the same surface of the film 607 to produce the interference pattern.

Figure 6C:
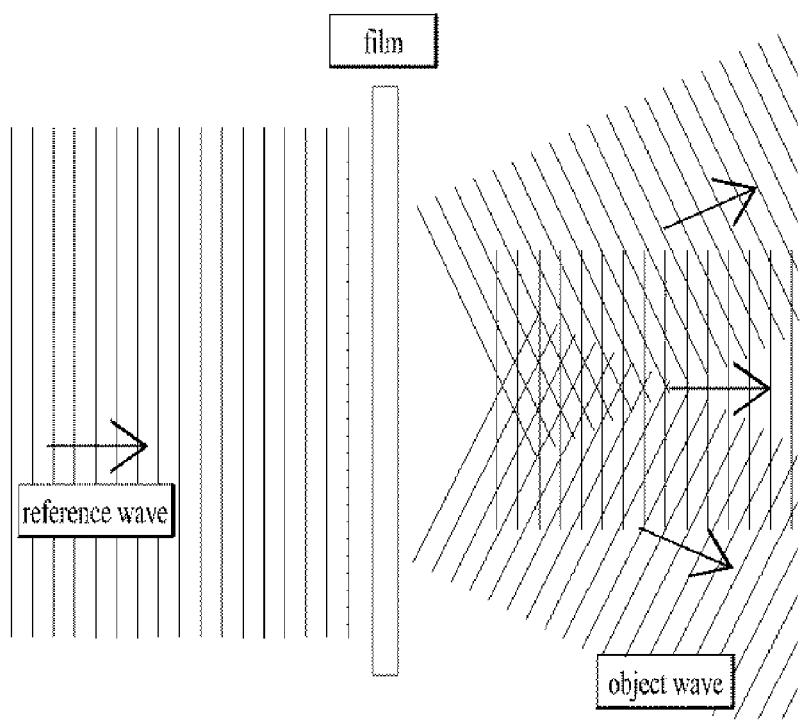

Subsequently, referring to FIG. 6C, if the reference wave is projected on the film 607, an object wave transmits in a direction of a surface opposite to the incident surface of the previous object and reference waves, thereby creating a holography image.

Figure 7A:
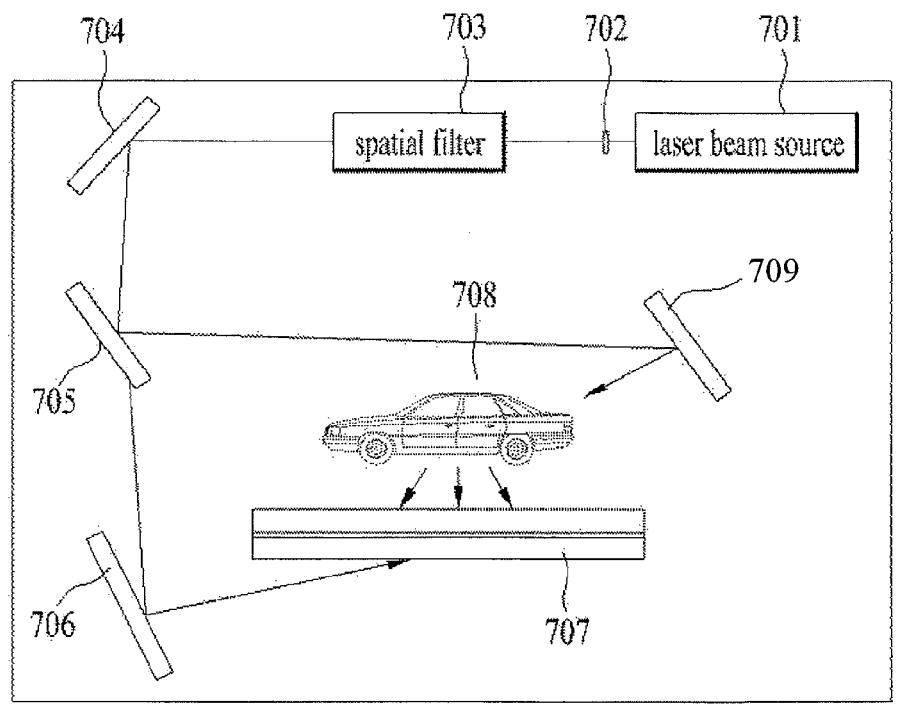
FIG. 7 is a diagram for conceptionally explaining a reflective type holography system.
Figure 7B:
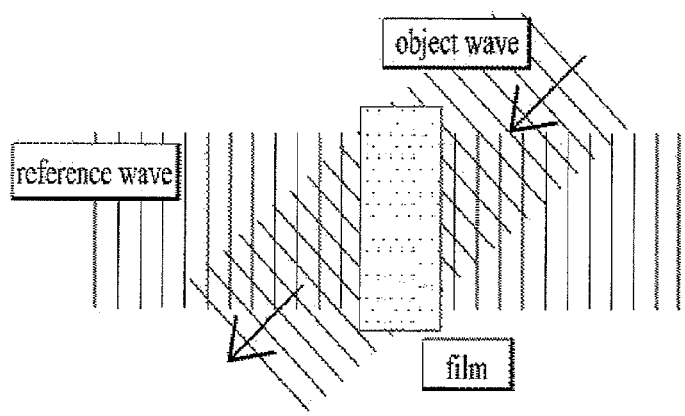
Figure 7C:
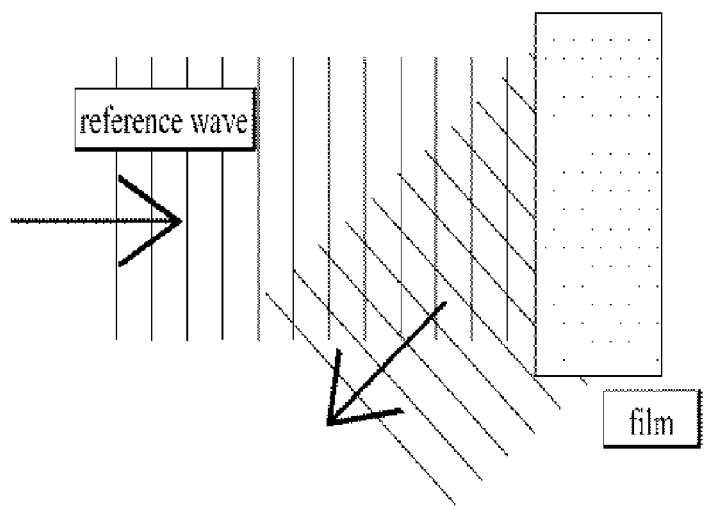

FIG. 7 is a diagram for conceptionally explaining a reflective type holography system.

Referring to FIG. 7A, like FIG. 6A, a light from a laser beam source 701 passes through a lens 702 and then through a spatial filter 703 and is then spread as a smooth spherical wave. The spherical wave is split into two beams by a 50:50 beam splitter 705. One of the two beams of the spherical wave illuminates an object 708 to produce an object wave, while the other intactly illuminates a film 707 to produce a reference wave. Reflectors 704, 706 and 709 are also illustrated.

Unlike FIG. 6A, FIG. 7A shows that the reference wave and the object wave illuminate the film 707 in directions opposite to each other, respectively.

In particular, the reference wave is projected on a left surface of the film 707 and the object wave is projected on a right top surface of the film 707. Subsequently, referring to FIG. 7C, if the reference wave is projected on the film, the object wave transmits the film in opposite direction to create a holography image.

In the above descriptions, each of the films 607 and 707 is represented as a holography storing medium and another component capable of creating a holography image by emitting a light to the film is represented as a holography output module in this specification.

As mentioned in the foregoing description, for clarity and convenience of the description of this specification, the holography storing medium and the holography output module are implemented in a manner of being included in the holography module 156, which is just exemplary. Alternatively, the holography storing medium and the holography output module may be included as separate components in the mobile terminal 100.

For clarity and convenience, assume that a mobile terminal mentioned in the following description includes at least one of the components shown in FIG. 1 and that a display unit 151 includes a touchscreen.

Generally, a graphic of an arrow or finger type to point out a specific object or select a menu on the display unit 151 is called a pointer or a cursor.

Specifically, the pointer may be frequently regarded as a finger or a stylus pen for a touch manipulation or the like.

In this specification, in order to clearly discriminate the pointer and the cursor from each other, a graphic displayed on the display unit 151 may be named a cursor, while such a physical means for performing a touch, a proximity touch, a gesture and the like as a finger, a stylus pen and the like may be named a pointer.

As mentioned in the foregoing description, a holography image may include a planar image and a stereoscopic image both. For clarity and convenience of the following description, assume that a holography image is displayed by 2D stereoscopic image system.

Meanwhile, a holography image according to one embodiment of the present invention may be displayed in accordance with a set holography pattern.

In this case, the holography pattern may mean that a holography image projected via the holography module 156 is changed into a preset pattern in accordance with a time so as to be provided to a user.

The holography pattern may be set in various ways as follows.

First of all, it may be able to set a holography pattern in a manner of varying a distance difference between a holography output module and a holography image in accordance with time.

In particular, as the distance difference between the holography output module 156 and the holography image is changed in accordance with time, the holography image projected via the holography module 156 may be shifted upward and downward, thereby enabling a setting of a prescribed holography pattern.

It may be able to set a holography pattern in a manner of varying a shape of a holography image projected by the holography module 156.

For instance, the controller 180 controls a holography image projected by the holography module 156 to have a circular shape in the first time and then controls the pattern of the holography image to be changed into a rectangular shape. Thus, as the shape of the holography image is changed into various forms in accordance with time, a setting of the holography pattern is enabled.

It may be able to apply a method of shifting or rotating a holography image projected by the holography module 156 in right or left direction.

In particular, while a distance difference between a holography module and a holography image is constantly maintained, it may be able to set a holography pattern in a manner of moving or rotating the projected holography image in right and left directions in accordance with time or rotating the projected holography image by moving it in right and left directions.

It may be able to set a holography pattern in a manner of modifying a color or size of a projected holography image in accordance with time or controlling a holography image to flicker. And, it may be able to set a holography pattern in a manner of controlling at least one of projection brightness, play frequency, illumination, vibration feedback, sound insertion, image insertion, repetitive projection and the like.

Although the above description is based on the assumption that a holography pattern is set by an individual factor, it may be able to set a holography pattern by a plurality of factors.

For instance, it may be able to set a holography pattern in a manner of moving an rotating a projected holography image in left and right directions by changing a distance difference between the holography module 156 and a holography image in accordance with time.

The above description is made on the assumption that a holography pattern is set for a whole holography image, which is just exemplary. Optionally, it may be able to apply a holography pattern to a prescribed portion of the holography image.

In the following description, a holography pattern set for a holography image is explained in detail with reference to FIGS. 8 to 10.

First of al, a holography pattern may be set in a manner of adjusting a distance difference between a holography image and a terminal.

In particular, a holography pattern may be controlled to display a pattern of moving a projected holography image upward and downward by increasing or decreasing a distance difference between a holography image and a terminal in accordance with time.

This is described with reference to FIG. 8 as follows.

FIG. 8 is a diagram for one example of setting a holography pattern by adjusting a distance difference between a holography image and a terminal according to one embodiment of the present invention.

Figure 8A:
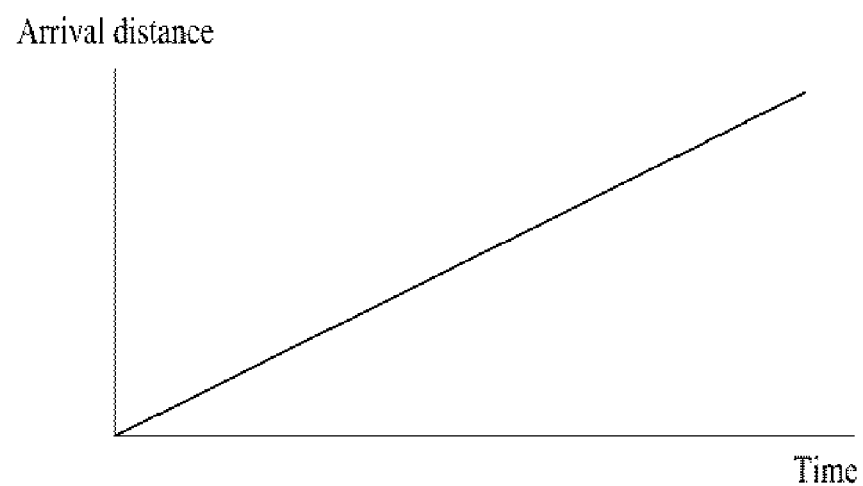
FIG. 8 is a diagram for one example of setting a holography pattern by adjusting a distance difference between a holography image and a terminal according to one embodiment of the present invention.

Referring to FIG. 8A, a distance difference between a holography image and a terminal is set to increase in proportion to time.

Figure 8B:
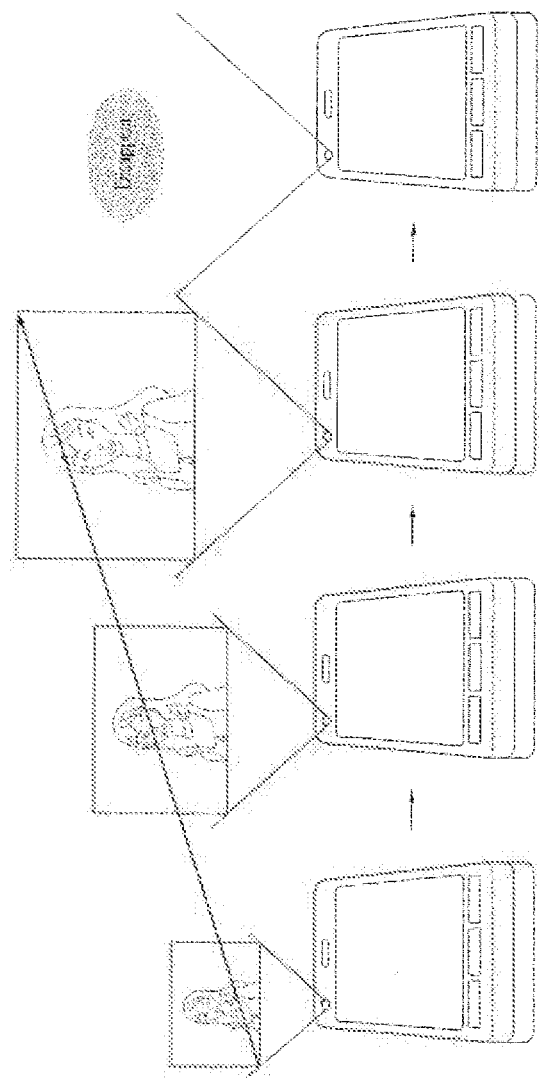

Referring to FIG. 8B, a holography image projected from a terminal moves upward by getting distant from the terminal as time goes by. If the total time set in FIG. 8A expires, the projected holography image disappears.

Hence, by adjusting a distance difference between a holography image and a terminal, it may be able to form a pattern of moving a projected holography image upward and downward.

It may be able to control a holography pattern to be set by changing a projected shape of a holography image.

In particular, by moving an image projected by the holography module 156 in right and left directions, rotating the projected image, or changing a size of the projected image, it may be able to change a shape of a projected holography image.

In the above description, a holography pattern may be formed by moving or rotating an image, which is exemplary. Alternatively, it may be able to form a holography pattern in a manner of changing a displayed shape by maintaining a same distance difference between a terminal and a projected holography image.

This is described with reference to FIG. 9 as follows.

FIG. 9 is a diagram for one example of setting a holography pattern by modifying a holography projected shape according to one embodiment of the present invention.

Figure 9A:
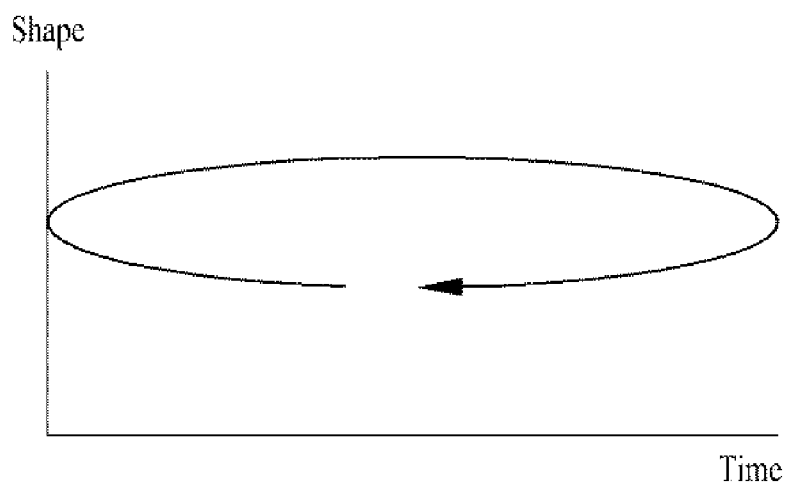
FIG. 9 is a diagram for one example of setting a holography pattern by modifying a holography projected shape according to one embodiment of the present invention.

Referring to FIG. 9A, a projected holography image is set to rotate by maintaining the same distance from a terminal.

Accordingly, referring to FIG. 9B, the image projected from the terminal rotates in accordance with elapse of time by maintaining the same distance difference from the terminal.

Moreover, it may be able to set a holography pattern by changing a distance difference between a holography image and a terminal and a shape of a projected holography image together.

In particular, it may be able various kinds of holography patterns by changing a distance difference between a holography image and a terminal in accordance with time and also changing a shape of the holography image This is described with reference to FIG. 10 as follows.

FIG. 10 is a diagram for one example of setting a holography pattern by adjusting a distance difference and a holography projected shape according to one embodiment of the present invention.

Referring to FIG. 10A, a distance difference between a holography image and a terminal is set to be maintained constantly, decreased and then increased in accordance with time. And, assume that the holography image is projected by rotating.

Accordingly, referring to FIG. 10B, a holography image projected by the holography module 156 is displayed by maintaining a distance difference from a terminal, a distance difference between the holography image and the terminal is decreased and then increased, while the holography image keeps being rotated and projected.

Therefore, as the holography image is moving and rotating simultaneously, it may be able to provide a user with various effects.

Meanwhile, a holography image may be projected in a manner of being included in a prescribed region of a previously designated holography background image.

A holography background image may include a closed curve implemented into a combination of at least one of a straight line, a line bent at a prescribed angle, a branch line, a curved line and the like. For instance, the closed curve shape may include one of a circle, a triangle, a quadrangle, a pentagon, a diamond shape and the like and may be implemented in various ways in accordance with user manipulations.

A holography background image, like a holography image, may be implemented by 2D stereoscopic image system or 3D stereoscopic image system. In particular, the 3D stereoscopic image system follows a stereoscopic method of providing different images to both eyes, respectively.

A content of a holography image may be displayed on a whole region or a partial region of a holography background. Moreover, a holography background is partitioned into a plurality of regions by a user manipulation to display contents of a plurality of holography images thereon.

For instance, after a holography background of a television shape has been partitioned into 4 sections, 4 different image contents may be projected as a holography image on the 4 sections, respectively.

FIG. 11 is a diagram for one example of setting a holography background according to one embodiment of the present invention.

In FIG. 11, assume that a prescribed shape is recognized via the touchscreen and that a holography background corresponding to the recognized shape is set. Yet, this assumption is just exemplary. Alternatively, it may be able to set a holography background by such a different method as a menu manipulation and the like.

Figure 11A:
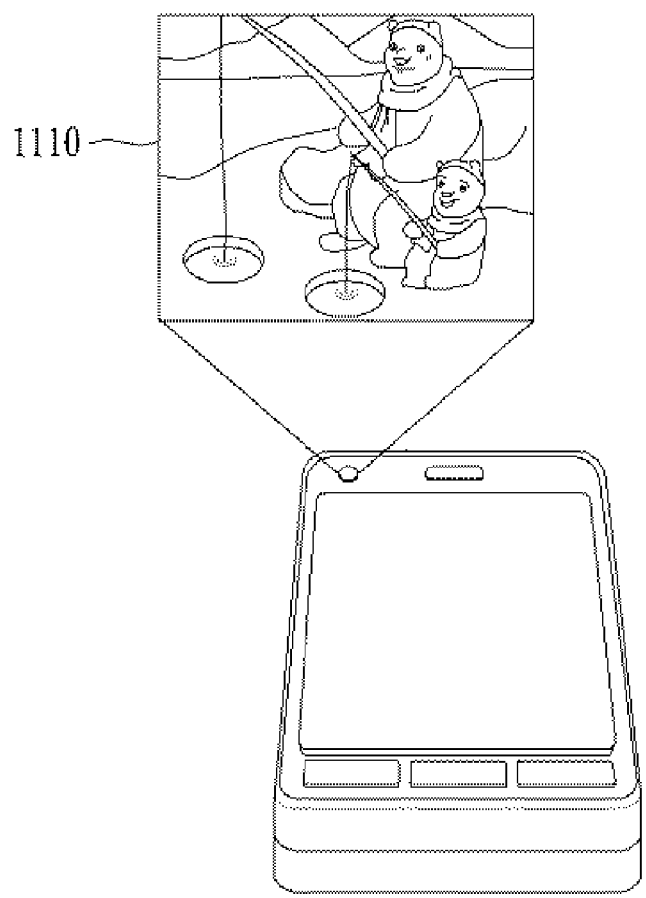
FIG. 11 is a diagram for one example of setting a holography background according to one embodiment of the present invention.

Referring to FIG. 11A, an image content 1110 is projected as a holography image.

Figure 11B:
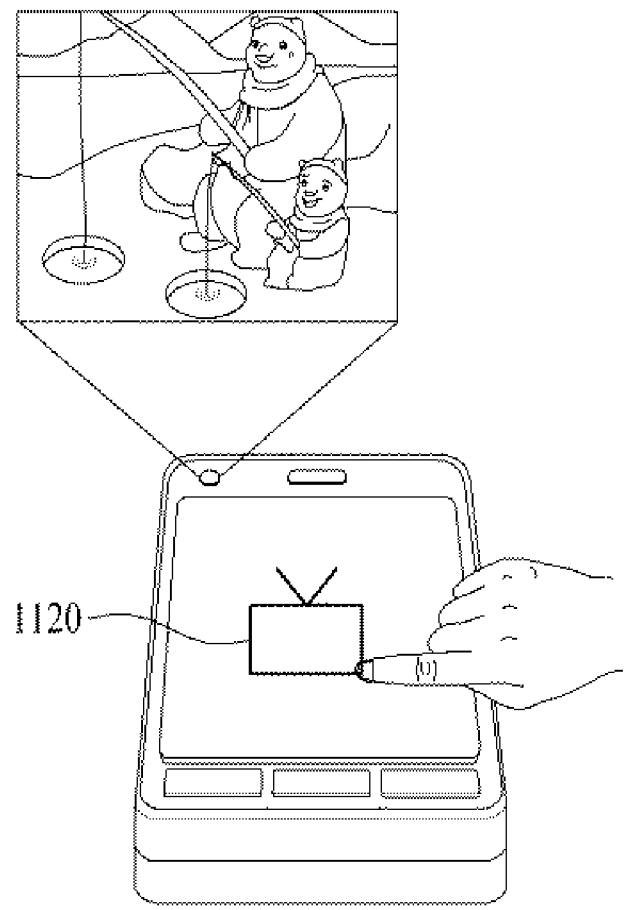

In doing so, referring to FIG. 11B, a user may input a 1st shape 1120 via the touchscreen. If the 1st shape 1120 is inputted, the controller 180 determines a holography background corresponding to the 1st shape 1120 and may control a holography image to be projected in a manner that the image content 1110 is included within the determined holography background.

The controller 180 may control the touchscreen to display a list of candidates for a plurality of holography backgrounds applicable in association with the 1st shape 1120.

Figure 11C:
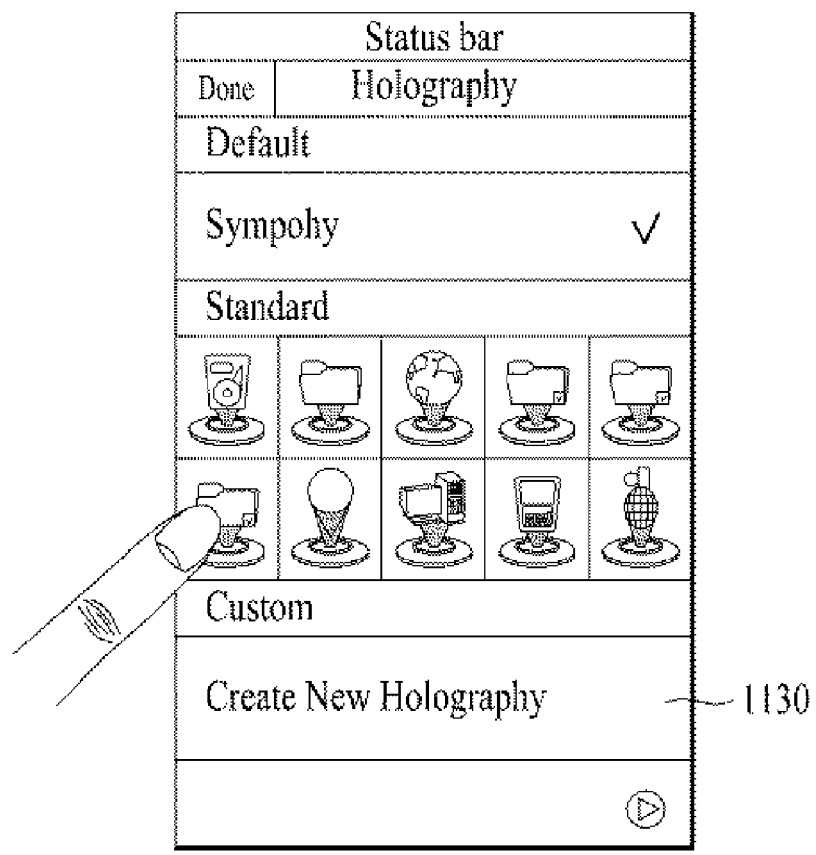

In doing so, the list may be displayed as thumbnails, which is shown in FIG. 11C.

Referring to FIG. 11C, a candidate list 1130 of holography backgrounds settable to correspond to the 1st shape 1120 may be displayed as thumbnails. A user may be able to select a prescribed holography background from the displayed holography background candidate list 1130.

Figure 11D:
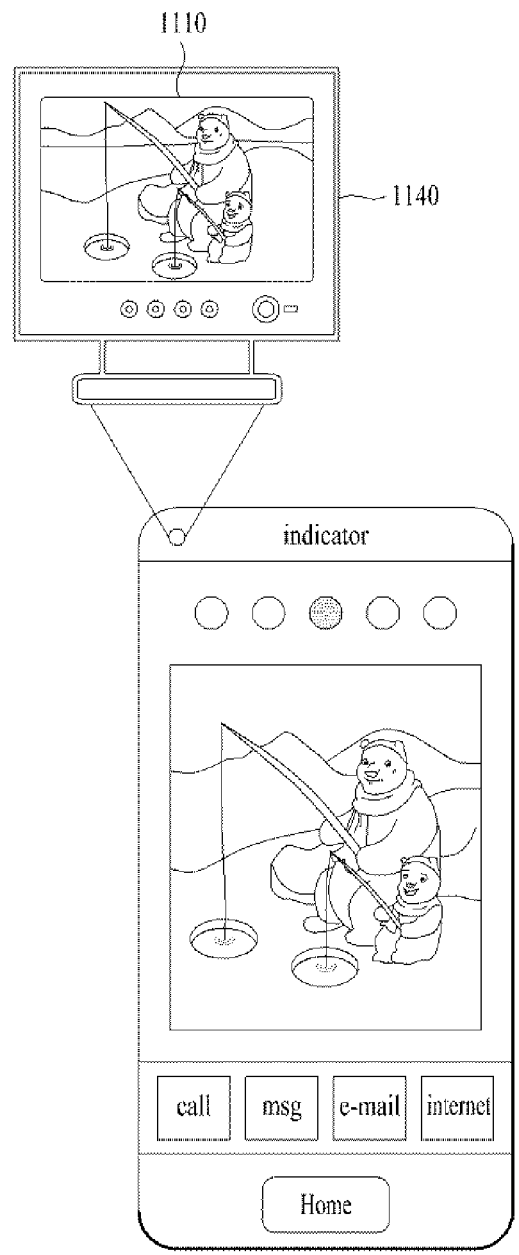

Referring to FIG. 11D, the controller 180 controls the holography module to output a holography image in a manner that the image content 1110 is displayed on a prescribed region within the selected holography background 1140.

FIG. 12 is a diagram for one example of displaying a plurality of image contents on a predetermined region within a holography background according to one embodiment of the present invention.

In FIG. 12, assume that a content projected as a holography image includes an image content.

In FIG. 11, assume that a prescribed shape is recognized via the touchscreen and that a holography background corresponding to the recognized shape is set. Yet, this assumption is just exemplary. Alternatively, it may be able to set a holography background by such a different method as a menu manipulation and the like.

As mentioned in the foregoing description, an image content may be displayed on a whole or partial region of a holography background and a ratio of this region may be randomly modified by a user. Moreover, a holography background is partitioned into a plurality of regions and a plurality of image contents may be displayed on a plurality of the regions, respectively.

Figure 12A:
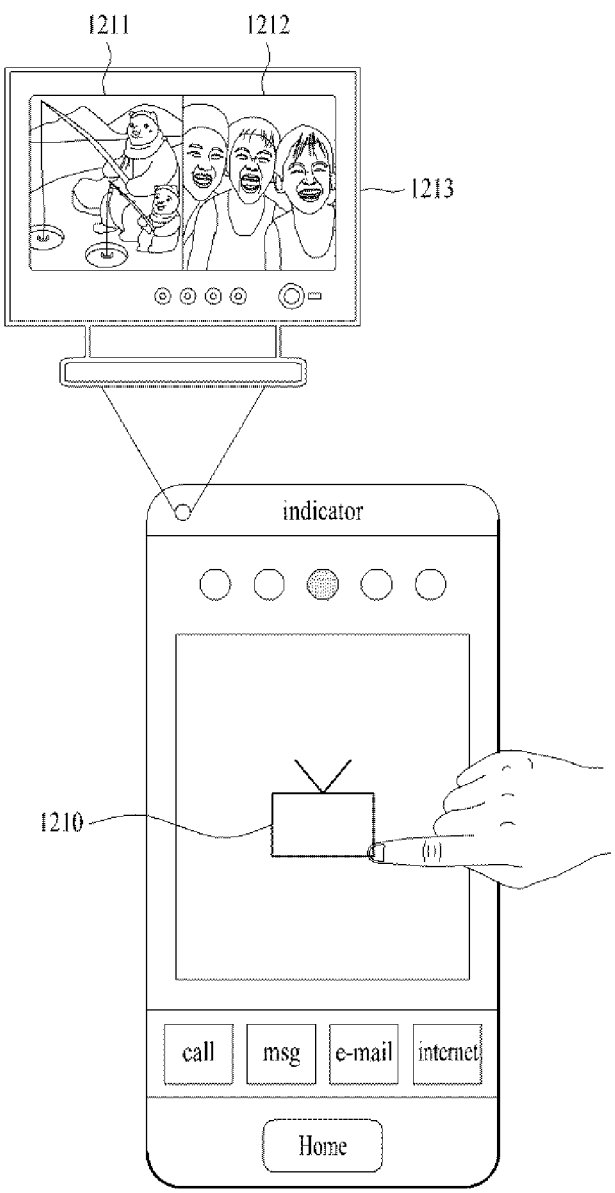
FIG. 12 is a diagram for one example of displaying a plurality of image contents on a predetermined region within a holography background according to one embodiment of the present invention.

Referring to FIG. 12A, a user may input a 1st shape 1210 via the touchscreen. If the 1st shape 1210 is inputted, the controller 180 determines a holography background 1213 corresponding to the 1st shape 1210 and may control a holography image to be projected in a manner that an image content is included within the determined holography background 1213.

In FIG. 12A, the image content is designated to be displayed on a region amounting to 80% of the holography background 1213. The region amounting to 80% of the holography background 1213 is divided into two regions 1211 and 1212. And, two image contents are displayed on the two regions 1211 and 1212 as a holography image, respectively.

Figure 12B:
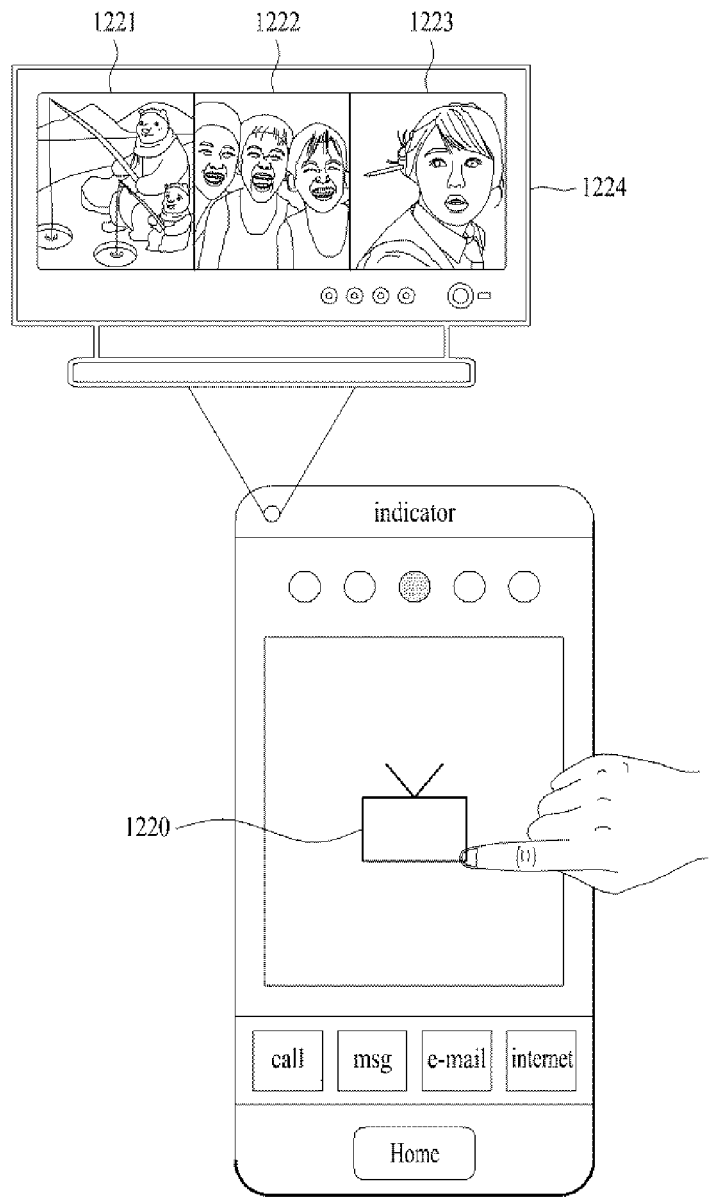

Referring to FIG. 12B, a user may input a 2nd shape 1220 via the touchscreen. If the 2nd shape 1220 is inputted, the controller 180 determines a holography background 1224 corresponding to the 2nd shape 1220 and may control a holography image to be projected in a manner that an image content is included within the determined holography background 1213.

In FIG. 12B, the image content is designated to be displayed on a region amounting to 85% of the holography background 1224. The region amounting to 85% of the holography background 1224 is divided into 3 regions 1221, 1222 and 1223. And, 3 image contents are displayed on the 3 regions 1221, 1222 and 1223 as a holography image, respectively.

FIG. 13 is a diagram for a detailed example of a holography background according to one embodiment of the present invention.

Figure 13A:
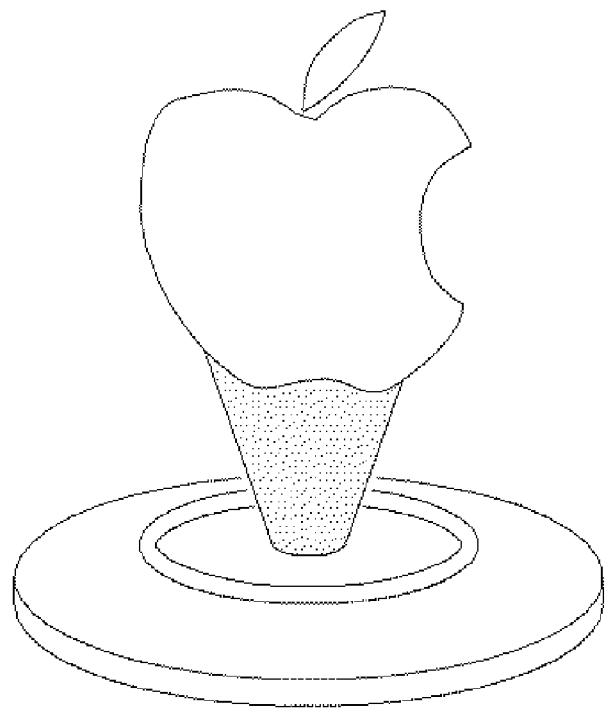
FIG. 13 is a diagram for one detailed example of a holography background according to one embodiment of the present invention.

In particular, FIG. 13A shows one example of implementing a holography background of an apple shape.

Figure 13B:
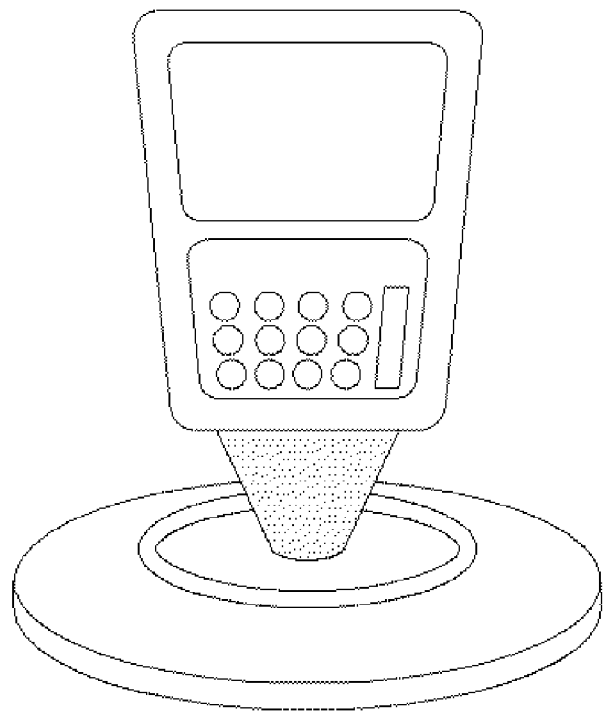

FIG. 13B shows one example of implementing a holography background of a calculator shape.

Figure 13C:
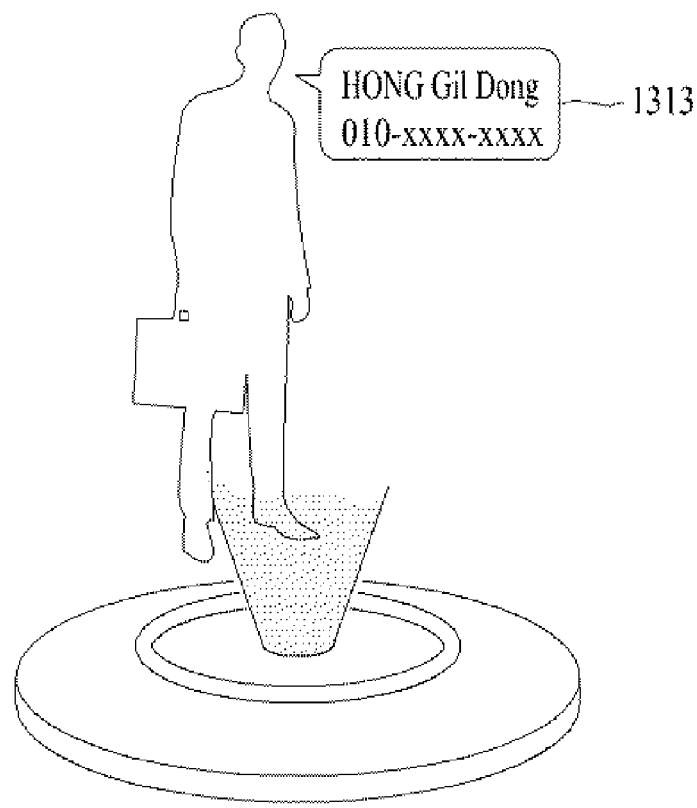

FIG. 13C shows one example of implementing a holography background of a character shape. In doing so, a detailed information 1313 on an object may be displayed on a prescribed region of the holography background as well.

Figure 13D:
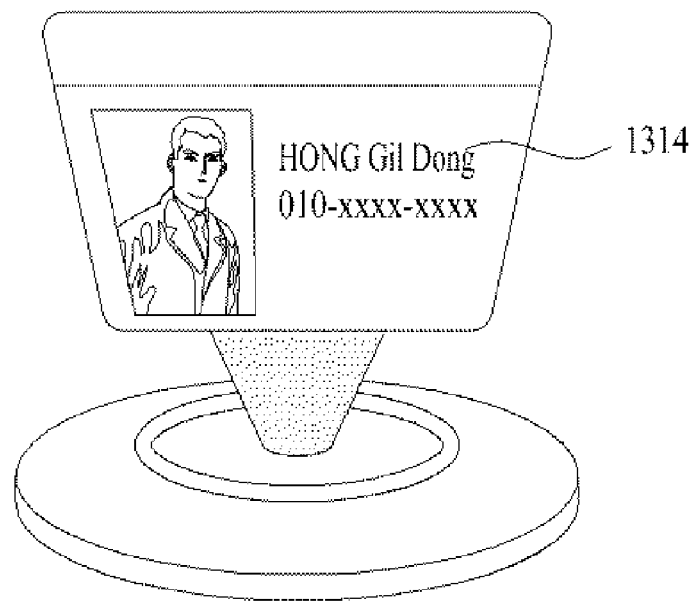

FIG. 13D shows one example of implementing a holography background of a business card shape. In doing so, a detailed information 1314 on an object may be displayed on a prescribed region of the holography background as well.

Figure 13E:
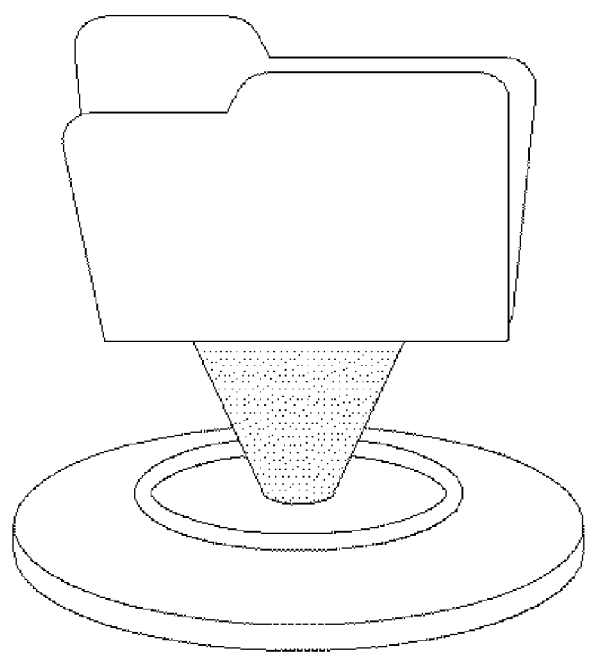

FIG. 13E shows one example of implementing a holography background of a folder shape.

Figure 13F:
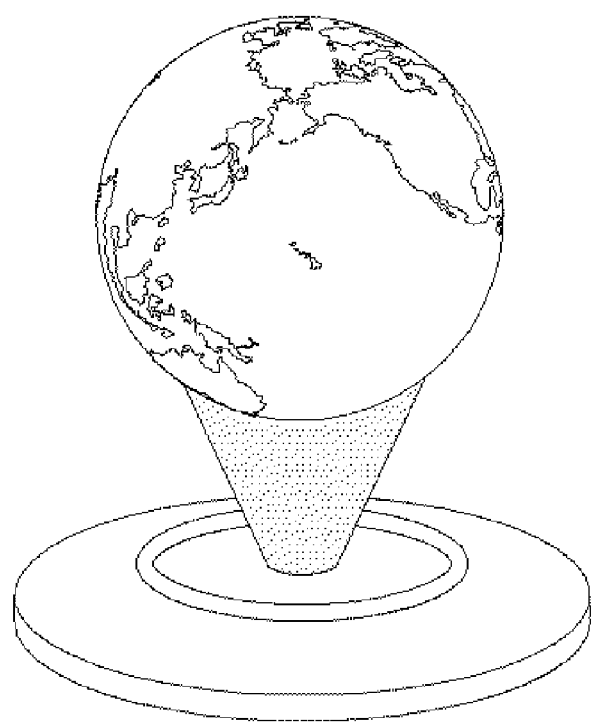

FIG. 13F shows one example of implementing a holography background of a globe shape.

Figure 13G:
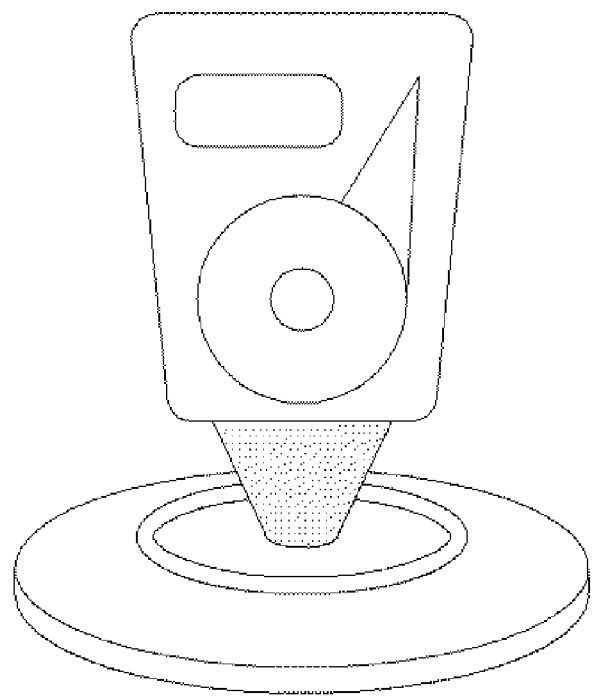

FIG. 13G shows one example of implementing a holography background of a video image shape.

Figure 13H:
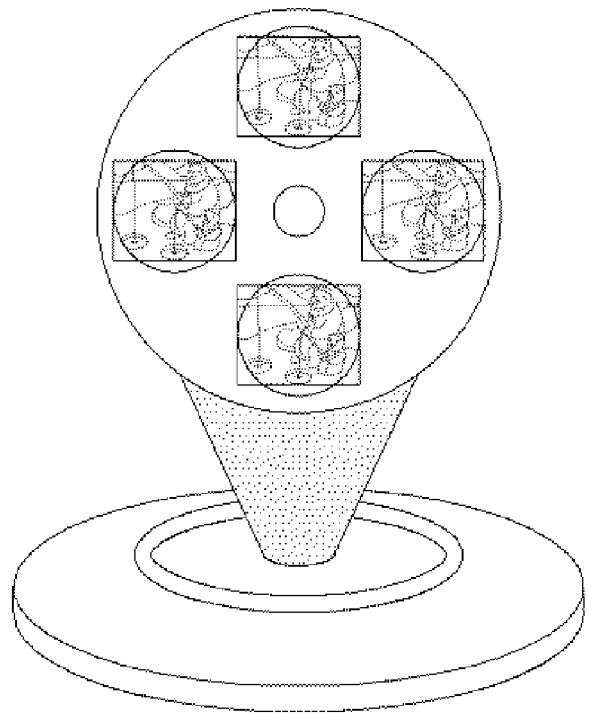

FIG. 13H shows one example of implementing a holography background of a gallery shape. In doing so, a plurality of image contents may be projected as a gallery shape together with the holography background.

Figure 13I:
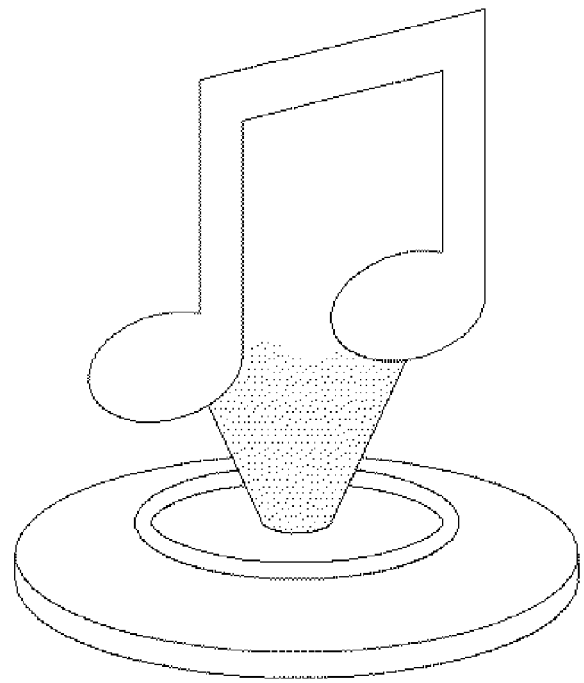

FIG. 13I shows one example of implementing a holography background of a music image shape.

Figure 13J:
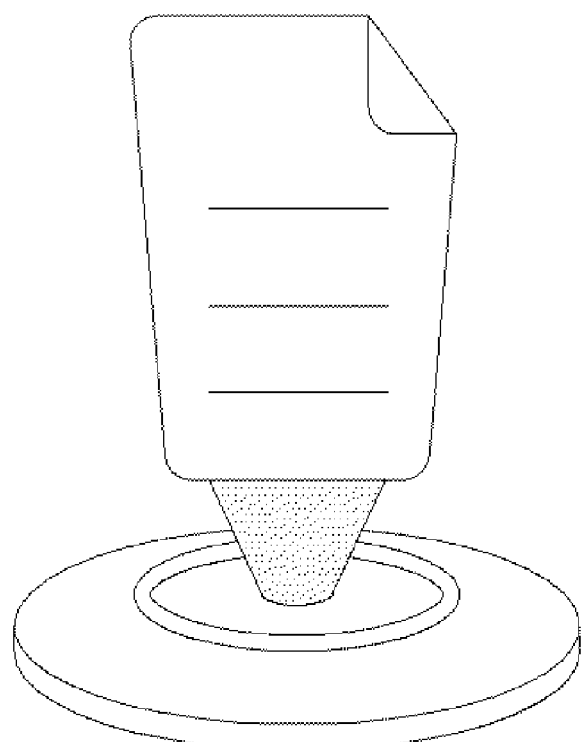

FIG. 13J shows one example of implementing a holography background of a memo shape.

Figure 13K:
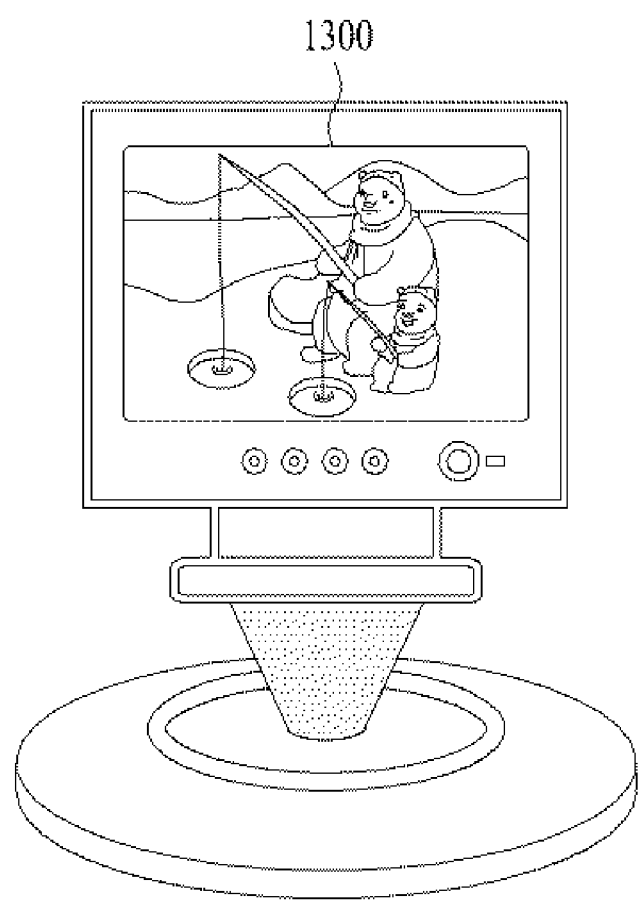

FIG. 13K shows one example of implementing a holography background of a TV image shape.

Yet, the above-mentioned holography backgrounds are just exemplary. More holography backgrounds may be implemented in various ways using the closed curve shape including a closed curve implemented into a combination of at least one of a straight line, a line bent at a prescribed angle, a branch line, a curved line and the like.

Meanwhile, a user may be able to set a specific object or screen, which is to be projected as a holography image, according to one embodiment of the present invention.

First of all, an object, which can be projected as a holography image, may include one of an address book, a plurality of applications, a name of a specific object, a plurality of contents and the like. In particular one of an address book, a plurality of applications and a plurality of contents may be displayed as a holography image or a name of a specific object may be displayed as a holography image. Yet, the above description is just exemplary. Optionally, a user may be able to randomly designate a new target or change a target.

Moreover, a screen, which can be projected as a holography image, may include a whole or partial region displayed on the display unit.

In particular, a part, which will be projected as a holography image, may be set on a whole screen of the display unit. For instance, a screen amounting to 70% of the display unit may be set to be projected as a holography image.

This is described in detail with reference to FIG. 15 and FIG. 15 as follows.

FIG. 14 is a diagram for one example of an object, which can be projected as a holography image, according to one embodiment of the present invention.

Figure 14A:
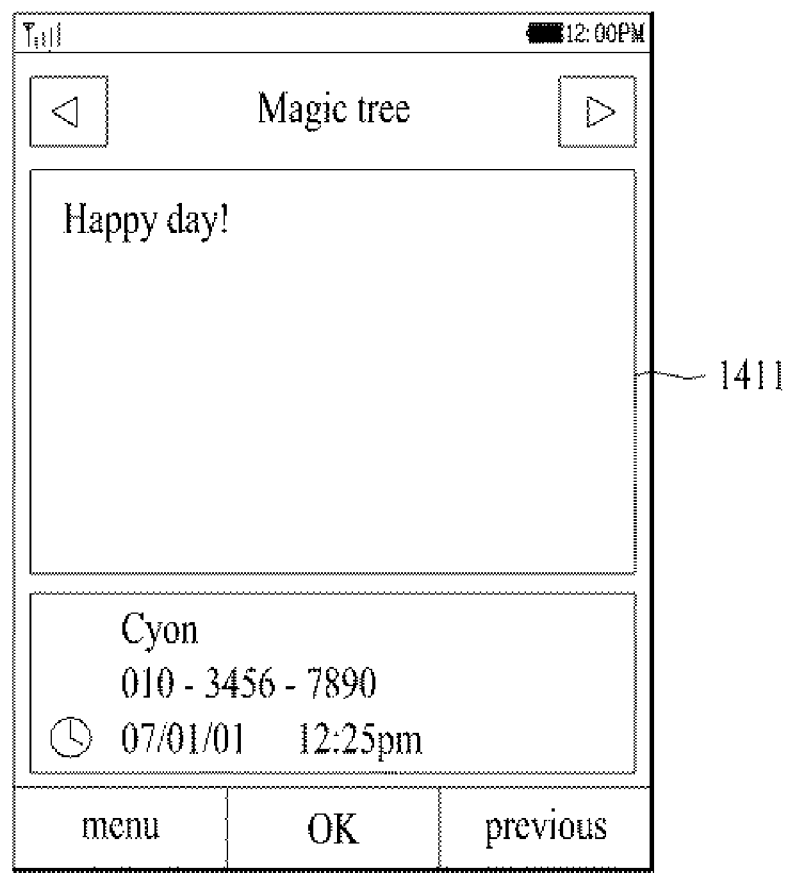
FIG. 14 is a diagram for one example of an object to be projected as a holography image according to one embodiment of the present invention.

Referring to FIG. 14a, a text 1411 included in a message may be to be projected as a holography image.

Figure 14B:
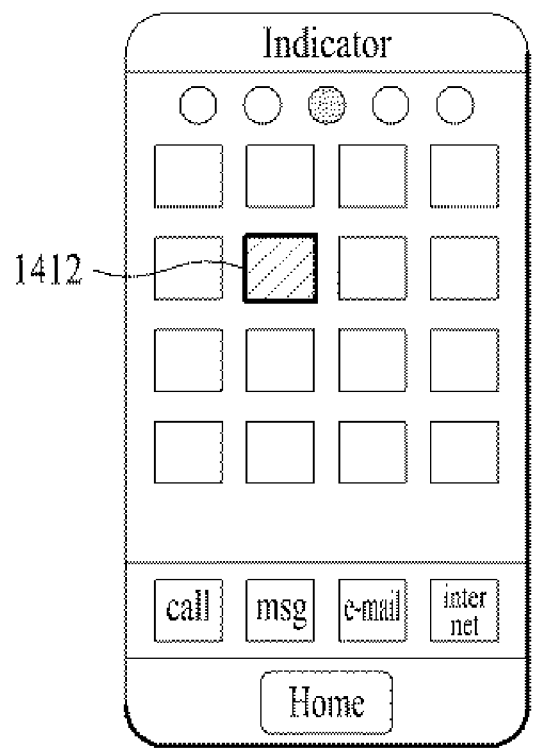

Referring to FIG. 14B, a specific icon 1412 among a plurality of icons may be projected as a holography image. In this case, the example is related to icons. Alternatively, a widget, an emoticon or the like may become a holography image settable target as well.

Figure 14C:
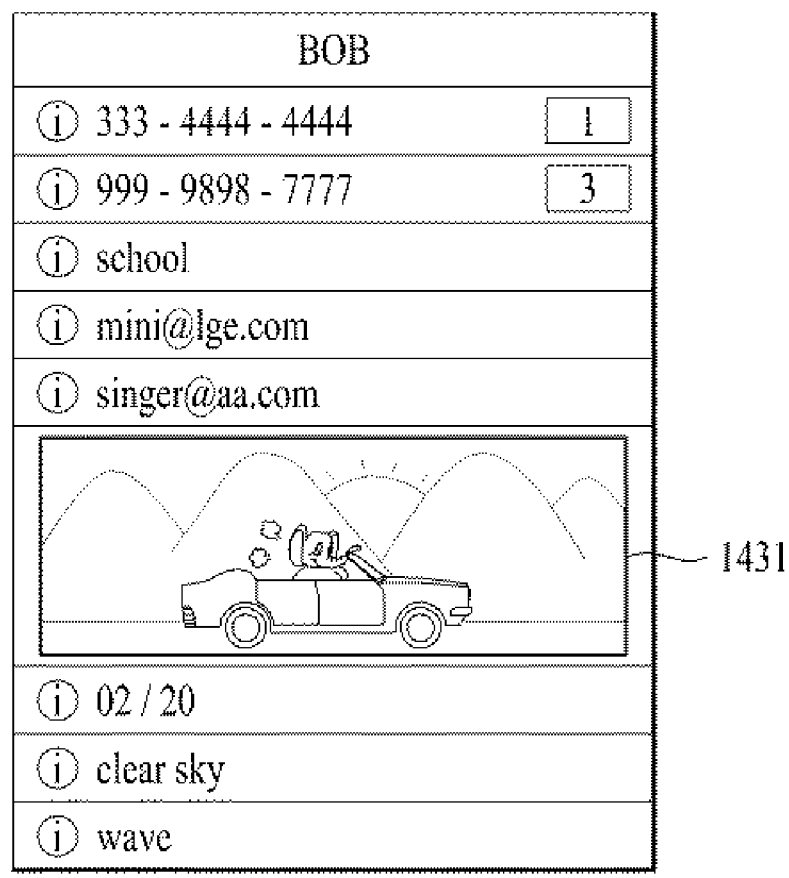

Referring to FIG. 14C, an image 1431 among informations saved in a phonebook may be set as a target to which a holography image will be applied.

FIG. 15 is a diagram for one example of a screen projected as a holography image according to one embodiment of the present invention.

Figure 15A:
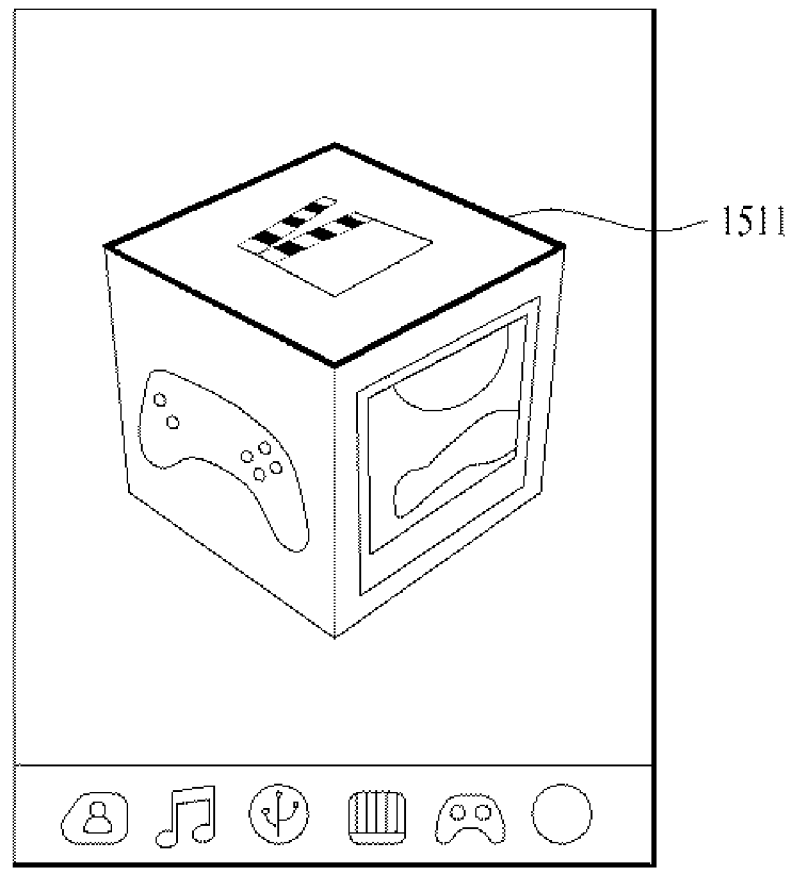
FIG. 15 is a diagram for one example of a screen to be projected as a holography image according to one embodiment of the present invention.

Referring to FIG. 15A, a plurality of informations are displayed as a cube on a display unit.

If a user designates a specific face 1511 among a plurality of faces of the cube, on which a plurality of the informations are displayed, respectively, the designated specific face 1411 may be projected as a holography image.

In particular, a partial region displayed on a screen may be controlled to be displayed as a holography image in accordance with a holography pattern.

Figure 15B:
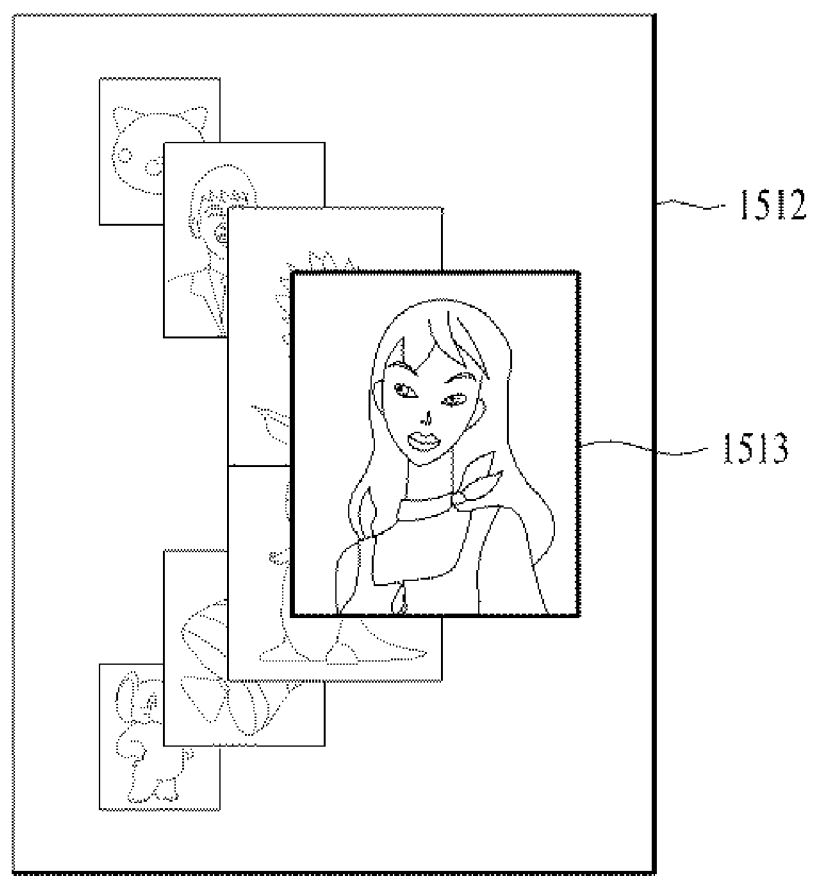

Referring to FIG. 15B, depths are given to a plurality of images, respectively. And a whole screen region 1512 may be controlled to be projected as a holography image.

A region corresponding to a partial image 1513 among a plurality of the images may be controlled to be projected as a holography image only.

Meanwhile, according to one embodiment of the present invention, an object, to which a holography pattern will be applied, may include a specific target or a specific group designated by a user.

This is described in detail with reference to FIG. 16 as follows.

FIG. 16 is a diagram for one example of setting a specific target or a specific group, which is projected as a holography image, according to one embodiment of the present invention.

Figure 16A:
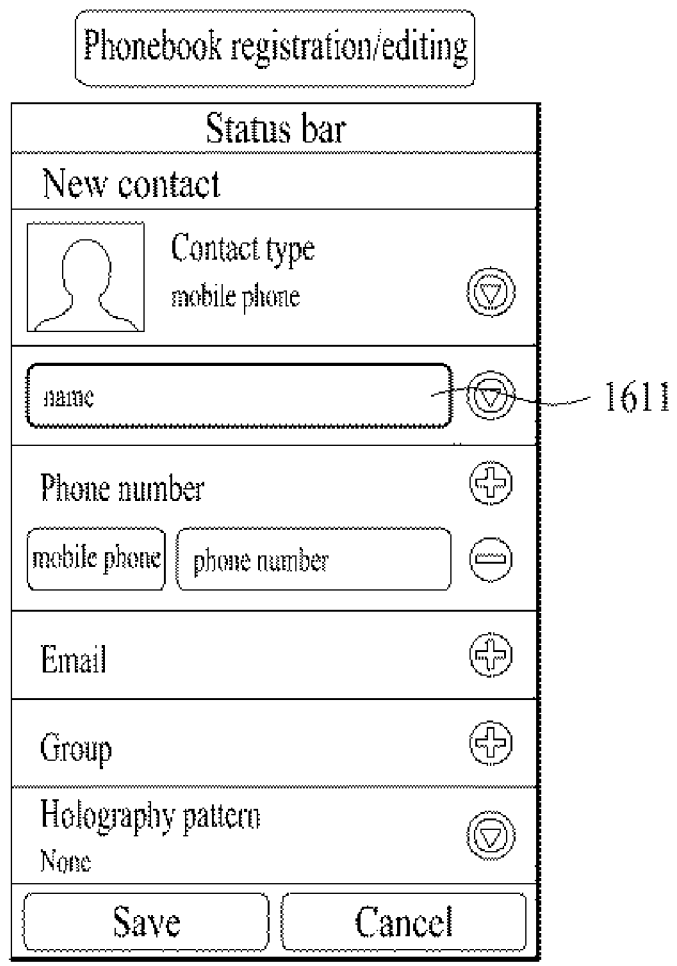
FIG. 16 is a diagram for one example of setting a specific target or a specific group to be projected as a holography image according to one embodiment of the present invention.

Referring to FIG. 16A, a specific target added via an editing menu 1611 of a phonebook may be set to be projected as a holography image only.

Figure 16B:
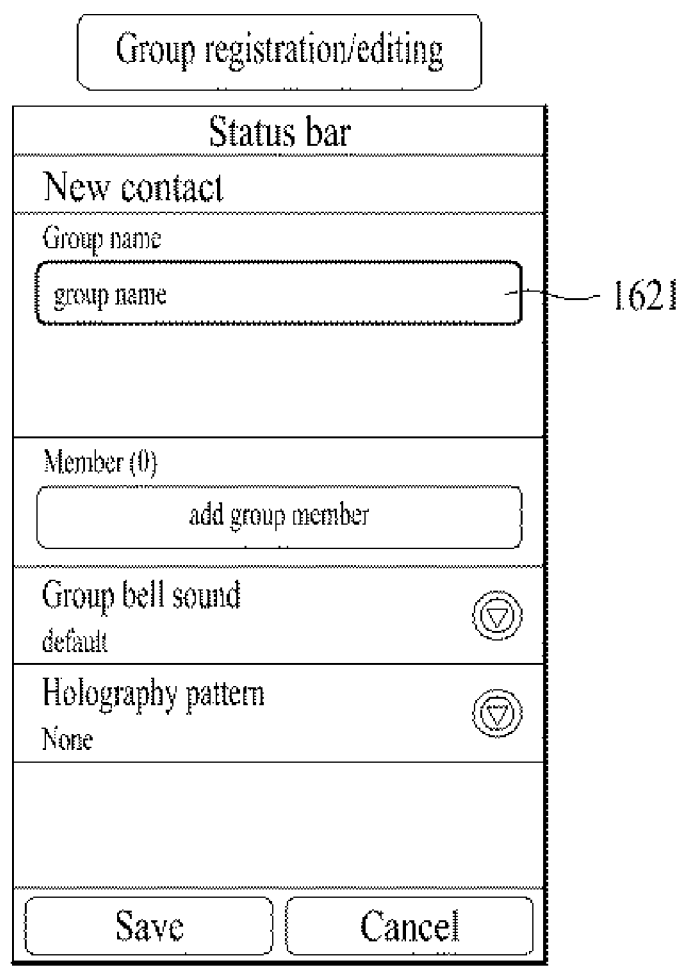

Referring to FIG. 16B, a target sorted as a specific group via a group menu 1621 of a phonebook may be projected as a holography image only.

Therefore, it may be able to conveniently manage a specific target or group, which will be projected as a holography image, by a specific target or group unit.

Meanwhile, according to one embodiment of the present invention, a holography type is set for a specific object or screen and a holography image may be projected in accordance with the set holography type. Moreover, the controller 180 may control a prescribed visual effect to be displayed on the holography type set specific object or screen.

This is described in detail with reference to FIG. 17 as follows.

Figure 17:
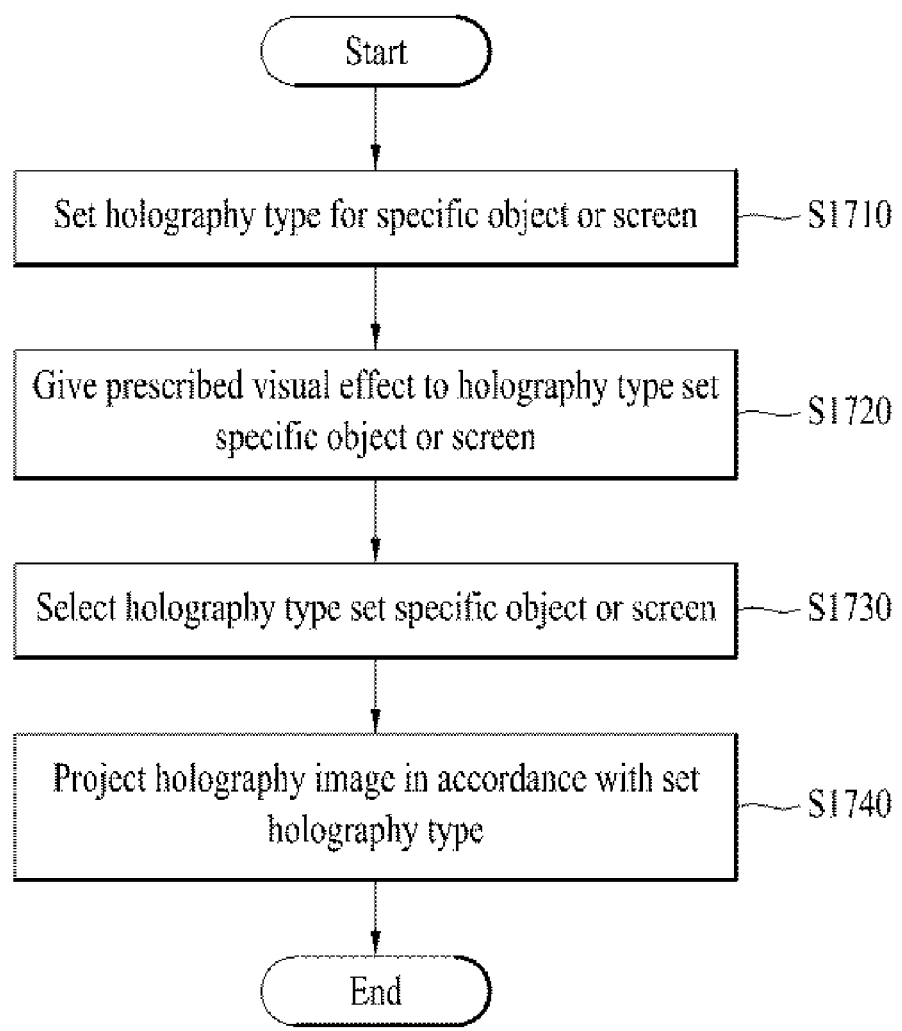
FIG. 17 is a flowchart for one example of projecting a holography image in accordance with a holography type set for a specific object or screen according to one embodiment of the present invention.

FIG. 17 is a flowchart for one example of projecting a holography image in accordance with a holography type set for a specific object or screen according to one embodiment of the present invention.

Referring to FIG. 17, a user may be able to set a holography type for a specific object or screen by a prescribed menu or key manipulation [S1710].

In this case, the holography type settable specific object may include one of an address book, a plurality of applications, a name of a specific object, a plurality of contents, a plurality of widgets and the like. A plurality of the applications may include applications related to phone, message, email, schedule, memo, camera, gallery, subway route map, electronic dictionary, calculator, compass, SNS, stock market, map and the like. A plurality of the widgets may include widgets related to phone, message, email, schedule, memo, camera, gallery, subway route map, electronic dictionary, calculator, compass, SNS, stock market, map and the like.

Moreover, the holography type settable specific screen may include a whole or partial region displayed on the display unit.

Yet, the above descriptions of the specific object and the specific screen are just exemplary. And, holography types may be set for various targets that can be displayed on the display unit.

Meanwhile, the holography type set for the specific object or screen may be mainly classified into a default type, a holography background type and a holography pattern type.

First of all, a default type means that a content corresponding to a specific object or a specific screen is intactly projected as a holography image. For instance, in case that a map application is activated, a result content of the activated map application may be projected as a holography image. If a whole region of the display unit is set to be projected as a holography image, a content currently displayed on the whole region of the display unit may be projected as a holography image.

Secondly, a holography background type is a type advanced from the default type and may mean that a holography image is projected in a manner of being included in a prescribed region of the above-mentioned holography background image.

In particular, a content of a holography image is displayed in a manner of being included in a whole or partial region of a holography background.

In this case, the holography background image may include a closed curve implemented into a combination of at least one of a straight line, a line bent at a prescribed angle, a branch line, a curved line and the like and may be implemented by 2D stereoscopic image system or 3D stereoscopic image system.

Thirdly, a holography pattern type is a type advanced from the default type and may mean that a holography image is projected in a manner of varying in accordance with time to correspond to the above-mentioned holography pattern.

In particular, it may be able to set a holography pattern in a manner of changing a distance difference between a holography output module and a holography image, changing a shape of a holography image projected by the holography output module 156 in accordance with time, moving a projected holography image in right and left directions, rotating a projected image, or changing a color, size and/or the like of a projected holography image in accordance with time.

Each of the default type, the holography background type and the holography pattern type may be individually set for a specific object or screen. Optionally, a plurality of the types may be simultaneously set for a specific object or screen.

For instance, if a holography background type and a holography pattern type are simultaneously set for a map application, an activated result of the map application may be projected as a holography image in accordance with a holography pattern set by being included in a holography background.

Once the holography type is set for the specific object or screen, the controller 180 may be able to display a prescribed visual effect to inform a user of the holography type setting [S1720].

In this case, the visual effect plays a role as an indicator in informing a user that the holography type is set for the corresponding target.

This visual effect may be implemented using various effects including a pattern of surface texture, flickering, size variation, at least one shape-transformed or twisted portion and the like. Moreover, if a holography background type is set, the set background may be displayed as a shortcut or thumbnail, which will be described in detail with reference to FIGS. 24 to 28 later. Besides, the visual effect is non-limited by the above-mentioned effects. And, the visual effect may be implemented using other effects in various ways.

Thereafter, the user may be able to select the holography type set specific object or screen [S1730].

If a prescribed object or screen is selected, the controller 180 may project a holography image in accordance with the set holography type [S1740].

In particular, a content of a specific object or screen is intactly projected as a holography image. Alternatively, a search for a specific information is performed and the found specific information is then projected as a holography image. Alternatively, a specific item is projected as a holography image only in accordance with a holography type. Alternatively, one item is activated, a next item is automatically activated, and a holography image is then projected in accordance with a holography type. Alternatively, a previous of a holography type is provided and a holography image is projected. Alternatively, a plurality of functions are displayed and a holography image is projected by applying a holography type in accordance with a selected function.

First of al, the controller 180 may control a content related to a specific object or screen to be intactly projected as a holography image. For instance, a content of an activated result of a weather application may be intactly projected as a holography image.

Secondly, in case that a specific object is an informative/active type widget, a search for a specific information is performed and the found specific information may be projected as a holography image.

For instance, the informative/active type widget may include a widget for one of weather, news, stock, movie, music, gourmet restaurant, shopping, search, blog, cartoon, traffic, game, Google, Naver, digital clock, analog clock, word time clock, memo, bookmark, photo frame, map, YouTube, SNS and the like. In particular, this informative/active type widget automatically searches information to provide information actively.

For instance, after Google widget has been activated, if a user inputs a keyword 'new technology' by key manipulation or voice, the controller 180 makes a search for specific information related to 'new technology' and then controls the found specific information to be projected as a holography image.

A specific item may be projected as a holography image in accordance with a holography type only. For instance, if a 'sports' related specific item is selected from a news widget, a detailed content for the selected 'sports' related specific item may be projected as a holography image.

One item is activated, a next item is automatically activated, and a holography image may be then projected in accordance with a holography type.

For instance, if a gallery application is activated, the controller 180 may control previously designated images to be sequentially activated and displayed as holography images in prescribed time interval.

A preview of holography type is provided and a holography image may be then projected. For instance, in case that a holography background type of a rectangular shape is set for a weather application, it is preferentially displayed as a preview image in a previously designated size. If a user selects the displayed preview image, a holography image may be displayed in accordance with the holography background type.

A plurality of functions are displayed and a holography image may be then projected by applying a holography type in accordance with a selected function.

In particular, if a specific object is selected by a user, the controller 180 may display a plurality of functions each of which is capable of providing a holography image in accordance with a set holography type.

A plurality of the functions selectable by a user may include a call function, an information reading function, a message sending function, a holography type preview function and the like. And, these functions may be displayed as a list. In doing so, if a user selects a prescribed one of a plurality of the displayed functions, a holography image may be projected by applying a holography type in accordance with the selected function.

Yet, the above description is just exemplary. And, a holography image may be projected in various forms. A method of projecting a holography image will be described in detail with reference to FIGS. 29 to 34 later.

Therefore, a user may be provided with a holography image in accordance with a preset holography type. And, it may be convenient for the user to recognize that a holography type has been set using a prescribed visual effect.

FIG. 18 schematically shows the steps S1710, S1720, S1730 and S1740.

FIG. 18 is a diagram for one example of projecting a holography image in accordance with a holography type set for a specific object or screen according to one embodiment of the present invention.

Referring to FIG. 18, it may be able to set a holography type for a specific object via a prescribed setting menu 1810.

If the holography type is set, the controller 180 may give a prescribed visual effect to the holography type set specific object. A user is then able to select the holography type set specific object 1820.

If the holography type set specific object is selected, the controller 180 may project a holography image in accordance with the set holography type.

In particular, if a default type is set, a holography image 1831 may be projected. If a holography background type is selected, a holography image 1832 may be projected. If a holography pattern type is selected, a holography image 1833 having a pattern vary in accordance time may be projected.

In the following description, a detailed configuration of the present invention is explained with reference to the accompanying drawings.

First of all, the step S1710 of setting a holography type for a specific object or screen will be described in detail with reference to FIGS. 19 to 23.

Secondly, the step S1720 of giving a visual effect to a holography type set specific object or screen will be described in detail with reference to FIGS. 24 to 28.

Thirdly, the step S1730 of selecting a holography type set specific object or screen and the step S1740 of projecting a holography image in accordance with a set holography type will be described in detail with reference to FIGS. 29 to 34.

The step S1710 of setting a holography type for a specific object or screen is described in detail as follows.

As mentioned in the foregoing description, a holography type settable for a specific object or screen may be classified into a default type, a holography background type and a holography pattern type.

A method of setting a holography type is described with reference to FIG. 19 as follows.

FIG. 19 is a diagram for one example of setting a holography type for a specific object or screen according to one embodiment of the present invention.

FIG. 19A shows one example of setting a default type. In particular, it may be able to set whether a content related to a specific object or screen will be intactly projected as a holography image.

If a default type is not set (i.e., 'OFF' 1911], a content related to an activated specific object or screen is not projected as a holography image [1912].

If a default type is set (i.e., 'ON' 1913), a content related to an activated specific object or screen is projected as a holography image [1914].

Although FIG. 19A shows that a setting of a default type and a setting of activation or deactivation of a holography image itself are performed at the same time, the settings may be separated from each other.

In particular, the holography image projection is set but the default type may not be set.

Figure 19B:
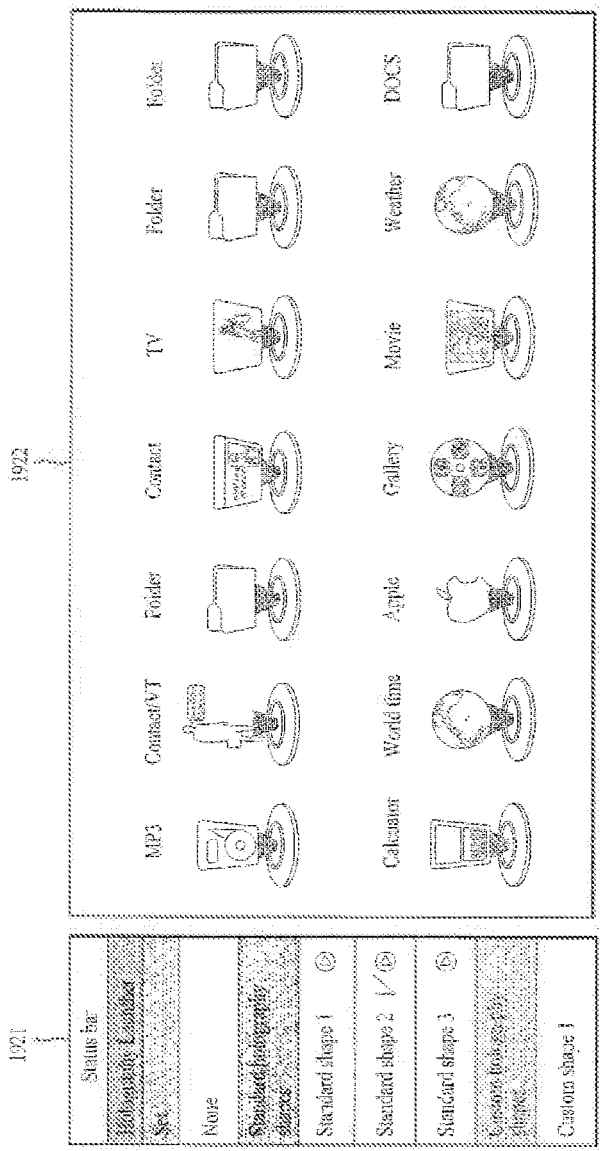
FIG. 19 is a diagram for one example of setting a holography type for a specific object or screen according to one embodiment of the present invention.

FIG. 19B shows one example of setting a holography background type.

Referring to FIG. 19B, a user may be able to set holography backgrounds in various forms via a holography background type setting menu 1921. In doing so, a plurality of settable holography backgrounds may be provided as thumbnails to a user [1922].

As mentioned in the foregoing description with reference to FIG. 13, a plurality of the holography backgrounds provided as thumbnails to a user may include an apple shape, a calculator shape, a character image shape, a business card shape, a folder shape, a globe shape, a movie image shape, a gallery shape, a music image shape, a memo shape, a TV image shape and the like.

Figure 19C:
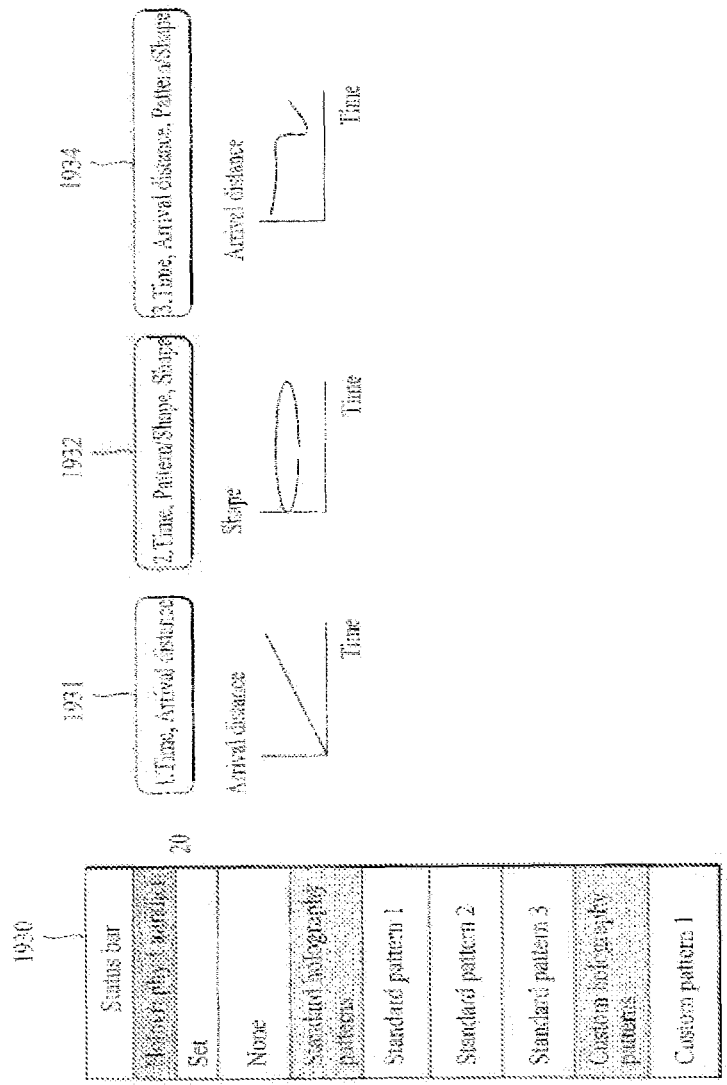

FIG. 19C shows one example of setting a holography pattern type.

Referring to FIG. 19C, a user may be able to set various kinds of holography patterns via a holography pattern type setting menu 1930.

Representatively, by changing a distance difference between a holography output module and a holography image in accordance with time, it may be able to set a holography pattern 1931.

And, by changing a shape of a holography image projected by the holography module 156 in accordance with time, it may be able to set a holography pattern 1932.

Moreover, by changing both a distance difference between a holography output module and a holography image and a shape of a holography image projected by the holography module 156, it may be able to set a holography pattern 1934.

Besides, as mentioned in the foregoing description, it may be able to set a holography pattern by moving a projected holography image in right and left directions, rotating a projected holography image, or changing a color or size of a projected holography image in accordance with time.

Meanwhile, regarding a holography type, a holography type setting menu may be changed in accordance with a holography type supported by a terminal. This is explained with reference to FIG. 20 as follows.

FIG. 20 is a diagram for a detailed example of a holography type settable according to one embodiment of the present invention.

Figure 20A:
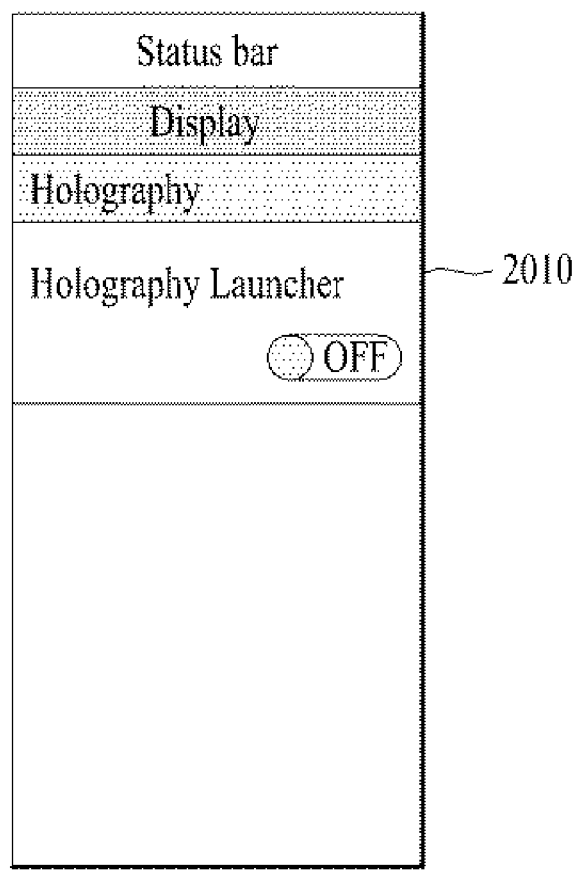
FIG. 20 is a diagram for a detailed example of a holography type settable according to one embodiment of the present invention.

Referring to FIG. 20, in case that a terminal supports a holography image projecting function only, a holography type setting menu 2010 may be provided [FIG. 20A]. In particular, a default type may be set via the holography type setting menu 2010 only.

Figure 20B:
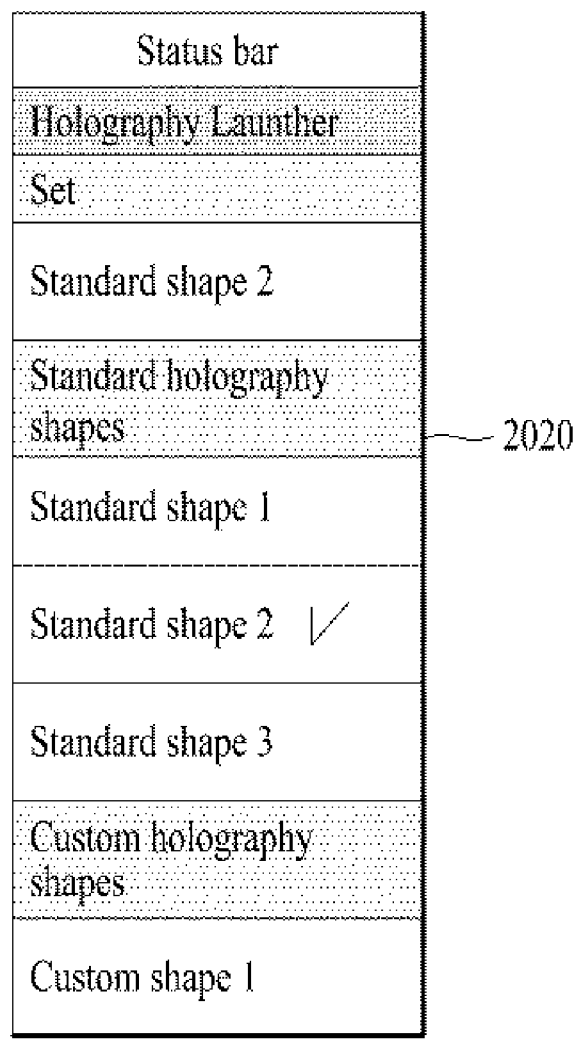

In case that a terminal supports a holography background image function, a holography type setting menu 2020 may be provided [FIG. 20B]. In particular, a user may be able to set a prescribed one of a plurality of holography backgrounds in the default type.

Figure 20C:
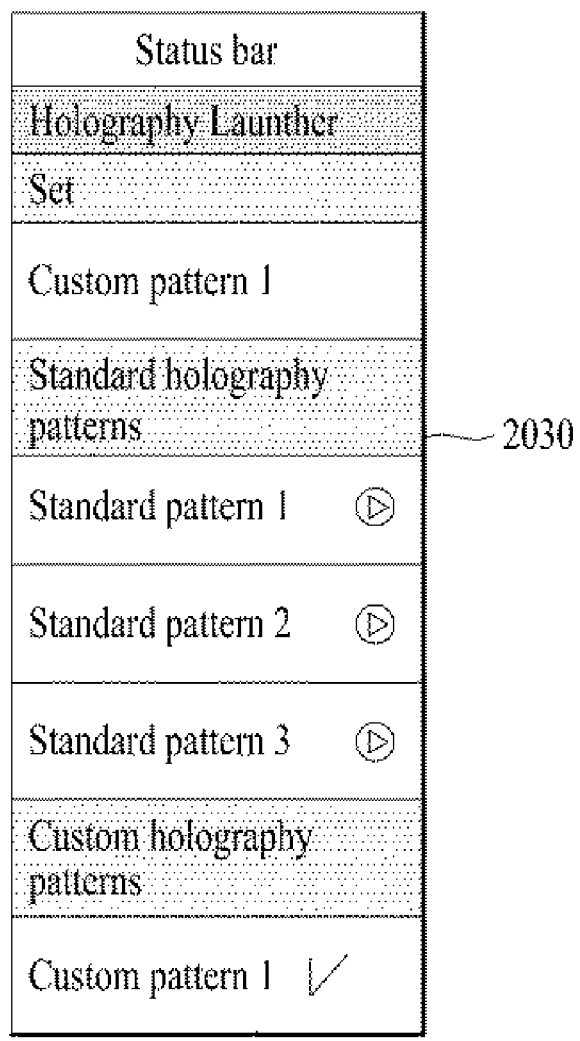

In case that a terminal supports a holography pattern function, it may be able to provide a holography type setting menu 2030 [FIG. 20C]. In particular, it may be able to set a holography image to be projected in accordance with one of a plurality of holography patterns in the default type.

Figure 20D:
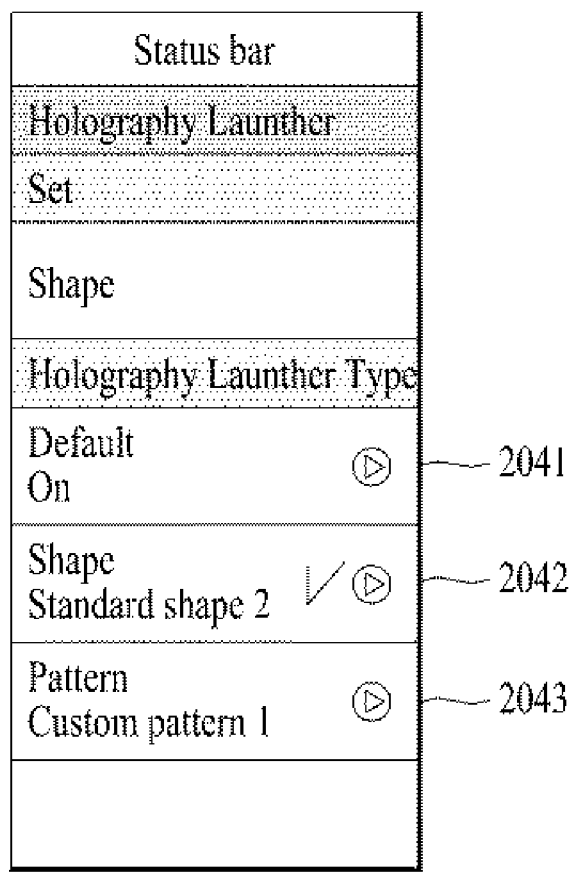

In case that a terminal supports a holography image projecting function, a holography background image function and a holography pattern function all, a holography type setting menu 2040 may be provided [FIG. 20D]. In particular, a user may be able to set various holography types by selecting one of a default type 2041, a holography background type 2042 and a holography pattern type 2043.

A user may be able to set a specific target or screen, for which a set holography type will be applied, in detail. This is described with reference to FIG. 21 as follows.

FIG. 21 is a diagram for one example of setting a holography type for a specific object according to one embodiment of the present invention.

Figure 21A:
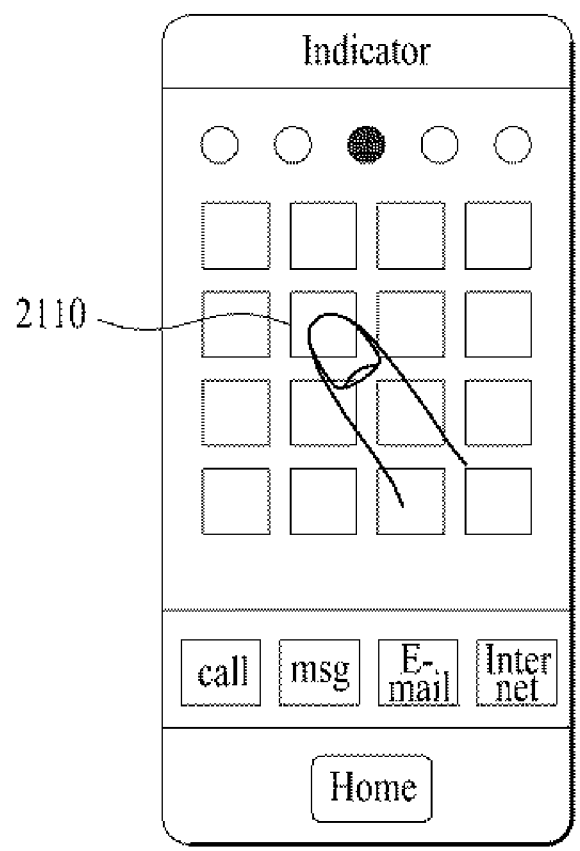
FIG. 21 is a diagram for one example of setting a holography type for a specific object according to one embodiment of the present invention.

Referring to FIG. 21A, a user selects a prescribed object 2110 from a plurality of objects displayed on a touchscreen by one of a long touch, a long proximity touch, a consecutive touch and the like and may then set a holography type to be applied to the selected object 2110.

Figure 21B:
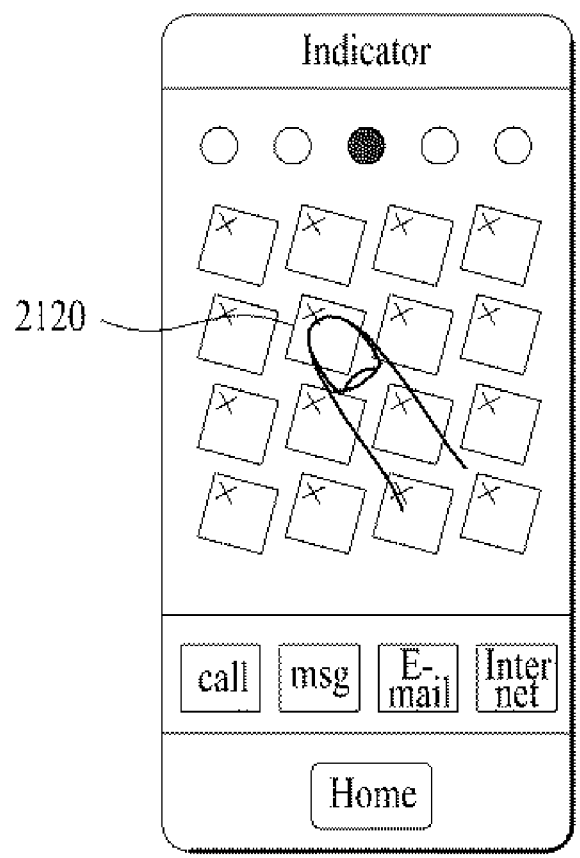

Referring to FIG. 21B, a user selects a prescribed object 2120 from a plurality of objects set in an editing step by one of a long touch, a long proximity touch, a consecutive touch and the like and may then set a holography type to be applied to the selected object 2120.

Figure 21C:
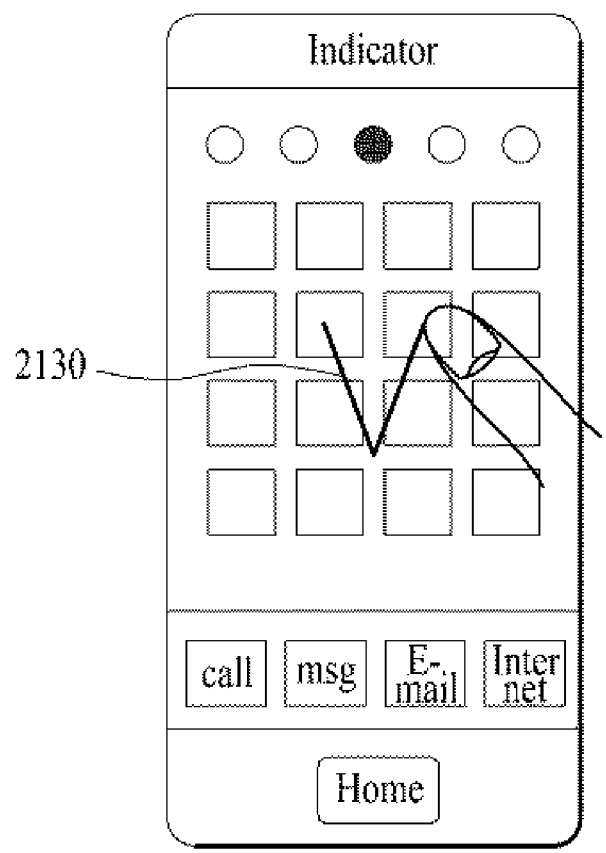

Referring to FIG. 21C, while a user selects a prescribed object from a plurality of objects displayed on a touchscreen, the user inputs a gesture 2130 of a previously set specific pattern in order to set a holography type to be applied to the selected object.

Figure 21D:
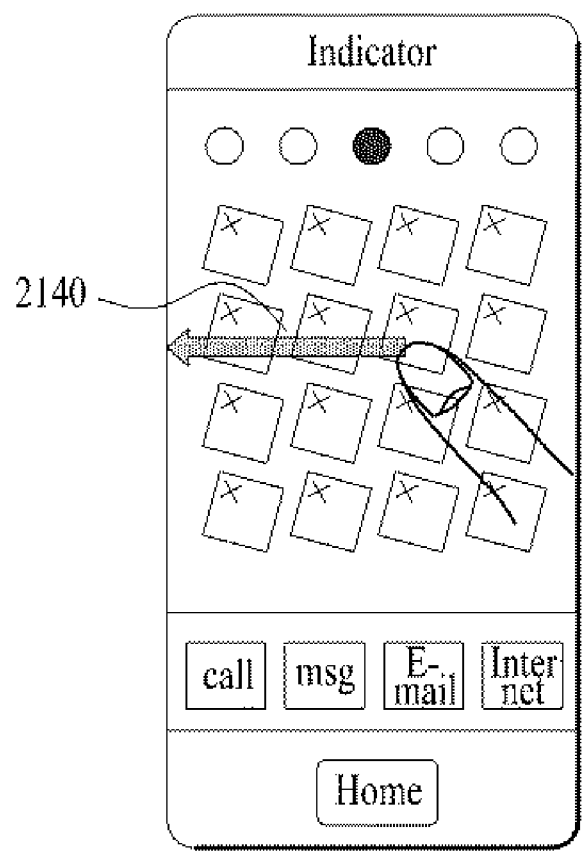

Referring to FIG. 21D, after a user has selected a prescribed object from a plurality of objects displayed on a touchscreen, the user drags the selected object to a previously designated region in order to set a holography type to be applied to the selected object.

Figure 21E:
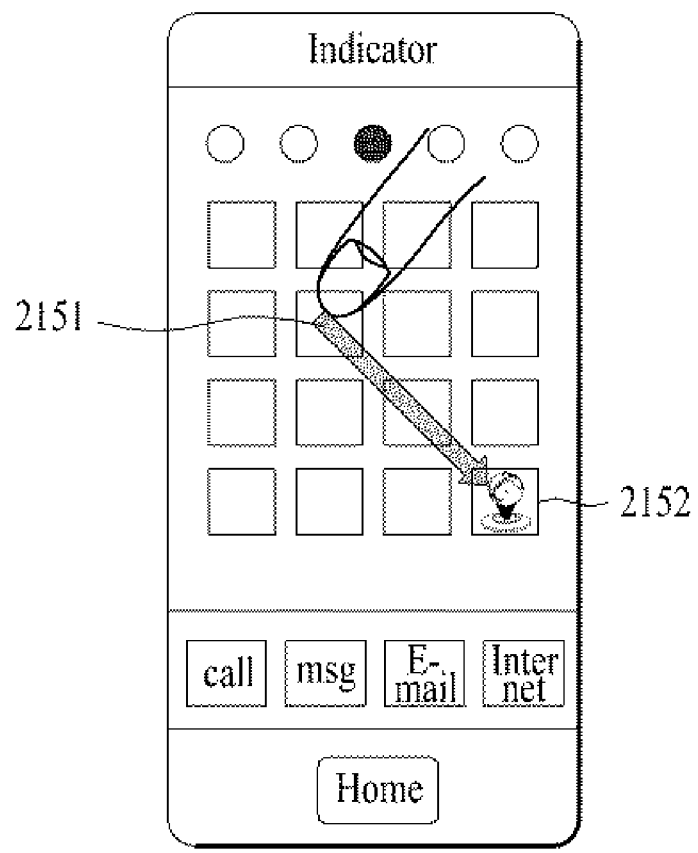

Referring to FIG. 21E, after a user has selected a prescribed object 2151 from a plurality of objects displayed on a touchscreen, the user drags the selected object 2151 to a region, in which a holography indicator icon 2152 is situated, in order to set a holography type to be applied to the selected object 2151.

Figure 21F:
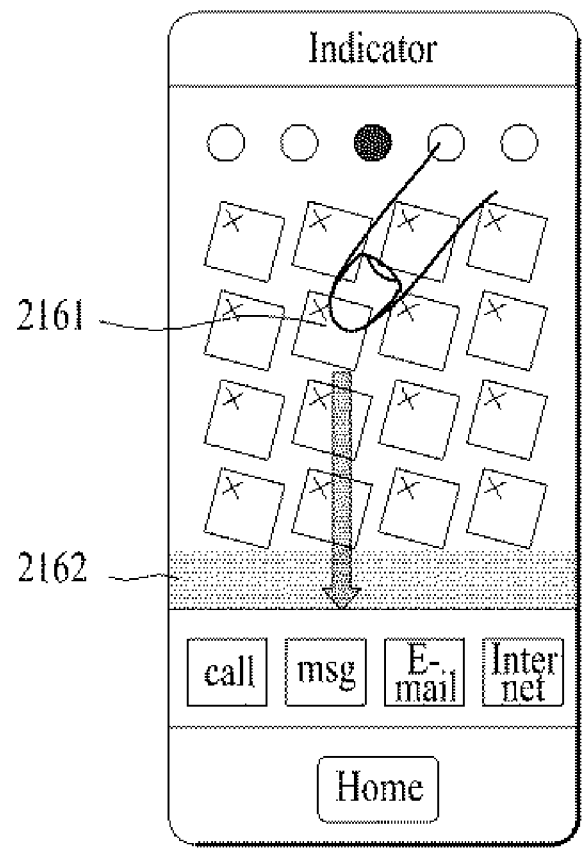

Referring to FIG. 21F, after a user has selected a prescribed object 2161 from a plurality of objects displayed on a touchscreen, the user drags the selected object 2151 to a region 2162, to which a prescribed visual effect is given, in order to set a holography type to be applied to the selected object 2161.

Figure 21G:
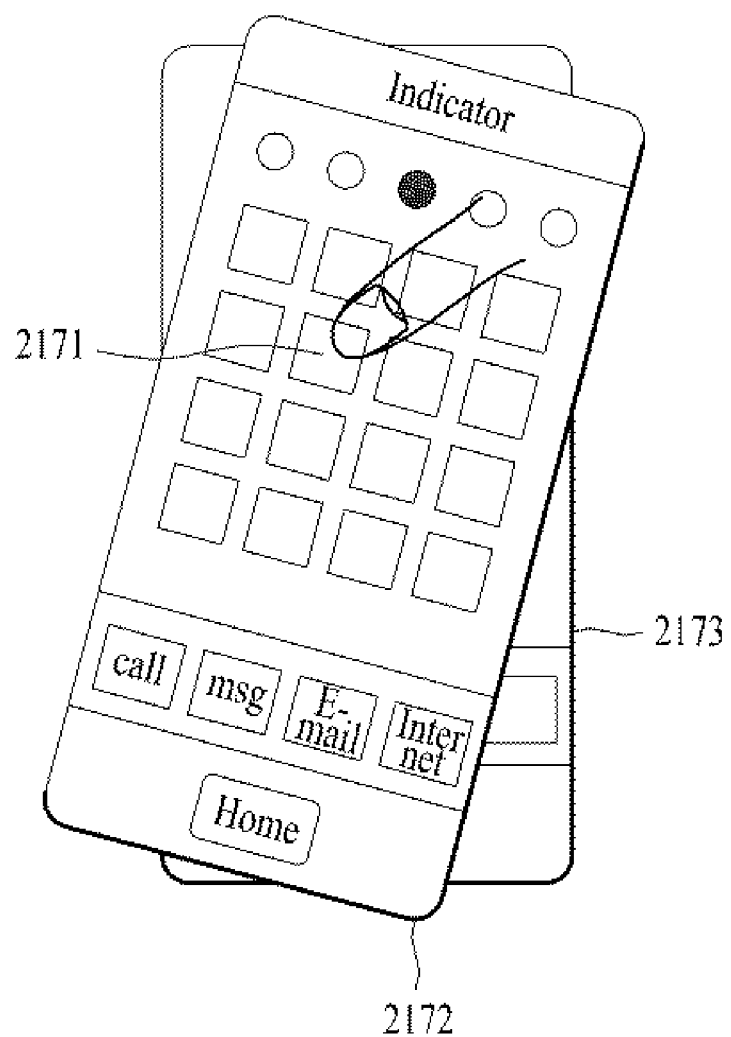

Referring to FIG. 21G, while a user selects a prescribed object 2171 from a plurality of objects displayed on a touchscreen, the user changes a location of a terminal from '2172' to '2173' in order to set a holography type to be applied to the selected object. In particular, it may be able to set a holography type for a specific object to correspond to inclination or motion of a terminal.

Moreover, the above-mentioned holography type setting method may be applicable to a home screen, a menu screen, a lock screen, a multitasking screen, a gallery screen, an explorer screen, a schedule screen, a map screen and the like.

In the following description, a method of setting a holography type for a specific object or screen at a time is explained in detail with reference to FIG. 22.

FIG. 22 is a diagram for a detailed example of setting a holography type for a specific object or screen according to one embodiment of the present invention.

Figure 22A:
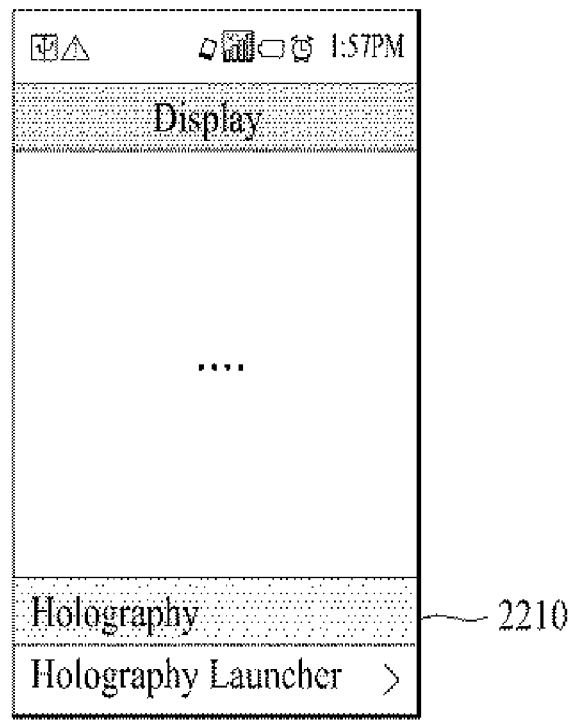
FIG. 22 is a diagram for a detailed example of setting a holography type for a specific object or screen according to one embodiment of the present invention.

Referring to FIG. 22A, a user may activate a holography setting related menu 2210 via a specific menu.

Figure 22B:
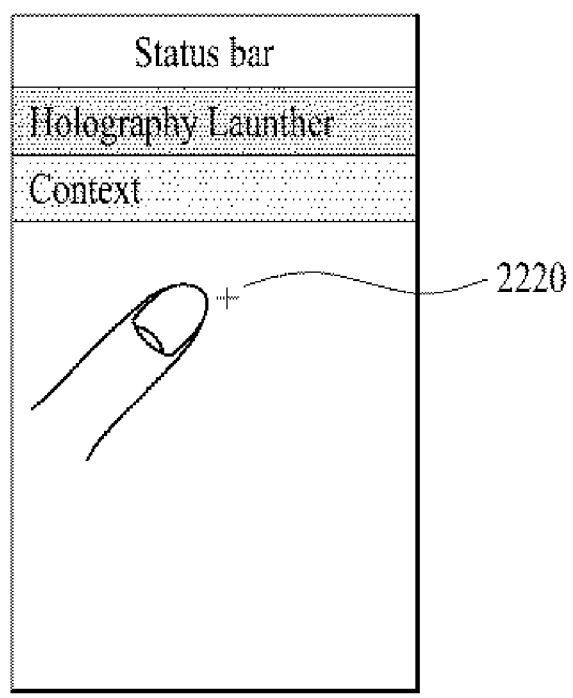

Referring to FIG. 22B, it may be able to select a menu 2220 for adding an object for which a holography type will be set.

Figure 22C:
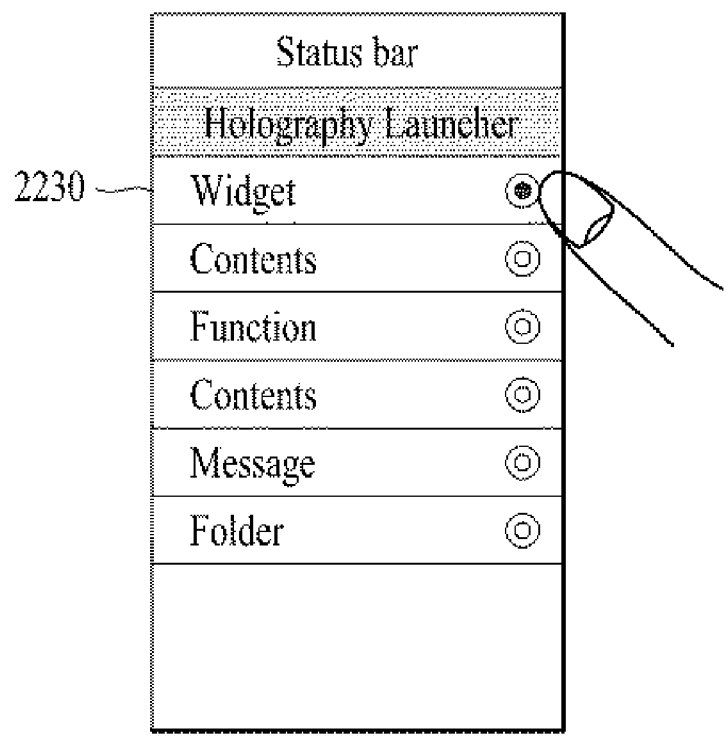

Referring to FIG. 22C, if the menu 2220 for adding an object for which a holography type will be set is activated, a plurality of objects, for which a holography type can be set, are displayed as a list 2230 by being sorted by category. In doing so, the user is able to select a widget category.

Figure 22D:
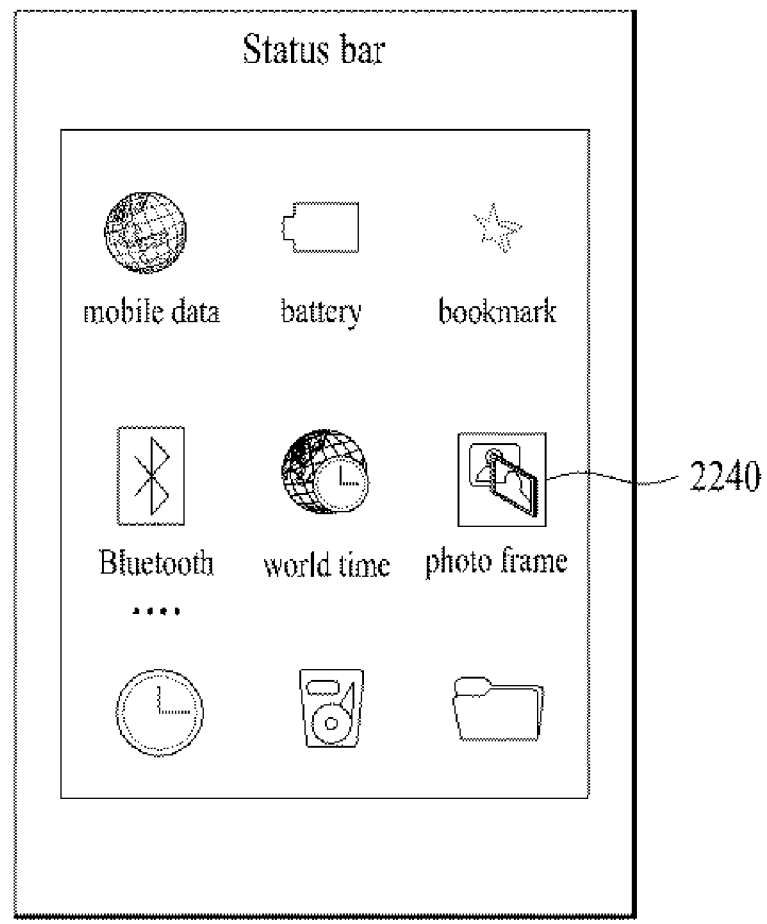

Referring to FIG. 22D, if the widget category is selected, the controller 180 may display a plurality of widgets saved in the terminal. The user may be then able to select a photo frame widget 2240 from a plurality of the displayed widgets.

Figure 22E:
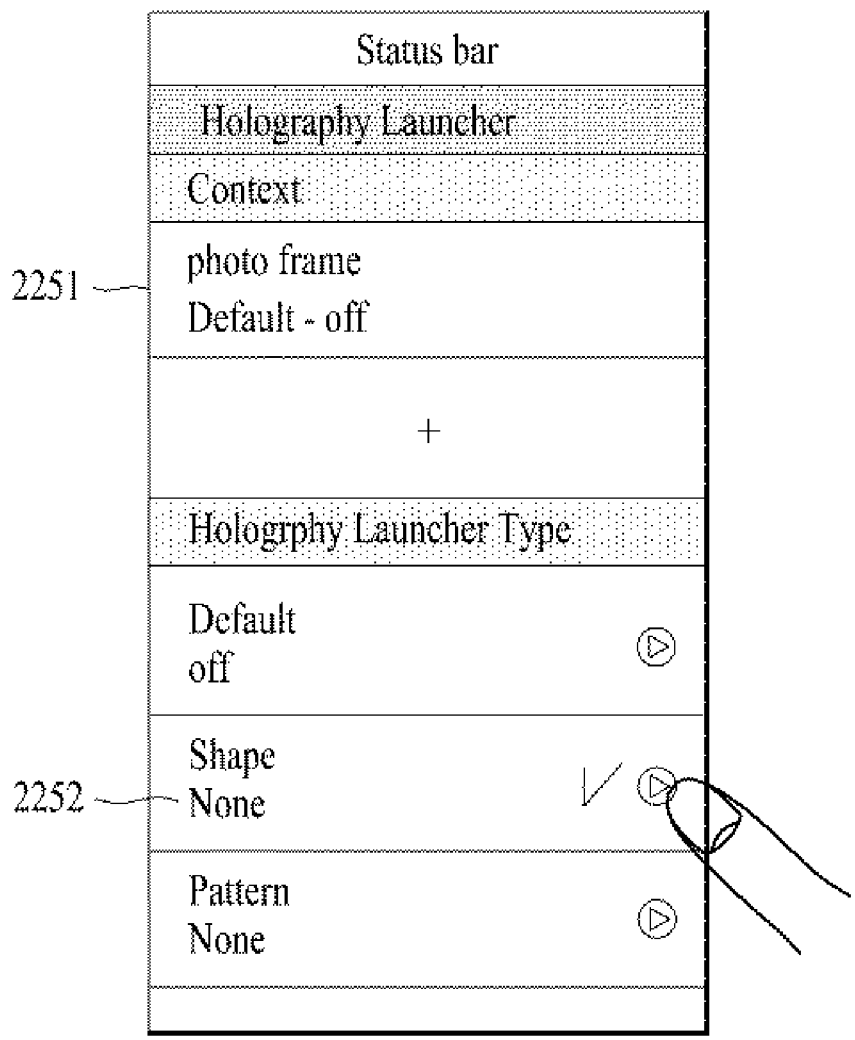

Referring to FIG. 22E, if the photo frame widget 2240 is selected, a menu 2251 for selecting a holography type to set for the photo frame widget 2240 is activated. The user may be then able to select a holography background type 2252 from a default type, the holography background type 2252 and a holography pattern type.

Figure 22F:
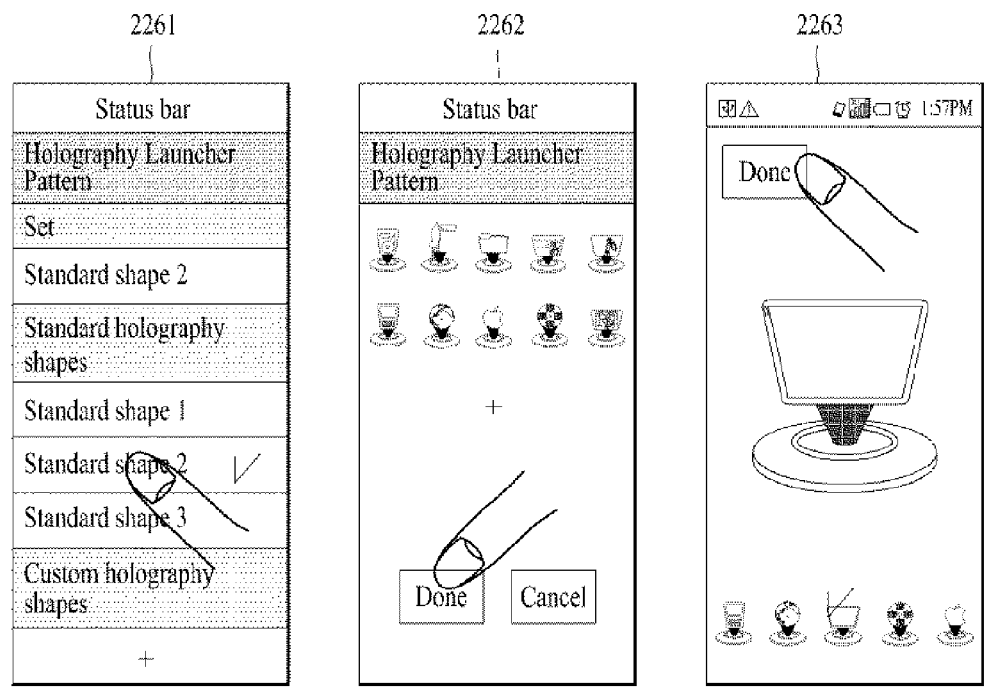

Referring to FIG. 22F, if the holography background type 2252 is selected, holography backgrounds in various forms may be provided to the user. In particular, the user may be provided with holography background information as a list of holography background names [2261], holography background information as thumbnails [2262] or holography background information as thumbnails and preview [2263].

Figure 22G:
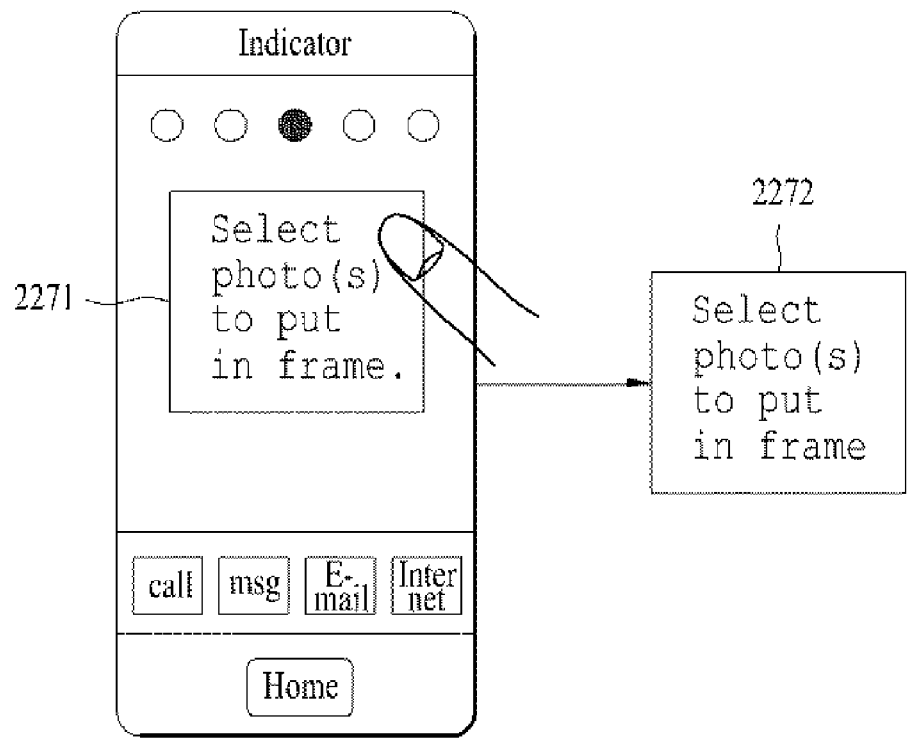

Referring to FIG. 22G, if the user selects a prescribed holography background, a menu 2271 for selecting a photo, which will be included in case of activating the photo frame widget 2240, is activated. In doing so, the user may be able to select at least one image which will be included in case of activating the photo frame widget 2240 [2272].

Figure 22H:
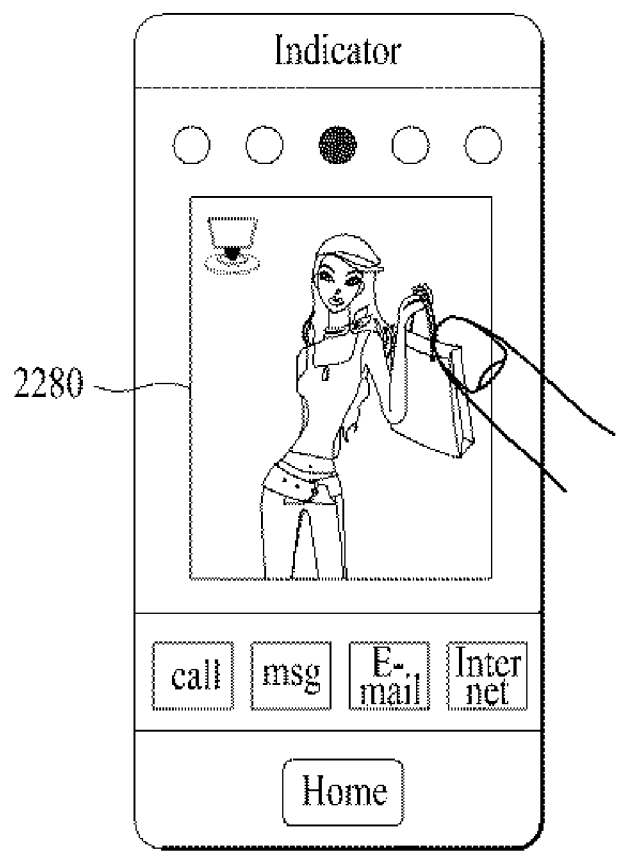

Referring to FIG. 22H, a visual effect, which will be explained later, is displayed on an image 2280 to which a holography type is applied.

Figure 22I:
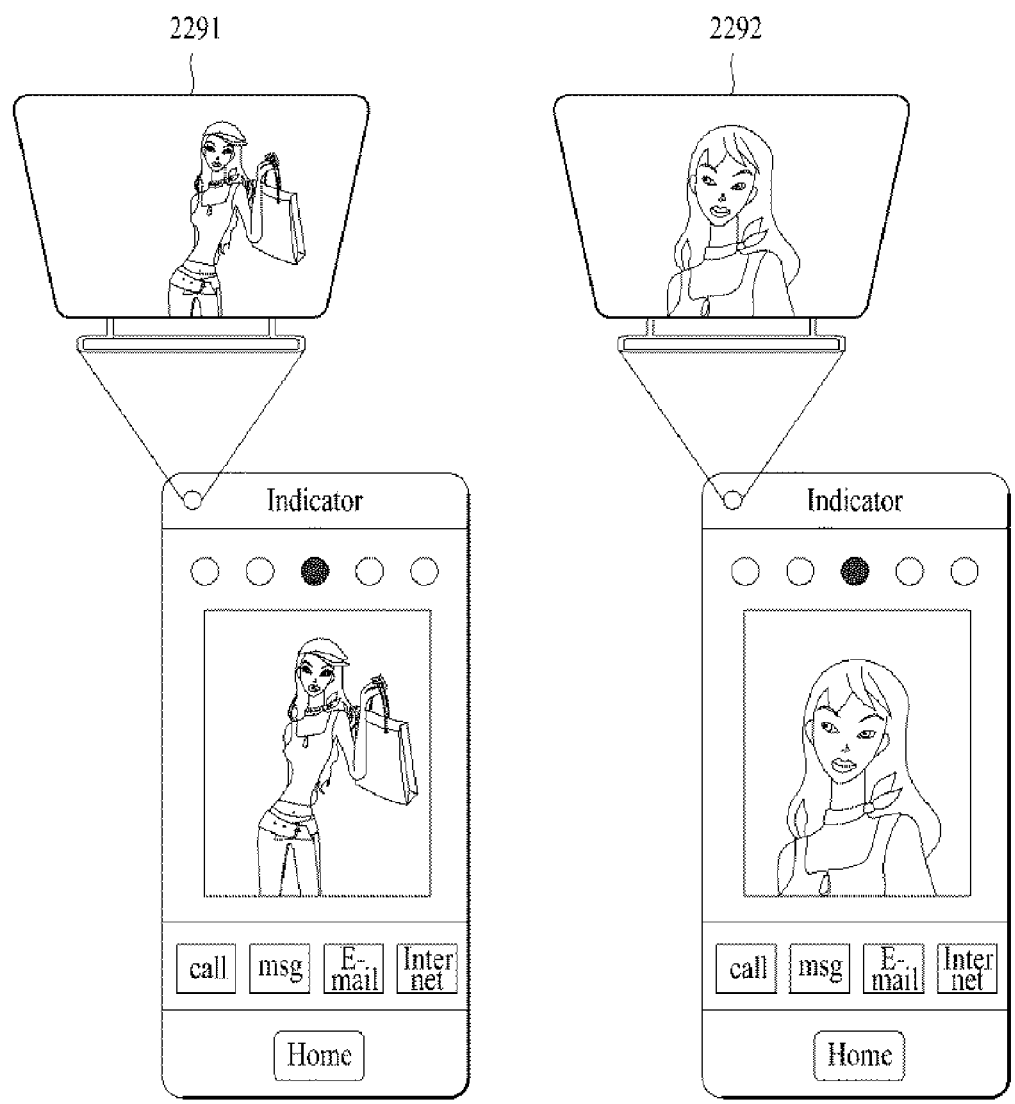

Referring to FIG. 22I, if the holography type set image 2280 is selected by the user, a plurality of images, which will be included in case of activating the photo frame widget 2240, are projected as holography images 2291 and 2292 in accordance with predetermined time, respectively.

Meanwhile, the holography type may be set by a specific object or group unit using a phonebook.

FIG. 23 is a diagram for one example of setting a holography type by a specific target or group unit according to one embodiment of the present invention.

Figure 23A:
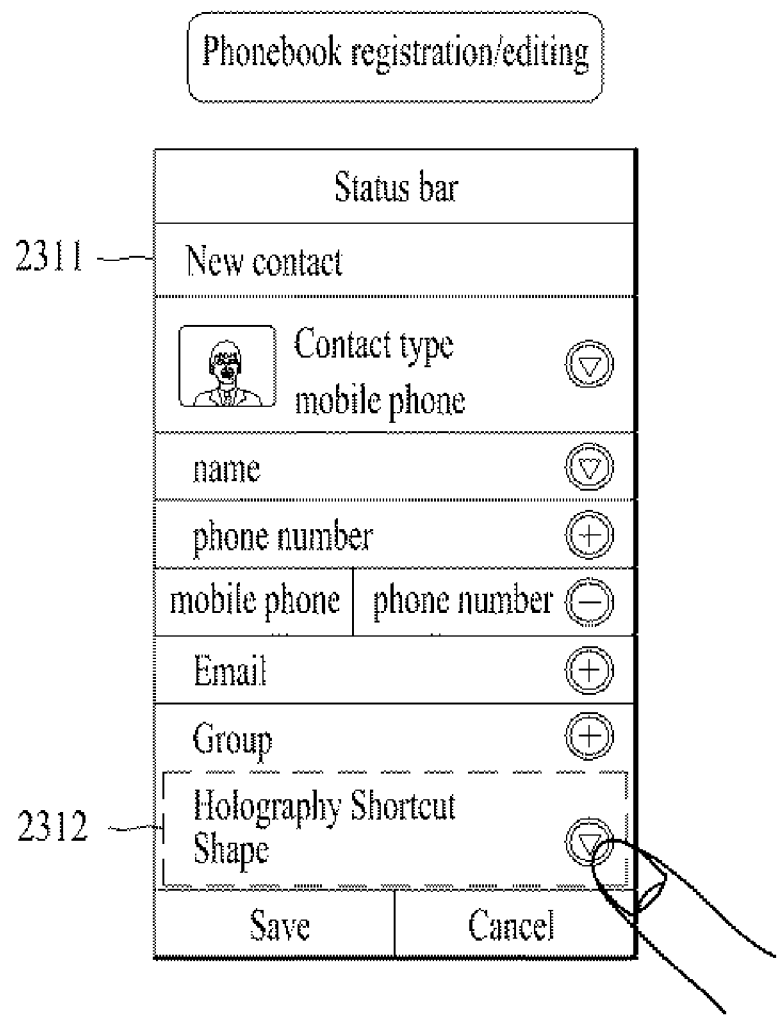
FIG. 23 is a diagram for one example of setting a holography type by a specific target or group unit according to one embodiment of the present invention.

Referring to FIG. 23A, while a phonebook menu 2311 is active, a user makes a search for a specific object and may be then able to instantly set a holography type for the found specific object via a holography type setting menu 2312.

Figure 23B:
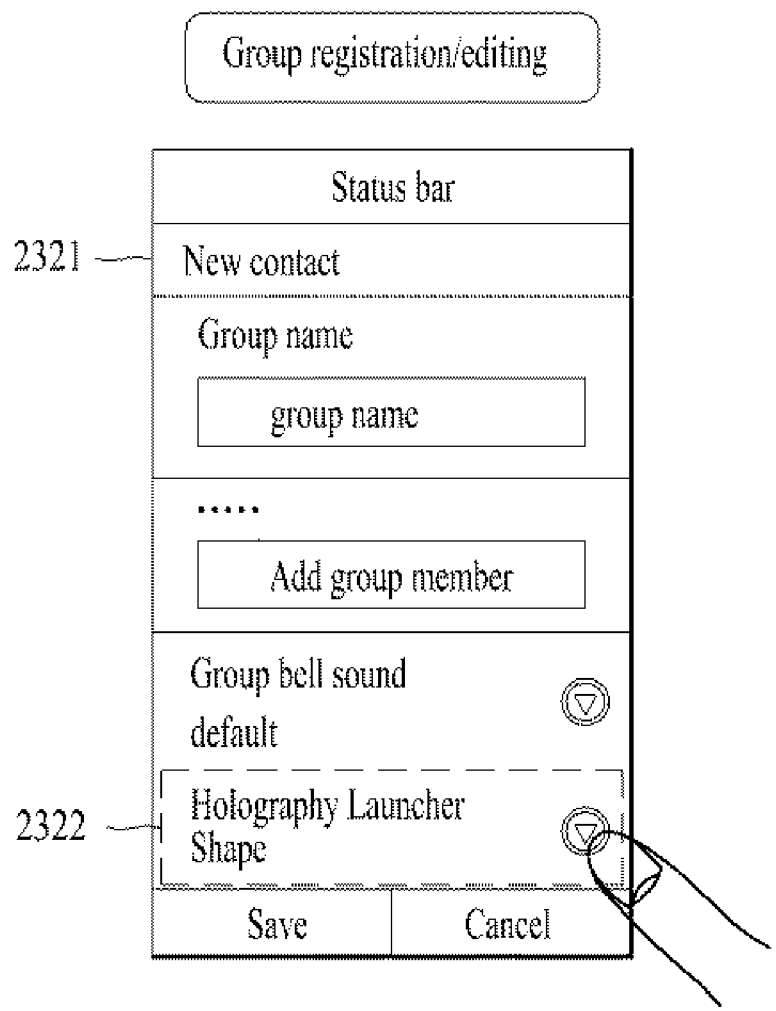

Referring to FIG. 23B, while a group menu 2321 is active, a user makes a search for a specific object or adds a specific group and may be then able to instantly set a holography type for the found or added specific object via a holography type setting menu 2322.

Therefore, the user may be able to conveniently set a holography type by a specific target or group unit.

Meanwhile, the step S1720 of giving a visual effect to a holography type set specific object or screen is described in detail with reference to FIGS. 24 to 28 as follows.

As mentioned in the foregoing description, the visual effect plays a role as an indicator in informing a user that the holography type is set for the corresponding target. This visual effect may be implemented using various effects including a pattern of surface texture, flickering, size variation, at least one shape-transformed or twisted portion and the like.

For clarity and convenience of the following description, assume that a holography type is set to a holography background type and that a set background is displayed as a shortcut or thumbnail. Besides, the visual effect is non-limited by the above-mentioned effects. And, the visual effect may be implemented using other effects in various ways.

First of all, explained in the following is a visual effect to inform a user that a holography background type is set for a specific object.

FIG. 24 is a diagram for one example of giving a prescribed visual effect to a specific object having a holography type set therefor according to one embodiment of the present invention.

Figure 24A:
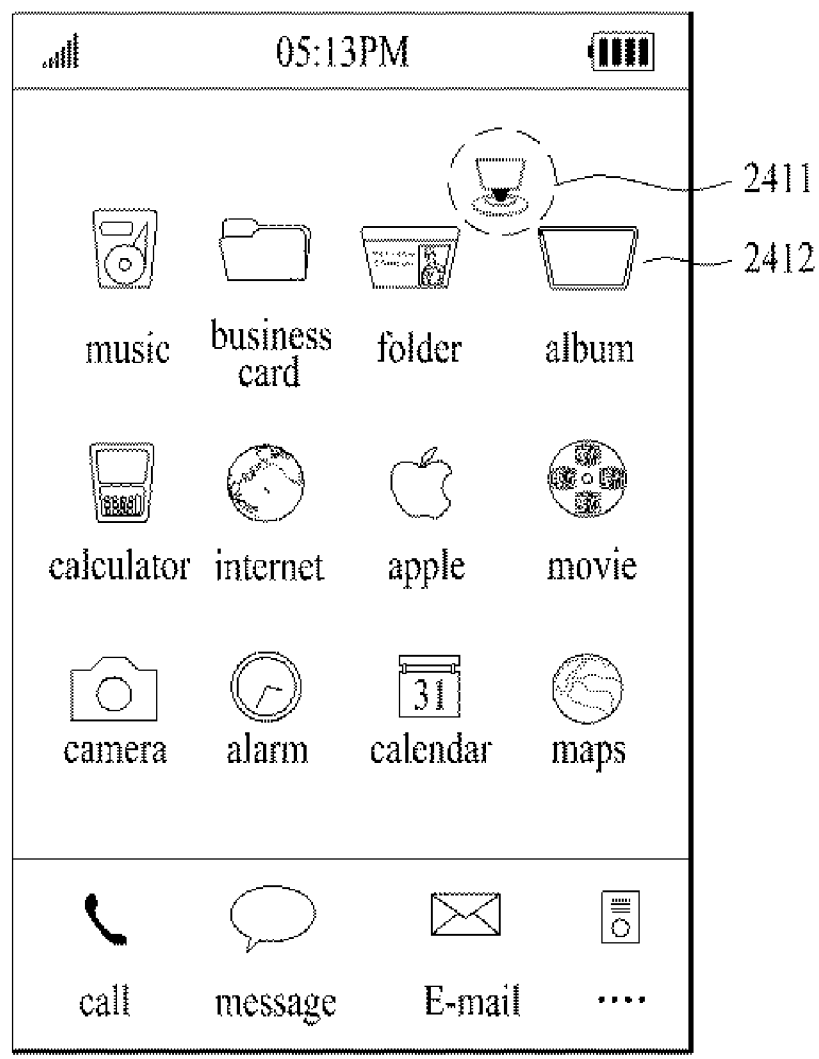
FIG. 24 is a diagram for one example of giving a prescribed visual effect to a specific object having a holography type set therefor according to one embodiment of the present invention.

Referring to FIG. 24A, since a holography background type of a rectangular shape is set in association with a camera application, a shortcut visual effect 2411 of a rectangular shape is displayed to indicate the holography background type setting. In particular, since the shortcut visual effect 2411 of the rectangular shape in prescribed size is displayed on a left top end portion of the album icon 2412, a user may be able to easily recognize that the holography background type of the rectangular shape is set for the album application.

Figure 24B:
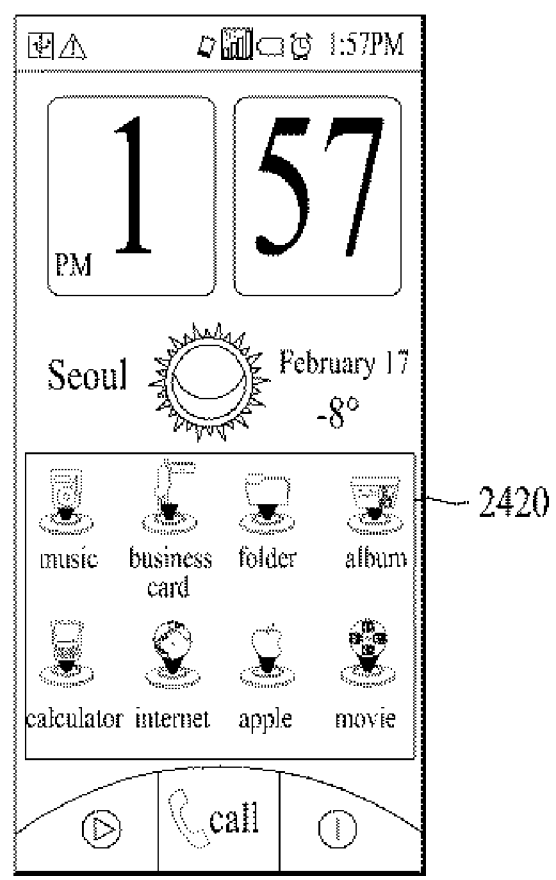

Referring to FIG. 24B, an icon for a holography background type set application may be displayed in a manner of being substituted with a shortcut visual effect corresponding to the set holography background type.

In particular, assuming a case that a different holography background type is set for such an application as an album, a music, a game, a camera and the like, shortcut visual effects 2420 in accordance with the set holography backgrounds may be displayed, as shown in FIG. 24B, in a manner of being substituted for the original icons, respectively.

Therefore, a user may be able to conveniently identify a holography background type set application from other applications with ease.

Figure 24C:
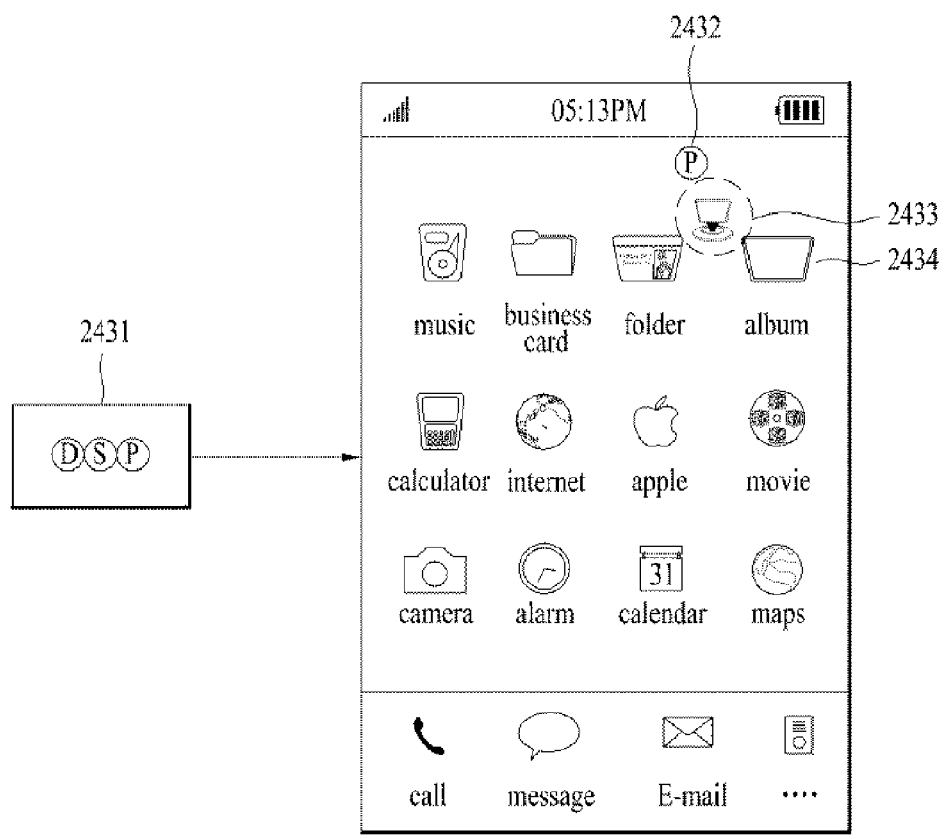

Referring to FIG. 24C, an additional visual effect may be displayed in accordance with a kind of each of the set holography types.

For instance, a default type among a plurality of holography types may be further provided with a visual effect 'D', a holography background type among a plurality of holography types may be further provided with a visual effect 'S', and a holography pattern type among a plurality of holography types may be further provided with a visual effect 'P'.

Since a holography pattern type is set in association with an album application in FIG. 24C, an addition visual effect 'P' 2432 is displayed to indicate the set holography pattern type.

In particular, since the shortcut visual effect 2433 in prescribed size and the additional visual effect 'P' 2432 are simultaneously displayed on a left top end portion of the album icon 2434, a user may be able to easily recognize that the holography pattern type is set for the camera application.

In the following description, details of a visual effect to indicate that a holography background type is set for a specific object are explained with reference to FIGS. 25 to 27.

FIG. 25 is a diagram for a detailed example of giving a prescribed visual effect to a specific object having a holography type set therefor according to one embodiment of the present invention.

Figure 25A:
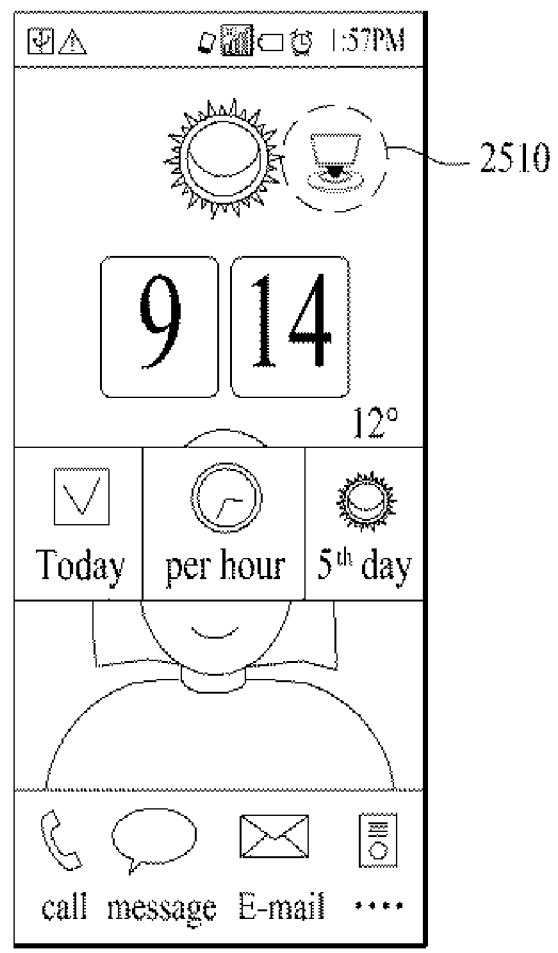
FIG. 25 is a diagram for a detailed example of giving a prescribed visual effect to a specific object having a holography type set therefor according to one embodiment of the present invention.

Referring to FIG. 25A, since a holography background type of a rectangular shape is set in association with a weather application, a shortcut visual effect 2510 of a rectangular shape is displayed to indicate the holography background type setting.

Figure 25B:
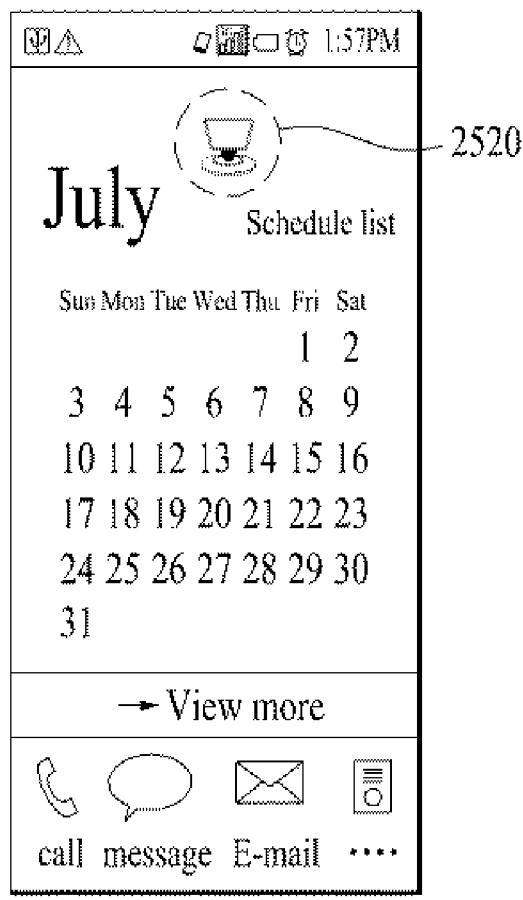

Referring to FIG. 25B, since a holography background type of a rectangular shape is set in association with a calendar application, a shortcut visual effect 2520 of a rectangular shape is displayed on a prescribed region of the display unit to indicate the holography background type setting.

Figure 25C:
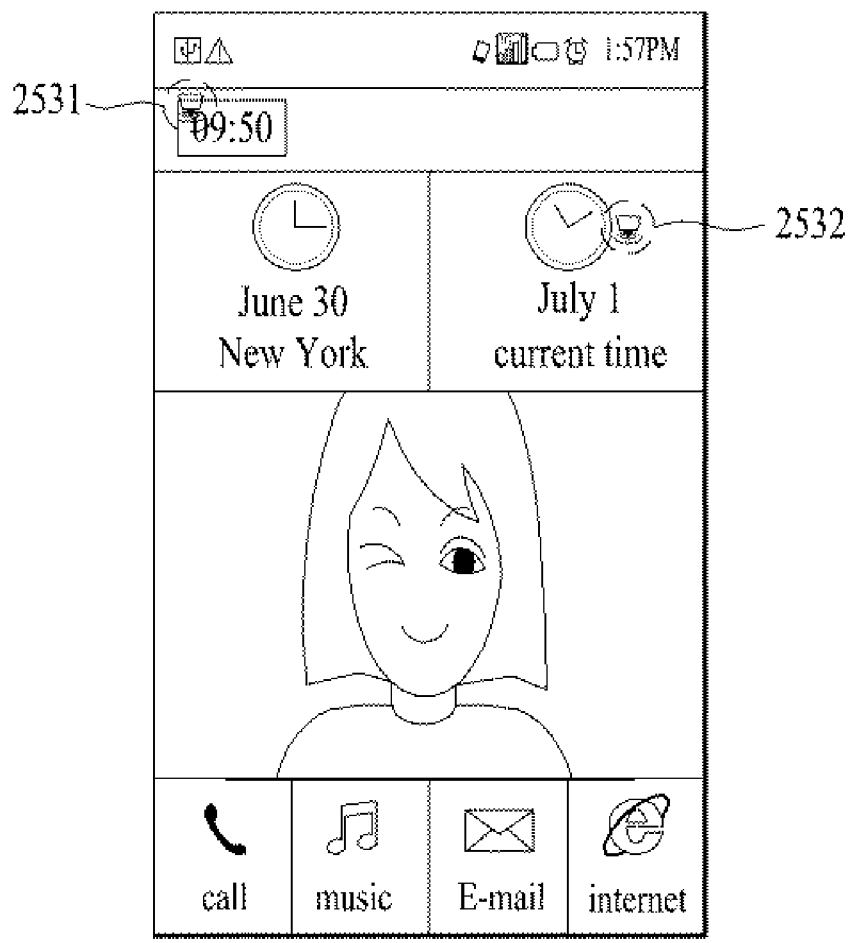

Referring to FIG. 25C, since a holography background type of a rectangular shape is set for a digital clock and a word time clock in association with a clock application, a 1st shortcut visual effect 2531 of a rectangular shape and a 2nd shortcut visual effect 2532 of a rectangular shape are displayed on prescribed regions of the display unit to indicate the holography background type setting, respectively.

Figure 25D:
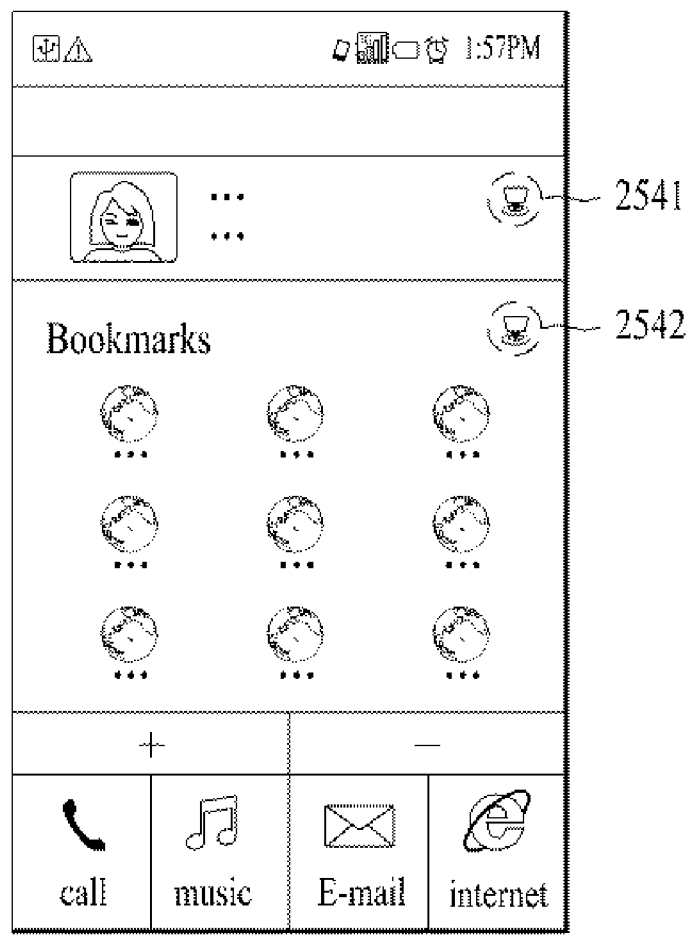

Referring to FIG. 25D, since a holography background type of a rectangular shape is set in association with YouTube application and a bookmark application, a 1st shortcut visual effect 2541 of a rectangular shape and a 2nd shortcut visual effect 2542 of a rectangular shape are displayed on prescribed regions of the display unit to indicate the holography background type setting, respectively.

Figure 25E:
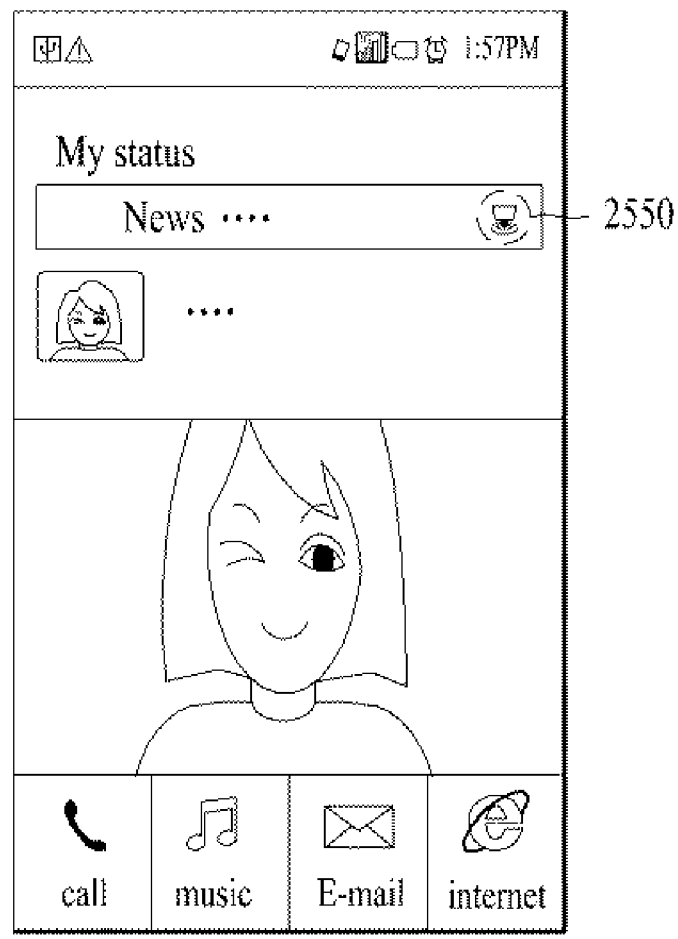

Referring to FIG. 25E, since a holography background type of a rectangular shape is set in association with SNS application indicating my information, a shortcut visual effect 2550 of a rectangular shape is displayed on a prescribed region of the display unit to indicate the holography background type setting.

Figure 25F:
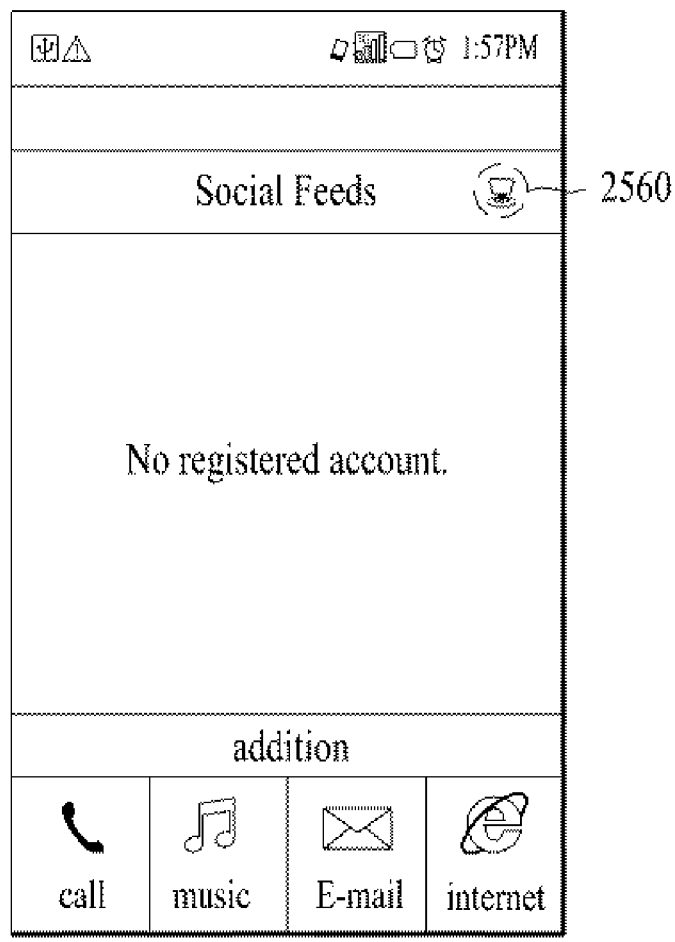

Referring to FIG. 25F, since a holography background type of a rectangular shape is set in association with SNS application indicating a registered account and the like, a shortcut visual effect 2560 of a rectangular shape is displayed on a prescribed region of the display unit to indicate the holography background type setting.

Figure 25G:
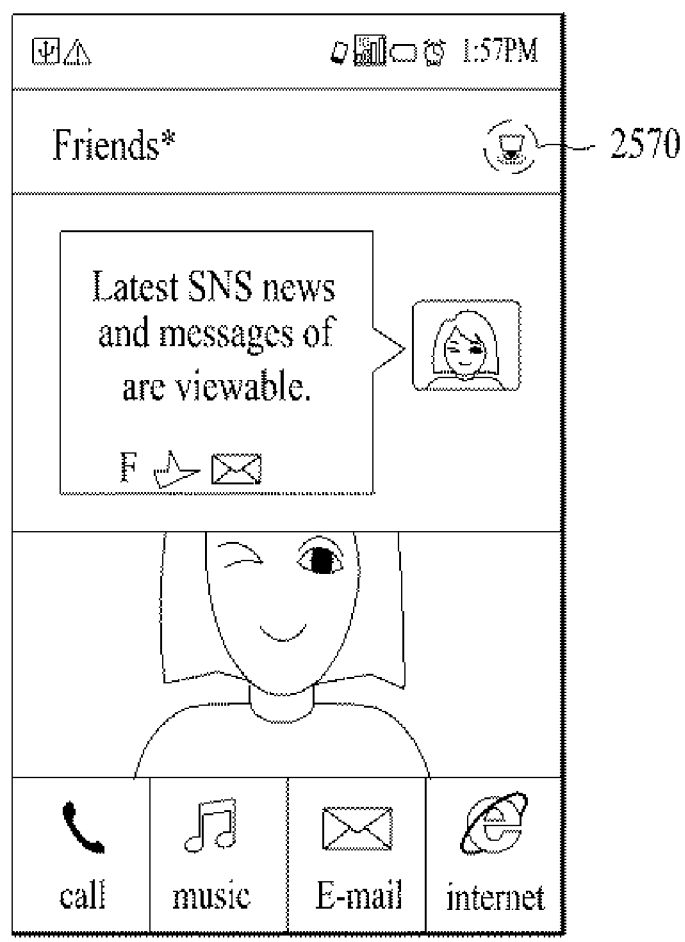

Referring to FIG. 25G, since a holography background type of a rectangular shape is set in association with SNS application indicating friend information, a shortcut visual effect 2570 of a rectangular shape is displayed on a prescribed region of the display unit to indicate the holography background type setting.

FIG. 26 is a diagram for another example of giving a prescribed visual effect to a specific object having a holography type set therefor according to one embodiment of the present invention.

FIG. 26A shows that a prescribed visual effect is displayed on a specific object in a home screen. A shortcut visual effect 2611 of a rectangular shape in prescribed size may be displayed on a left top end portion of a movie icon in a general home screen. And, a shortcut visual effect 2612 of a rectangular shape in prescribed size may be displayed on a left top end portion of a movie icon in a home screen for displaying a group widget selecting screen. Moreover, a shortcut visual effect 2613 of a rectangular shape in prescribed size may be displayed on a left top end portion of folder icon in a home screen for displaying a widget editing screen.

Figure 26B:
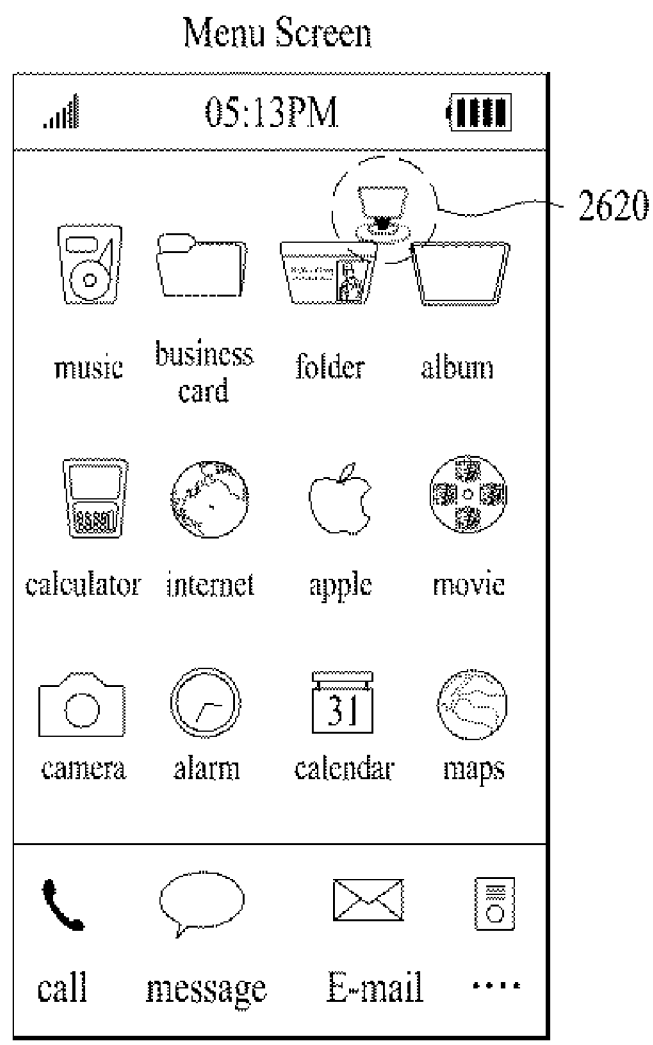
FIG. 26 is a diagram for another example of giving a prescribed visual effect to a specific object having a holography type set therefor according to one embodiment of the present invention.

Referring to FIG. 26B, a shortcut visual effect 2620 of a rectangular shape in prescribed size may be displayed on a left top end portion of an album icon in a menu screen.

Figure 26C:
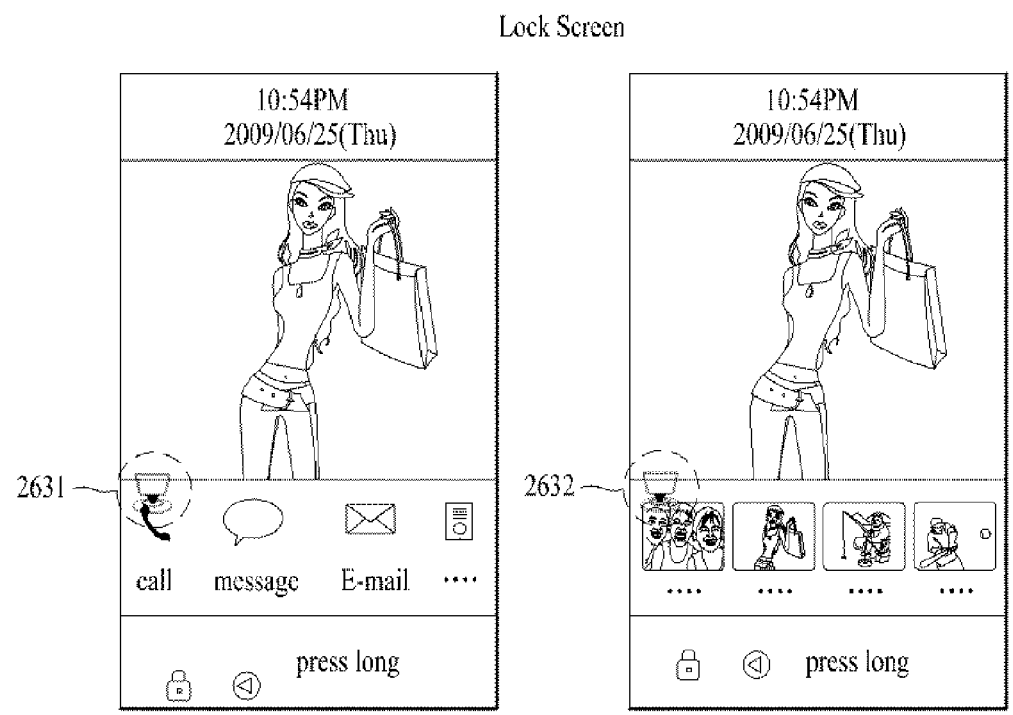

FIG. 26C shows that a prescribed visual effect is displayed on a specific object in a lock screen.

Referring to FIG. 26C, a shortcut visual effect 2631 of a rectangular shape in prescribed size may be displayed on a left top end portion of a phone icon in a lock screen for displaying icons related to applications. And, a shortcut visual effect 2632 of a rectangular shape in prescribed size may be displayed on a left top end portion of a specific contact object in a lock screen for displaying contact objects.

FIG. 27 is a diagram for a further example of giving a prescribed visual effect to a specific object having a holography type set therefor according to one embodiment of the present invention.

Figure 27A:
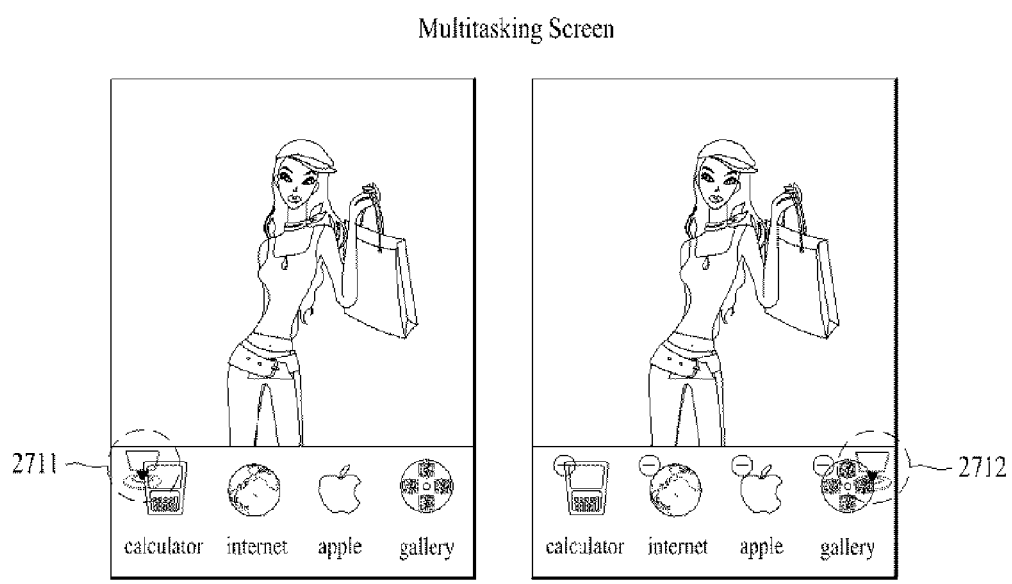
FIG. 27 is a diagram for a further example of giving a prescribed visual effect to a specific object having a holography type set therefor according to one embodiment of the present invention.

FIG. 27A shows that a prescribed visual effect is displayed on a specific object in a multitasking screen. Referring to FIG. 27A, a shortcut visual effect 2711 of a rectangular shape in prescribed size may be displayed on a left top end portion of a calculator icon in a general multitasking screen. And, a shortcut visual effect 2712 of a rectangular shape in prescribed size may be displayed on a left top end portion of a gallery icon in a multitasking screen for displaying an end selection screen of applications.

Figure 27B:
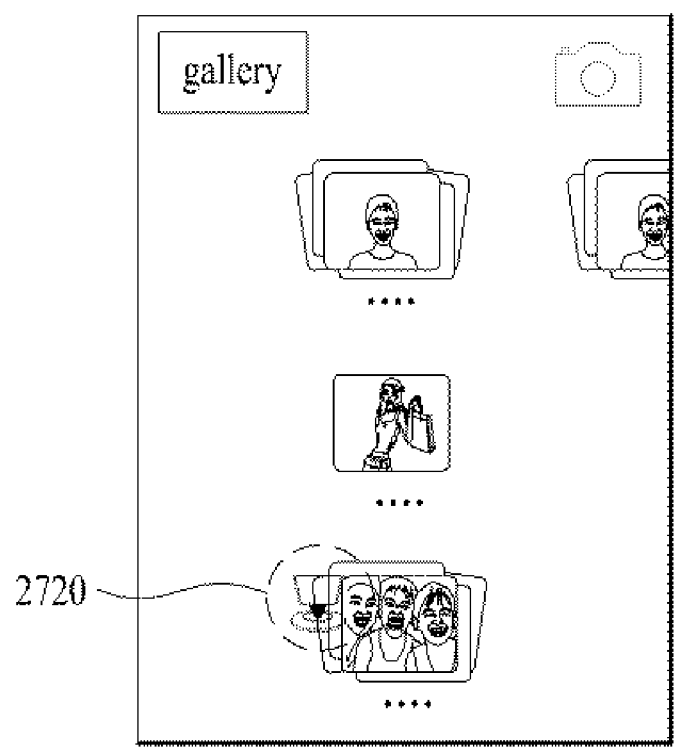

FIG. 27B shows that a prescribed visual effect is displayed on a specific object in a gallery screen. Referring to FIG. 27B, a shortcut visual effect 2720 of a rectangular shape in prescribed size may be displayed on a left top end portion of a specific image icon in a gallery screen for displaying a plurality of images and videos as thumbnails.

Figure 27C:
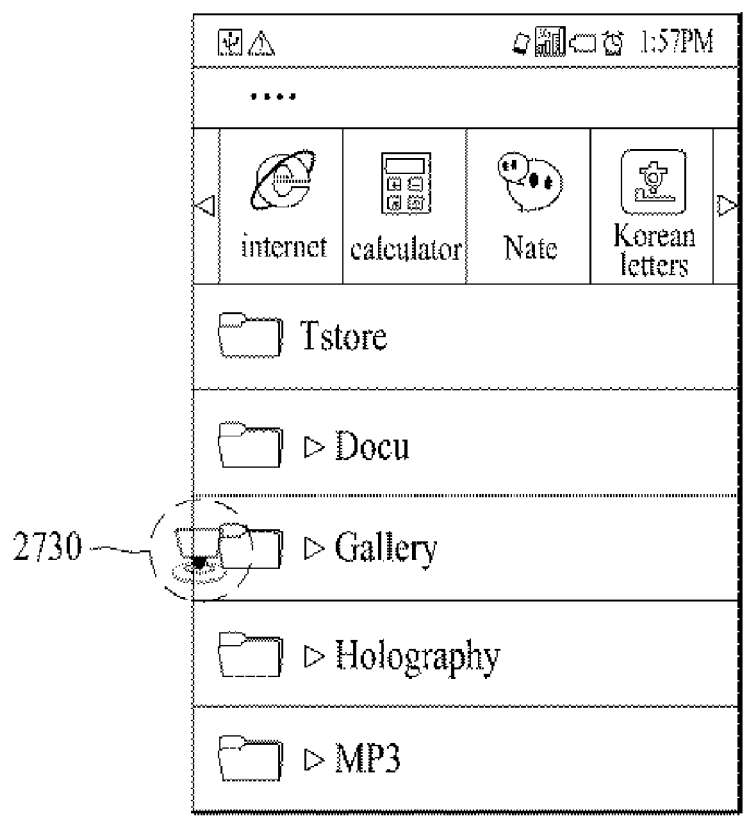

FIG. 27C shows that a prescribed visual effect is displayed on a specific object in an internet connection screen. Referring to FIG. 27C, a shortcut visual effect 2730 of a rectangular shape in prescribed size may be displayed on a left top end portion of a specific folder icon in an internet connection screen for displaying a list of a plurality of folders.

Figure 27D:
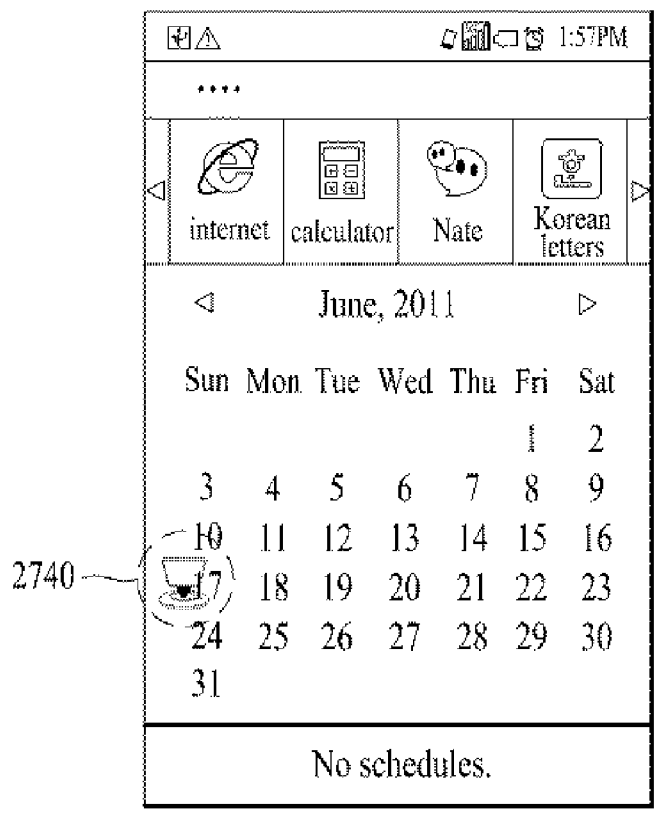

FIG. 27D shows that a prescribed visual effect is displayed on a specific date in a schedule screen. Referring to FIG. 27D, a shortcut visual effect 2740 of a rectangular shape in prescribed size may be displayed on a left top end portion of a specific date in a schedule screen.

Figure 27E:
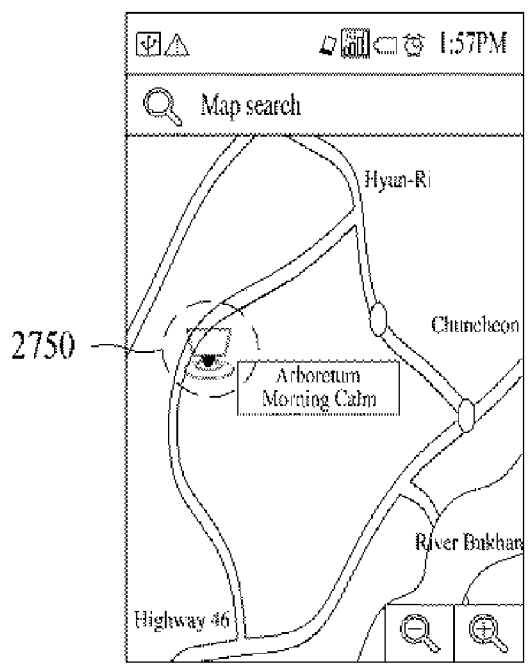

FIG. 27E shows that a prescribed visual effect is displayed on a specific point in a map screen. Referring to FIG. 27E, a shortcut visual effect 2750 of a rectangular shape in prescribed size may be displayed on a left top end portion of a specific point in a map screen.

In the following description, explained is a visual effect for informing a user that a holography background type has been set for a specific screen.

FIG. 28 is a diagram for one example of giving a prescribed visual effect to a specific screen having a holography type set therefor according to one embodiment of the present invention.

Figure 28A:
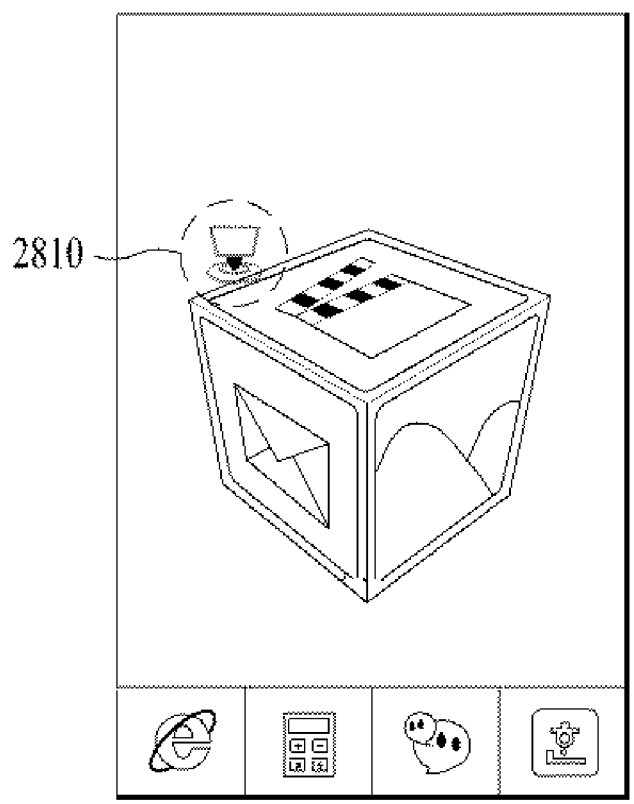
FIG. 28 is a diagram for one example of giving a prescribed visual effect to a specific screen having a holography type set therefor according to one embodiment of the present invention.

Referring to FIG. 28A, since a holography background type of a rectangular shape is set for a prescribed one of a plurality of menus represented as a cube, a shortcut visual effect 2810 is displayed on a prescribed region of the menu to indicate the holography background type setting.

Figure 28B:
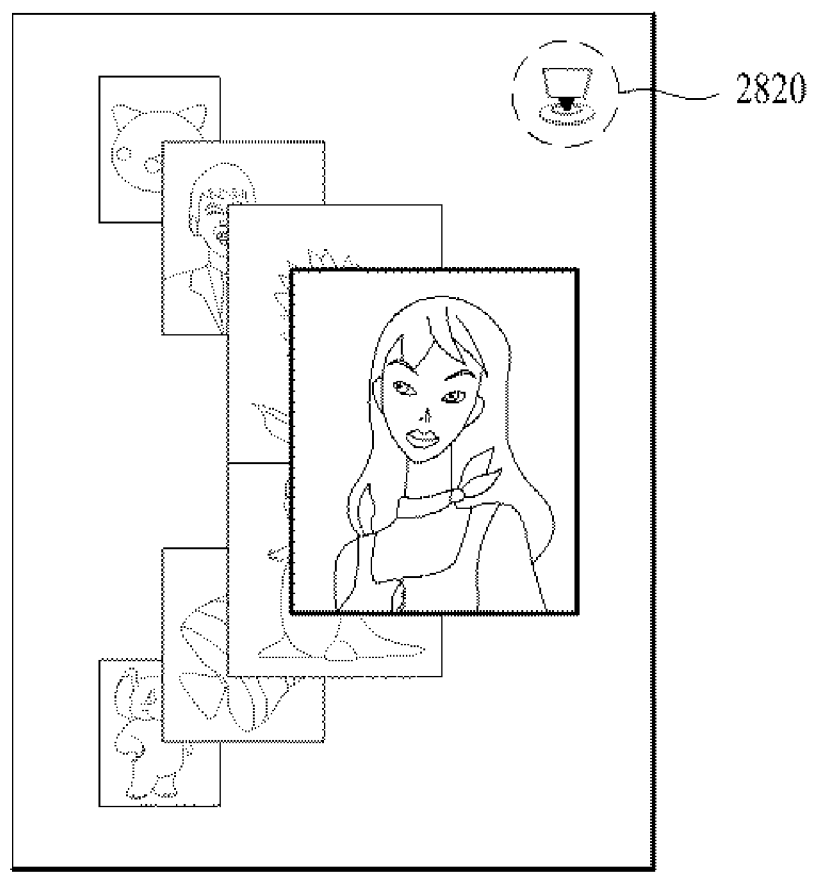

Referring to FIG. 28B, since a holography background type of a rectangular shape is set for all of a plurality of menus to which depths are given respectively, a shortcut visual effect 2820 is displayed on a prescribed region of the display unit to indicate the holography background type setting.

Moreover, an additional visual effect may be displayed in accordance with a kind of each set holography type to inform a user that a holography type is set for a specific screen [not shown in the drawing]. For instance, a default type among a plurality of holography types may be further provided with a visual effect 'D', a holography background type among a plurality of holography types may be further provided with a visual effect 'S', and a holography pattern type among a plurality of holography types may be further provided with a visual effect 'P'.

In the following description, the step S1730 of selecting a holography type set specific object or screen and the step S1740 of projecting a holography image in accordance with a set holography type are explained in detail with reference to FIGS. 29 to 34.

First of all, as mentioned in the foregoing description of the step S1740, a content of a specific object or screen is intactly projected as a holography image. Alternatively, a search for a specific information is performed and the found specific information is then projected as a holography image. Alternatively, a specific item is projected as a holography image only in accordance with a holography type. Alternatively, one item is activated, a next item is automatically activated, and a holography image is then projected in accordance with a holography type. Alternatively, a previous of a holography type is provided and a holography image is projected. Alternatively, a plurality of functions are displayed and a holography image is projected by applying a holography type in accordance with a selected function.

Figure 29:
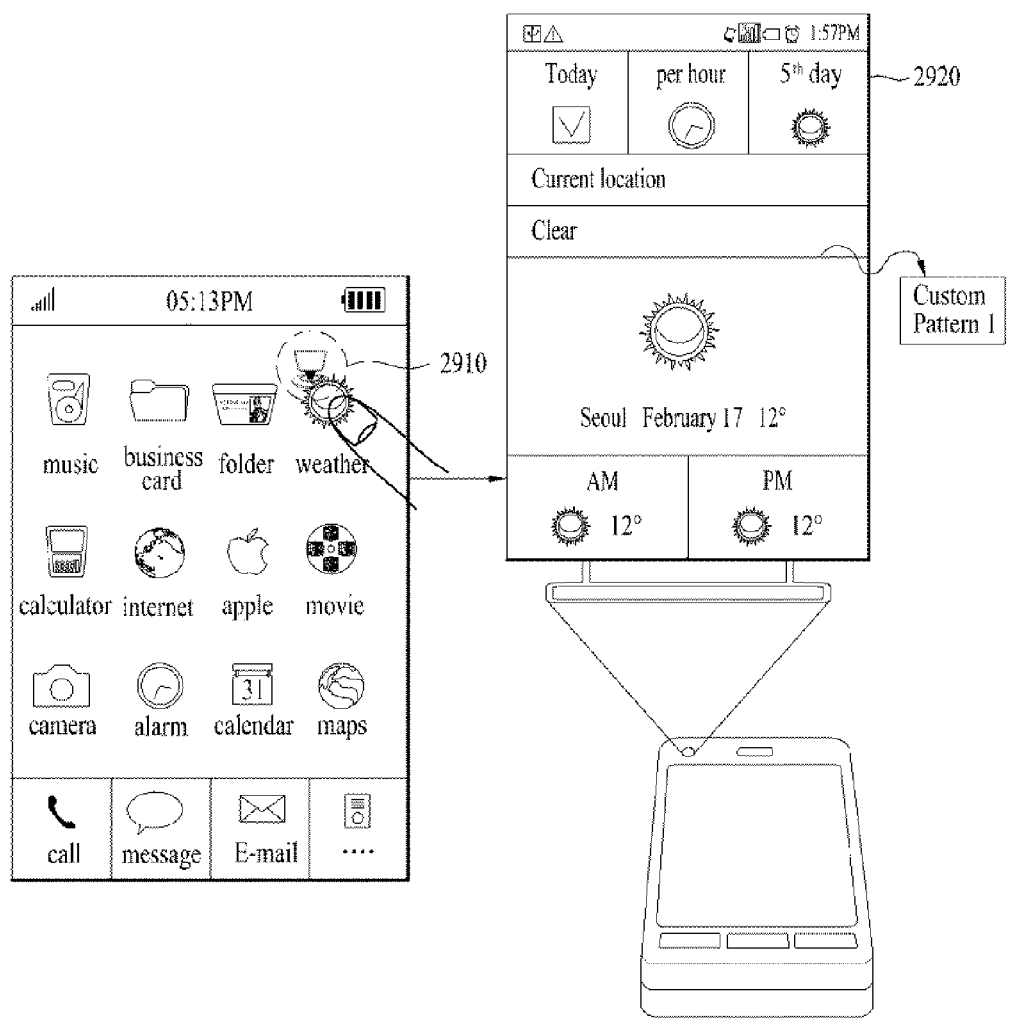
FIG. 29 is a diagram for one example of projecting a holography image in accordance with a set holography type according to one embodiment of the present invention.

FIG. 29 is a diagram for one example of projecting a holography image in accordance with a set holography type according to one embodiment of the present invention. In FIG. 29, a content related to a specific object or screen is intactly displayed as a holography image.

Referring to FIG. 29, if a weather icon 2910 is selected by a user, the controller 180 projects an activated result of a weather application corresponding to the weather icon 2910 as a holography image 2920. In doing so, the holography image 2920 may be projected in accordance with a set holography pattern.

Figure 30:
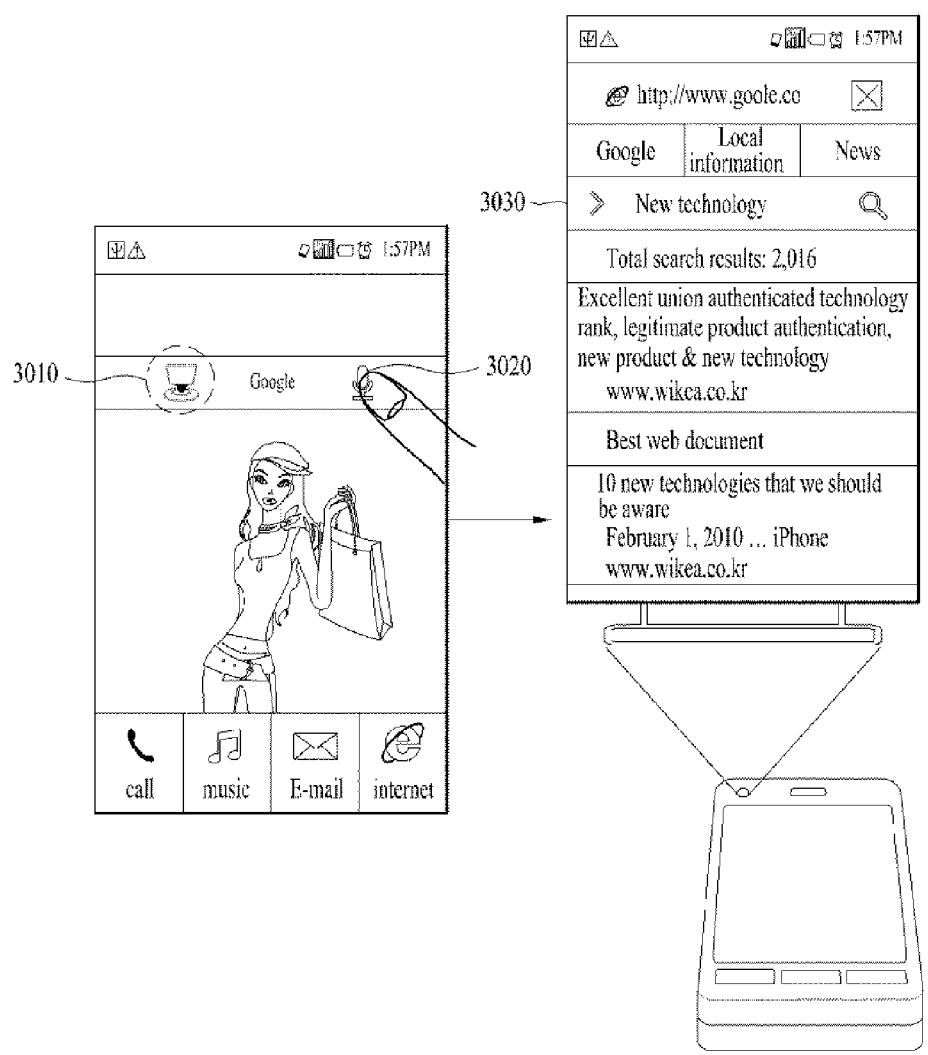
FIG. 30 is a diagram for one example of projecting a holography image of specific information found by search in accordance with a set holography type according to one embodiment of the present invention.

FIG. 30 is a diagram for one example of projecting a holography image of specific information found by search in accordance with a set holography type according to one embodiment of the present invention.

In particular, in case that a specific object is an informative/active type widget, a search for a specific information is performed and the found specific information may be projected as a holography image. For instance, the informative/active type widget may include a widget for one of weather, news, stock, movie, music, gourmet restaurant, shopping, search, blog, cartoon, traffic, game, Google, Naver, digital clock, analog clock, word time clock, memo, bookmark, photo frame, map, YouTube, SNS and the like. In particular, this informative/active type widget automatically makes a search for information and then actively provides the found information.

Referring to FIG. 30, a user selects Google widget 3020 on which a visual effect 3010 is displayed to indicate that a holography type is set. The user is then able to input a keyword 'new technology' by key manipulation or voice.

If so, the controller 180 makes a search for specific information related to 'new technology' and then controls the found specific information to be projected as a holography image 3030.

FIG. 31 is a diagram for one example of projecting a holography image of a specific item only in accordance with a holography type according to one embodiment of the present invention.

Figure 31A:
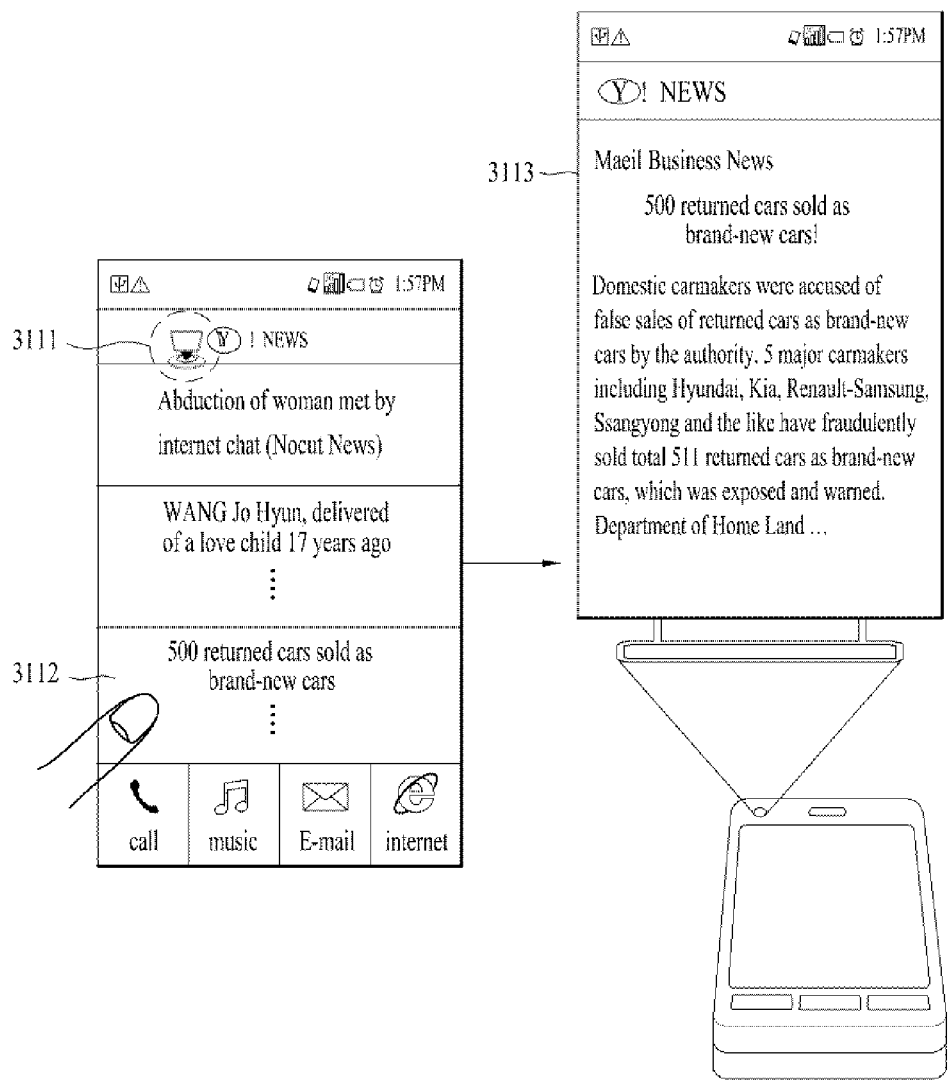
FIG. 31 is a diagram for one example of projecting a holography image of a specific item only in accordance with a holography type according to one embodiment of the present invention.

Referring to FIG. 31A, a user may select a 'sports' related specific item 3112 from a news widget on which a visual effect 3111 is displayed to indicate that a holography type is set. If so, the controller 180 may project a detailed content for the selected 'sports' related specific item as a holography image 3113.

Figure 31B:
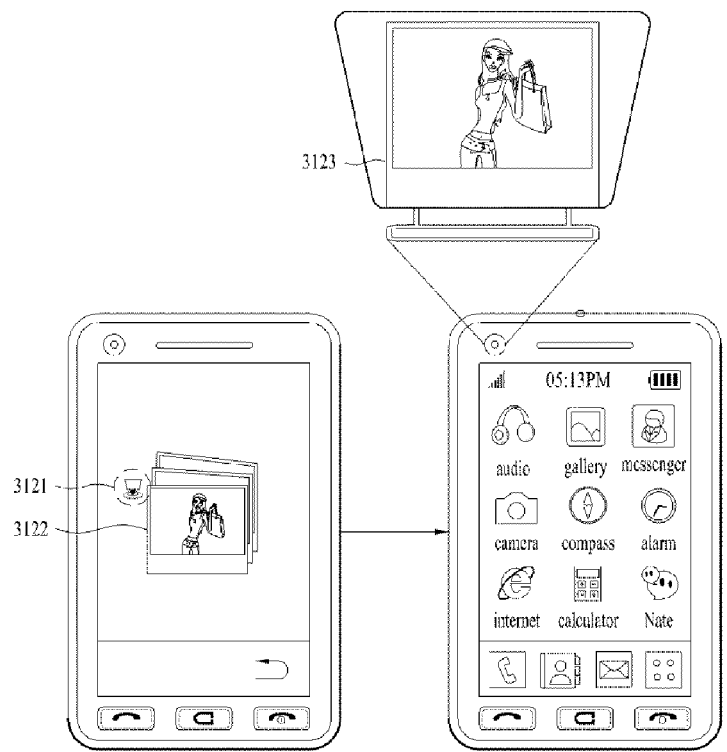

Referring to FIG. 31B, a user may select a specific image item 3122 from a plurality of image widgets on which a visual effect 3121 is displayed to indicate that a holography type is set. If so, the controller 180 may project a detailed content for the selected specific image item as a holography image 3123.

Figure 31C:
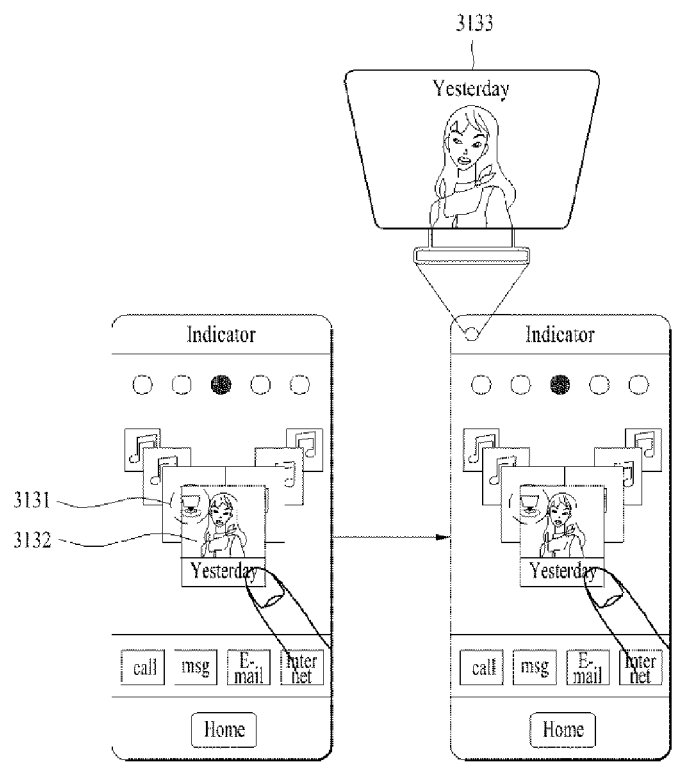

Referring to FIG. 31C, a user may select a specific video item 3132 from a plurality of video widgets on which a visual effect 3131 is displayed to indicate that a holography type is set. If so, the controller 180 may project a detailed content for the selected specific video item as a holography image 3133.

FIG. 32 is a diagram for one example of projecting a holography image in accordance with a holography type by activating one item and then activating a next item automatically according to one embodiment of the present invention.

Referring to FIG. 32A, a user may select a gallery application on which a visual effect 3211 is displayed to indicate that a holography type is set. If so, the controller 180 may control previously designated images 3212 and 3213 to be sequentially displayed in order as holography images by prescribed time interval, respectively.

Referring to FIG. 32B, a user may select a music application on which a visual effect 3221 is displayed to indicate that a holography type is set. If so, the controller 180 may control previously designated music 3222 and 3223 to be sequentially displayed in order as holography images by prescribed time interval, respectively.

FIG. 33 is a diagram for one example of providing a preview of a holography type according to one embodiment of the present invention.

Referring to FIG. 33, a user may select a memo application 3312 on which a visual effect 3311 is displayed to indicate that a holography type is set. If so, the controller 180 may preferentially display a holography background type set for the memo application as a preview image 3320 in previously designated size.

After the preview image 3320 has been displayed, if the user selects the preview image 3320, the controller 180 may control a holography image 3330 to be projected in a manner of applying a set holography background.

Although the holography background type is taken as an example for the holography type in FIG. 33, the above description with reference to FIG. 33 is identically applicable to a default type or a holography pattern type as well.

Therefore, a user is able to conveniently check a set holography type via preview.

FIG. 34 is a diagram for one example of displaying a plurality of functions and then applying a holography type in accordance with a selected function according to one embodiment of the present invention.

In particular, if a specific object is selected by a user, the controller 180 may display a plurality of functions each of which is capable of providing a holography image in accordance with a set holography type.

A plurality of the functions selectable by a user may include a call function, an information reading function, a message sending function, a holography type preview function and the like. And, these functions may be displayed as a list. In doing so, if a user selects a prescribed one of a plurality of the displayed functions, a holography image may be projected by applying a holography type in accordance with the selected function.

Figure 34A:
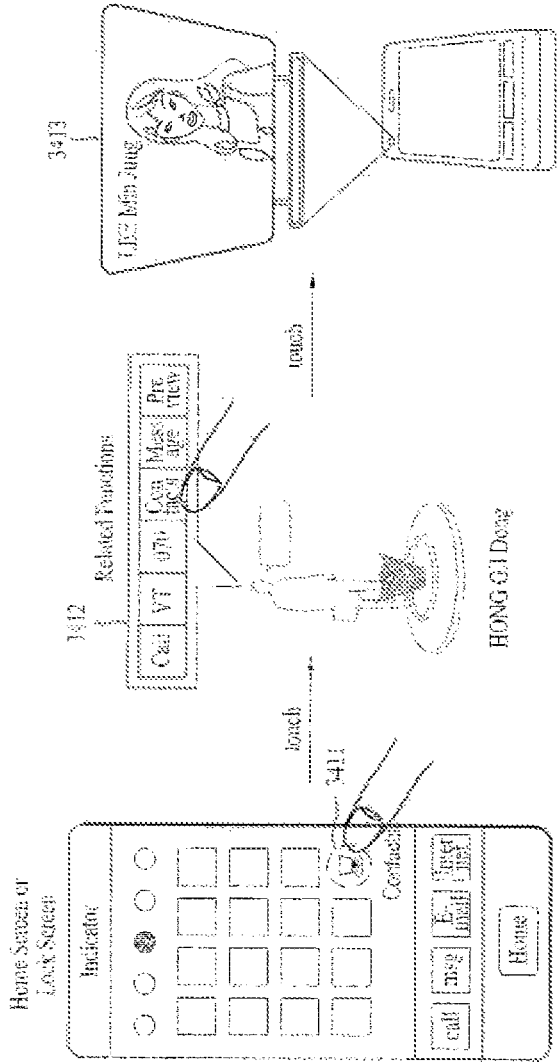
FIG. 34 is a diagram for one example of displaying a plurality of functions and then applying a holography type in accordance with a selected function according to one embodiment of the present invention.

Referring to FIG. 34A, a user may select a specific object on which a visual effect 3411 is displayed to indicate that a holography type is set.

If the specific object is selected, the controller 180 displays a list 3412, which includes a call function, an information reading function, a message sending function, a holography type preview function and the like, on a prescribed region of a touchscreen.

In doing so, if the user selects the information reading function, information on the specific object is projected as a holography image 3413 in accordance with the set holography type.

Figure 34B:
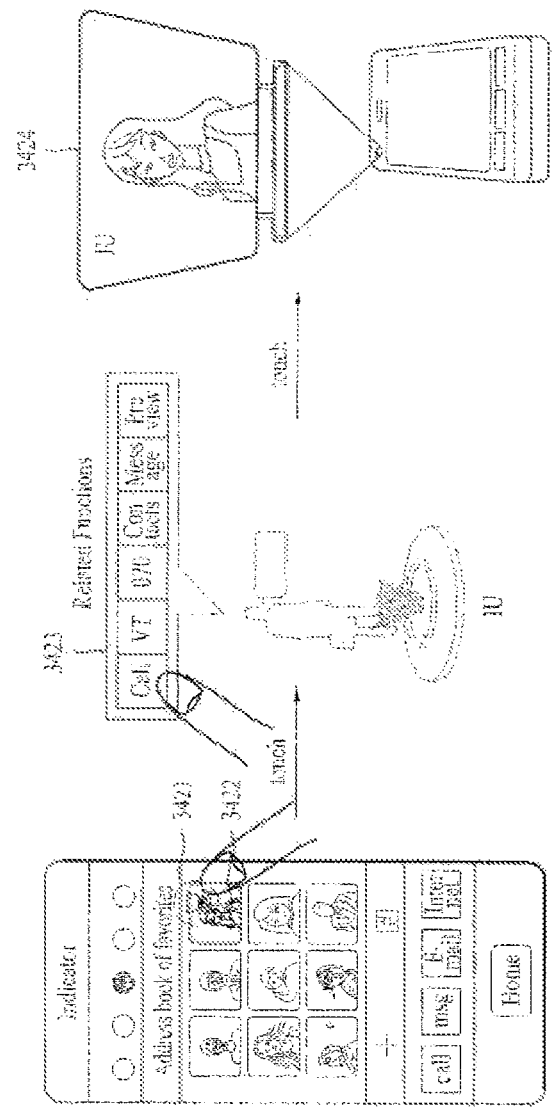

Referring to FIG. 34B, a user may select a specific object 3422 on which a visual effect 3421 is displayed to indicate that a holography type is set.

If the specific object is selected, the controller 180 displays a list 3423, which includes a call function, an information reading function, a message sending function, a holography type preview function and the like, on a prescribed region of a touchscreen.

In doing so, if the user selects the call function, the controller 180 transmits a call signal to the specific object 3422 and also projects information on the specific object 3422 as a holography image 3424 in accordance with the set holography type.

Meanwhile, according to the present invention, the above-described methods can be implemented in a program recorded medium as computer-readable codes. Computer-readable media include ROM, RAM, CD-ROM, magnetic tapes, floppy discs, optical data storage devices, and the like for example and also include carrier-wave type implementations (e.g., transmission via Internet).

The aforementioned embodiments for a mobile terminal including a display unit configured to display a stereoscopic image are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention may be applicable to such a system as a terminal, implemented as a multimedia player provided with composite functions such as photographing of photos or videos, playback of music or video files, game play, broadcast reception and the like for example. In particular the present invention may be applicable to a wireless mobile communication apparatus used for a cellular system

The invention claimed is:
1. A mobile terminal comprising:
a holography storing medium configured to record an interference pattern generated by interference of light;
a holography output module configured to output a holography content image or a holography background image attributed to a diffraction between the light applied to the holography storing medium and the interference pattern in accordance with at least one preset holography type among a plurality of holography types, wherein the plurality of the holography types comprise a default type, a holography background type and a holography pattern type; and
a controller configured to control the holography output module to output the holography image, wherein the controller is configured to:
control the holography output module to output the holography content image in accordance with the default type,
control the holography output module to output the holography background image with the holography content image in a region within a preset holography background in accordance with the holography background type, and control the holography output module to output the holography content image or the holography background image with a holography pattern corresponding to the set holography pattern type moving or rotating in accordance with the holography pattern type, wherein the holography's moving or rotating is based on at least one of a distance difference between the holography output module and the output holography content image and a shape of the output holography content image, and wherein each of the distance difference and the shape of the output holography content image is varied in accordance with time.

2. The mobile terminal of claim 1, further comprising:
a display unit,
wherein the controller is further configured to display a visual effect on a prescribed region of the display unit to indicate the at least one preset holography type.

3. The mobile terminal of claim 1, wherein the holography background image comprises a closed curve.

4. The mobile terminal of claim 1, wherein the output holography pattern changes in at least one of a shift, a rotation, a color change, size change and a flickering, and
wherein each of the shift, the rotation, the color change, the size change and the flickering is varied in accordance with time.

5. The mobile terminal of claim 2, wherein the visual effect includes a default visual effect to indicate the default type, a holography background visual effect to indicate the holography background type and a holography pattern visual effect to indicate the holography pattern type.

6. The mobile terminal of claim 1, further comprising:
a display unit; and
a user input unit,
wherein the controller is further configured to:
receive a selection of at least one object displayed on the display unit via the user input unit or a partial region of the display unit via the user input unit, and
output the selected at least one object or content displayed in the partial region of the display unit as the holography content image or the holography background image.

7. The mobile terminal of claim 6, wherein the controller is further configured to display a visual effect for indicating the at least one preset holography type on a prescribed region of the display unit, and
wherein the visual effect comprises a color, a surface texture pattern, a flickering, a size variation and a transformation of the selected at least one object or the content displayed in the partial region of the display unit.

8. The mobile terminal of claim 1, further comprising:
a user input unit,
wherein the controller is further configured to:
search for second information linked with first information input via the user input unit, and
output the holography content image including the second information.

9. The mobile terminal of claim 1, further comprising:
a display unit; and
a user input unit configured to select a first object from a plurality of objects displayed on the display unit,
wherein the holography content image comprises result information by activating the first object.

10. The mobile terminal of claim 1, further comprising:
a display unit; and
a user input unit configured to select at least one object in order from a plurality of objects displayed on the display unit,
wherein the holography content image comprises result information by activating the plurality of objects, and each result information varies in the order in a preset time interval.

11. The mobile terminal of claim 1, further comprising:
a display unit; and
a user input unit,
wherein the controller is further configured to:
display preview information of the holography content image or the holography background image in accordance with the at least one preset holography type on the display unit.

12. The mobile terminal of claim 1, further comprising:
a display unit; and
a user input unit configured to select a first object from a plurality of objects displayed on the display unit,
wherein the controller is further configured to:
if the first object is selected, display a list of the holography background image.

13. A method of controlling a mobile terminal, the method comprising:
setting at least one holography type among a plurality of holography types, wherein the plurality of the holography types comprise a default type, a holography background type and a holography pattern type;
outputting, via a controller of the mobile terminal, a holography content image in accordance with the default type;
outputting, via the controller, the holography content image with a holography background image in a region within a preset holography background in accordance with the holography background type; and
outputting, via the controller, the holography content image or the holography background image with a holography pattern corresponding to the set holography pattern type moving or rotating in accordance with the holography pattern type,
wherein the holography's moving or rotating is based on at least one of a distance difference between a holography output module and the output holography content image and a shape of the output holography content image, and
wherein each of the distance difference and the shape of the output holography content image is varied in accordance with time.

14. The method of claim 13, further comprising:
displaying a visual effect on a prescribed region of a display unit to indicate the set at least one holography type.

15. The method of claim 14, wherein the visual effect includes a default visual effect to indicate the default type, a holography background visual effect to indicate the holography background type and a holography pattern visual effect to indicate the holography pattern type.

16. The method of claim 13, further comprising:
receiving a selection of at least one object displayed on a display unit or a partial region of the display unit; and
outputting the selected at least one object or content displayed in the partial region of the display unit as the holography content image or the holography background image.

17. The method of claim 13, further comprising:
displaying preview information indicating the set at least one holography type on a display unit; and if the displayed preview information is selected, outputting the holography content image or the holography background image in accordance with the set at least one holography type.

18. The method of claim 13, further comprising:

selecting a first object from a plurality of objects displayed on a display unit;

displaying a list of the holography background image;

selecting the holography background image; and outputting the selected holography background image.

* * * * *